US011113183B2

(12) United States Patent
Shah et al.

(10) Patent No.: US 11,113,183 B2
(45) Date of Patent: Sep. 7, 2021

(54) AUTOMATED DEVICE TEST TRIAGING SYSTEM AND TECHNIQUES

(71) Applicant: Google LLC, Mountain View, CA (US)

(72) Inventors: Ravi Shah, Boulder, CO (US); Maya Ben Ari, Mountain View, CA (US); Keun Soo Yim, San Jose, CA (US)

(73) Assignee: Google LLC, Mountain View, CA (US)

( * ) Notice: Subject to any disclaimer, the term of this patent is extended or adjusted under 35 U.S.C. 154(b) by 53 days.

(21) Appl. No.: 16/608,363

(22) PCT Filed: Nov. 10, 2017

(86) PCT No.: PCT/US2017/061120
§ 371 (c)(1),
(2) Date: Oct. 25, 2019

(87) PCT Pub. No.: WO2019/094029
PCT Pub. Date: May 16, 2019

(65) Prior Publication Data
US 2021/0109845 A1   Apr. 15, 2021

(51) Int. Cl.
*G06F 9/46* (2006.01)
*G06F 11/30* (2006.01)
(Continued)

(52) U.S. Cl.
CPC .......... *G06F 11/3664* (2013.01); *G06F 9/547* (2013.01); *G06F 11/3688* (2013.01);
(Continued)

(58) Field of Classification Search
CPC ............. G06F 11/3664; G06F 11/3688; G06F 11/3672; G06F 11/263; G06F 11/273;
(Continued)

(56) References Cited

U.S. PATENT DOCUMENTS 6,732,060 B1 * 5/2004 Lee ................. G01R 31/318307
    702/118
6,892,154 B1 * 5/2005 Lee .................... G01R 31/2834
    324/500

(Continued)

OTHER PUBLICATIONS

Achim D. Brucker et al., TEstand Proofs, May 31-Jun. 1, 2012, [Retrieved on May 16, 2021], Retrieved from the internet: <URL: https://link.springer.com/content/pdf/10.1007%2F978-3-642-30473-6.pdf> 187 Pages (1-187) (Year: 2012).*

(Continued)

*Primary Examiner* — Anibal Rivera
(74) *Attorney, Agent, or Firm* — McDonnell Boehnen Hulbert & Berghoff LLP

(57) ABSTRACT

Methods and apparatus are provided for testing computing devices. A host computing device is provided for testing devices under test (DUTs) using a test suite that includes first and second tests. The DUTs can include a first group of DUTs with a first DUT and a second group of DUTs with a second DUT. The first and second groups of DUTs can share a common design. The host computing device can determine that the DUTs execute the first test before the second test. The host computing device can receive failing first test results for the first DUT. The host computing device can determine, based on the first test results and that the first and second DUT groups share a common design, to execute the second test before the first test and can subsequently instruct the second DUT to execute the second test before the first test.

23 Claims, 18 Drawing Sheets

(51) Int. Cl.
  *G06F 11/263* (2006.01)
  *G06F 11/28* (2006.01)
  *G06F 11/36* (2006.01)
  *G06F 9/54* (2006.01)
  *G06F 11/273* (2006.01)
  *G06F 9/455* (2018.01)
  *G06F 11/22* (2006.01)

(52) U.S. Cl.
  CPC ...... *G06F 9/45558* (2013.01); *G06F 11/2294* (2013.01); *G06F 11/263* (2013.01); *G06F 11/273* (2013.01); *G06F 11/3672* (2013.01)

(58) Field of Classification Search
  CPC ...... G06F 11/2294; G06F 11/26; G06F 9/547; G06F 9/45558; G06F 9/528
  See application file for complete search history.

(56) References Cited

U.S. PATENT DOCUMENTS

| | | | | |
|---|---|---|---|---|
| 7,165,191 | B1* | 1/2007 | Vakrat | G06F 11/26 714/38.1 |
| 7,315,973 | B1* | 1/2008 | Wise | G06F 30/33 714/741 |
| 7,334,162 | B1* | 2/2008 | Vakrat | G06F 11/2294 714/38.1 |
| 7,930,130 | B2* | 4/2011 | Sakarovitch | G05B 23/0256 702/123 |
| 9,110,496 | B1* | 8/2015 | Michelsen | G06F 9/45558 |
| 9,569,341 | B1* | 2/2017 | van Schaik | G06F 11/3672 |
| 10,108,514 | B1* | 10/2018 | Kinderman | G06F 11/263 |
| 10,210,064 | B2* | 2/2019 | Wang | G06F 16/2455 |
| 10,557,886 | B2* | 2/2020 | Nahum | G01R 31/2834 |
| 10,587,491 | B1* | 3/2020 | Volpe | H04L 43/10 |
| 10,659,571 | B1* | 5/2020 | Volpe | H04L 69/324 |
| 10,678,666 | B1* | 6/2020 | Gauf | G06F 11/2635 |
| 2002/0162059 | A1* | 10/2002 | McNeely | H04L 51/18 714/703 |
| 2003/0182074 | A1* | 9/2003 | Mutchler | G06F 11/263 702/119 |
| 2003/0200483 | A1* | 10/2003 | Sutton | G01R 31/2834 714/25 |
| 2004/0181763 | A1* | 9/2004 | Soltis, Jr. | G01R 31/318307 716/111 |
| 2005/0235263 | A1* | 10/2005 | Bundy | G06F 11/263 717/124 |
| 2007/0234293 | A1* | 10/2007 | Noller | G06F 11/3688 717/124 |
| 2007/0283197 | A1* | 12/2007 | Jordan | G11C 29/56008 714/724 |
| 2007/0300117 | A1* | 12/2007 | Krech | G06F 11/273 714/742 |
| 2009/0018793 | A1* | 1/2009 | Sakarovitch | G05B 23/021 702/123 |
| 2009/0307763 | A1* | 12/2009 | Rawlins | G06F 11/3672 726/5 |
| 2011/0078525 | A1* | 3/2011 | Xia | G01R 31/318563 714/731 |
| 2011/0099424 | A1* | 4/2011 | Rivera Trevino | G06F 11/263 714/25 |
| 2011/0314334 | A1* | 12/2011 | Silver | G06F 11/3688 714/32 |
| 2013/0006567 | A1* | 1/2013 | Horn | G01R 31/31907 702/108 |
| 2014/0177459 | A1* | 6/2014 | Watt | H04L 41/0806 370/252 |
| 2016/0139968 | A1* | 5/2016 | DeWitt | G06F 9/528 710/200 |
| 2017/0060713 | A1* | 3/2017 | Wang | G06F 16/2455 |
| 2017/0344449 | A1* | 11/2017 | Tung | G06F 11/2236 |
| 2018/0054656 | A1* | 2/2018 | Okamura | H04N 21/24 |
| 2018/0096736 | A1* | 4/2018 | Teoh | G11C 29/12005 |
| 2018/0109781 | A1* | 4/2018 | Bruce-Smith | H04N 17/00 |
| 2018/0313892 | A1* | 11/2018 | Nahum | G01R 31/287 |
| 2019/0012256 | A1* | 1/2019 | Poppe | G01R 31/31912 |
| 2019/0377027 | A1* | 12/2019 | Rivoir | G01R 31/31708 |

OTHER PUBLICATIONS

Jos C.M. Baeten et al., Concurrency Theory, Aug. 1999, [Retrieved on May 16, 2021], Retrieved from the internet: <URL: https://link.springer.com/content/pdf/10.1007%2F3-540-48320-9.pdf> 585 Pages (1-585) (Year: 1999).*

S. Yoo, et al., Regression Testing Minimisation, Selection and Prioritisation: A Survey, Software Testing, Verification and Reliability, Mar. 1, 2012, pp. 60.

* cited by examiner

Software / Hardware Tests 172

- Compatiblity Test Suite (CTS) Tests 210
- Vendor Test Suite (VTS) Tests 212
- Device-Dependent Tests 214

Software Image(s) 180

- Device-Independent Image(s) 230
  - Generic System Image(s) (GSIs) 232
  - Kernel / Boot Image(s) 234
- Device-Dependent Image(s) 240
  - Device Image(s) 242
  - Device-Related Entity Specific Image(s) 244

1810 Provide a host computing device executing test infrastructure system software for testing a plurality of devices under test (DUTs) using a test suite having a plurality of tests to be executed by the plurality of DUTs, the plurality of DUTs including a first DUT and a second DUT, where the first DUT and the second DUT share a common design, and where the plurality of tests include a first test and a second test

1820 Determine to execute the first test before the second test on at least the first DUT using the host computing device

1830 Receive, at the host computing device, first test results for a failing first test executed by the first DUT

1840 Determine, based on the first test results and based on the first DUT sharing the common design with the second DUT, to execute the second test before the first test on the second DUT

1850 The host computing device subsequently instructing the second DUT to execute the second test before executing the first test

FIG. 18

AUTOMATED DEVICE TEST TRIAGING SYSTEM AND TECHNIQUES

This application is a national stage entry of, and claims the benefit of, International (PCT) Application No. PCT/US2017/061120, filed Nov. 10, 2017, which is fully incorporated herein by reference.

BACKGROUND

Recently, many software applications have been developed for use on mobile computing devices. To increase the likelihood of a positive user experience with these software applications and mobile computing devices, a mobile computing device can be tested during one or more testing sessions. These testing sessions can include analysis of test results for tests involving execution of hardware and software of various devices and under various operating conditions. The test results and subsequent analysis can be used to find and address hardware faults, software faults, and/or other issues associated with the mobile computing devices, software applications, system software, and/or to improve performance of the hardware and/or software of the mobile computing devices.

SUMMARY

In one aspect, a method is provided. A host computing device executing test infrastructure system software for testing a plurality of devices under test (DUTs) using a test suite having a plurality of tests to be executed by the plurality of DUTs is provided. The plurality of DUTs include a first DUT and a second DUT, where the first DUT and the second DUT share a common design. The plurality of tests include a first test and a second test. The host computing device determines to execute the first test before the second test on at least the first DUT. The host computing device receives first test results for a failing first test executed by the first DUT. The host computing device determines, based on the first test results and based on the first DUT sharing the common design with the second DUT, to execute the second test before the first test on the second DUT. The host computing device subsequently instructs the second DUT to execute the second test before executing the first test.

In another aspect, a host computing device is provided. The host computing device includes one or more processors and non-transitory computer readable media. The non-transitory computer readable media has computer-readable instructions stored thereon. The computer-readable instructions, when executed by the one or more processors, cause the host computing device to perform functions. The functions include: executing test infrastructure system software for testing a plurality of DUTs using a test suite having a plurality of tests to be executed by the plurality of DUTs, the plurality of DUTs including a first DUT and a second DUT, where the first DUT and the second DUT share a common design, and where the plurality of tests include a first test and a second test; determining to execute the first test before the second test on at least the first DUT; receiving first test results for a failing first test executed by the first DUT; determining, based on the first test results and based on the first DUT sharing the common design with the second DUT, to execute the second test before the first test on the second DUT; and subsequently instructing the second DUT to execute the second test before executing the first test.

In another aspect, an article of manufacture is provided. The article of manufacture includes one or more non-transitory computer readable media having computer-readable instructions stored thereon that, when executed by one or more processors of a host computing device, cause the host computing device to carry out functions. The functions include: executing test infrastructure system software for testing a plurality of DUTs using a test suite having a plurality of tests to be executed by the plurality of DUTs, the plurality of DUTs including a first DUT and a second DUT, where the first DUT and the second DUT share a common design, and where the plurality of tests include a first test and a second test; determining to execute the first test before the second test on at least the first DUT; receiving first test results for a failing first test executed by the first DUT; determining, based on the first test results and based on the first DUT sharing the common design with the second DUT, to execute the second test before the first test on the second DUT; and subsequently instructing the second DUT to execute the second test before executing the first test.

In another aspect, a host computing device is provided. The host computing device includes: means for executing test infrastructure system software for testing a plurality of DUTs using a test suite having a plurality of tests to be executed by the plurality of DUTs, the plurality of DUTs including a first DUT and a second DUT, where the first DUT and the second DUT share a common design, and where the plurality of tests include a first test and a second test; means for determining to execute the first test before the second test on at least the first DUT; means for receiving first test results for a failing first test executed by the first DUT; means for determining, based on the first test results and based on the first DUT sharing the common design with the second DUT, to execute the second test before the first test on the second DUT; and means for subsequently instructing the second DUT to execute the second test before executing the first test.

BRIEF DESCRIPTION OF THE DRAWINGS

FIG. 2 includes block diagrams of software/hardware tests and one or more software images, in accordance with at least some example embodiments.

FIG. 18 is a flow chart of a method, in accordance with at least some example embodiments.

DETAILED DESCRIPTION

Figure 1:
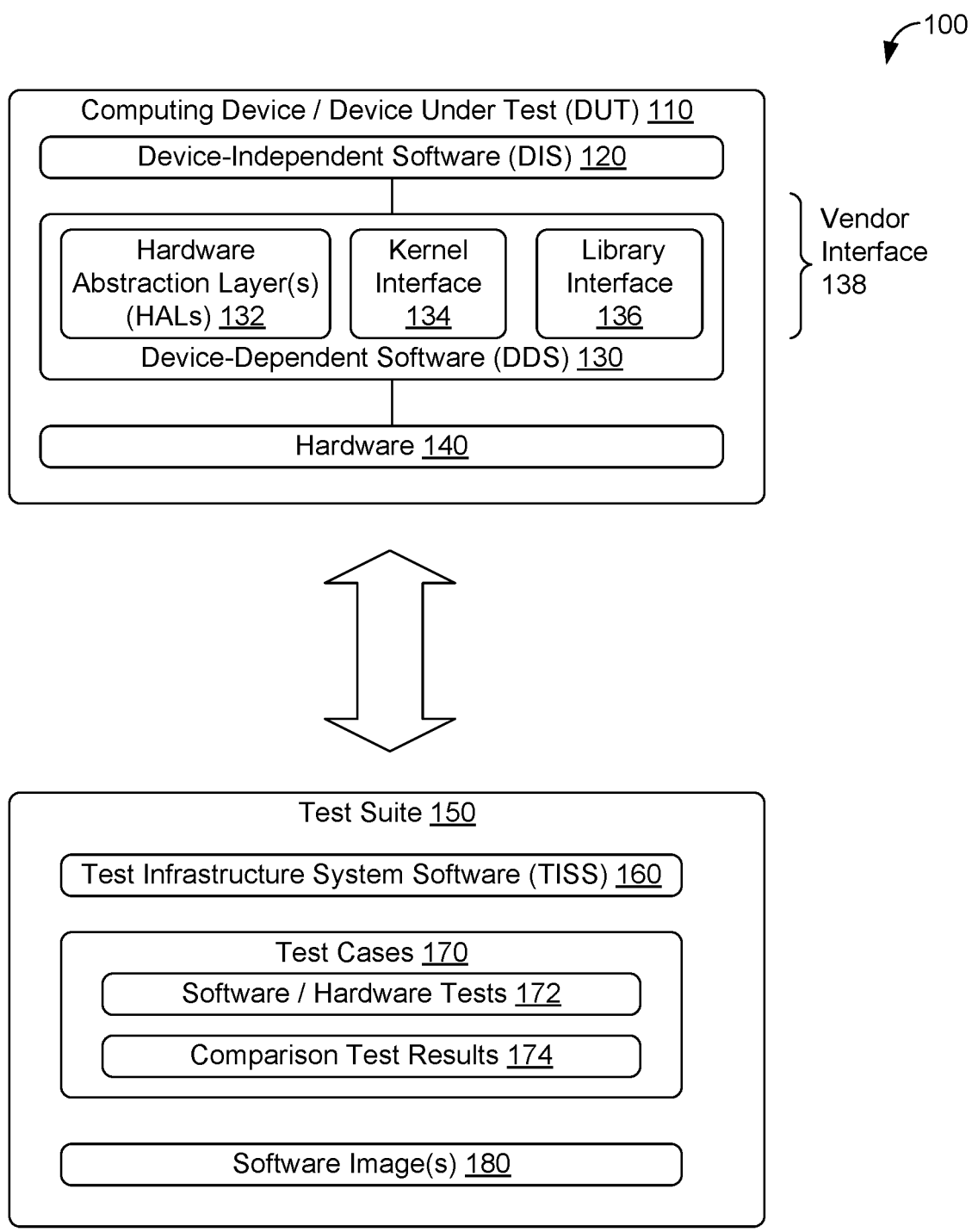
FIG. 1 depicts a system that includes a computing device acting as a device under test and a test suite, in accordance with at least some example embodiments.

Methods and apparatus are provided for distributed testing and verification of hardware and software of computing devices, such as mobile computing devices. For example, a computing device can be implemented to include device-independent software, such as operating system and hardware control software. Then, hardware and device-dependent software that are specific for the computing device can be designed and built to utilize the device-independent software. A designed computing device can be specifically implemented and/or modified to meet the requirements of one or more specific vendors, markets, communications providers, and/or sales channels. The implemented computing device can then be tested and ultimately approved for public release of the computing device. Such testing and approvals can include one or more types of testing and/or approvals, such as, but not limited to, compatibility testing and/or approvals, vendor-specific testing and/or approvals, general testing and/or approvals, and market-specific testing and/or approvals.

Each type of testing and/or approval can involve use of one or more test suites. A test suite can include one or more automated and/or manual tests for a device, expected results for the tests, and reference software and/or hardware (e.g., software images, specific hardware designs and/or components) used during testing/approval. A software image can include one or more files or other persistent representations of software and/or firmware configured for loading onto and execution by a computing device. One or more software images can be used to initialize and/or restore the computing device using a known software and/or firmware stored in the software image(s). Then, testing a computing device can involve first loading a software image with known software and/or software onto a computing device under test to ensure the computing device under test executes the known software and/or software during testing.

Sometimes, test suites, reference software, and/or hardware have defects. If the release cycle to fix defects in a test suite and/or reference software/hardware is N days (e.g., N=5, 10, 14, 15, 20, 30, or 60), then there can be a delay of up to N days from when a defect is manifest in an ecosystem of hardware and/or software implementers utilizing the defective test suite until the defect is fixed. For example, suppose a defect D1 is in a software image SI that manifests by causing at least a device under test (DUT) DUT1 to fail initializing/booting up. Since defect D1 in software image SI prevents DUT1 from booting, each up-to-N day delay waiting to correct defect D1 can lead to critical and costly delays, as well as potentially delaying introduction of devices utilizing software image SI.

Delays and human error can be also introduced by use of manual, rather than automated, processes. For example, use of a manual waiver process for granting exceptions for one or more failing hardware tests may not be workable in an ecosystem of hundreds or thousands of device-related entities, including device design and manufacturing entities such as original design manufacturers (ODMs) and silicon vendors (SVs), component manufacturing/designing entities, system integration entities, testing entities, software-related entities, and ecosystem coordination entities. An original design manufacturer can be a device-related entity that can generate one or more designs of a computing device and/or can manufacture computing devices as designed. A silicon vendor can be a device-related entity that manufactures computing devices based on their own and/or other entity's hardware and/or software designs.

The designs of the computing device can include hardware designs and/or software designs of the computing device. As an example, an original design manufacturer ODM1 can receive a specification of a device from another device-related entity DE1. Then, ODM1 can design and manufacture the device as specified by DE1. In some examples, ODM1 can design and manufacture devices based on internal, rather than external, specifications.

An ecosystem coordinator can be a device-related entity that develops and releases the device-independent software for an ecosystem of computing device hardware and software that utilizes the device-independent software. The ecosystem coordinator can also develop and release one or more test suites with one or more tests to verify functionality and/or compatibility of a particular computing device with the device-independent software and perhaps one or more computing devices and/or software applications that utilize the device-independent software. The ecosystem coordinator can determine whether to approve the particular computing device for use with other devices and software applications in the ecosystem based on performance of the particular computing device on the tests of the test suites.

Herein are provided apparatus and methods for accelerating and facilitating device approval, including but not limited to, triaging tests based on defects seen within an ecosystem of device-related entities. For example, a test suite can include tests that are continuously and automatically executed/deployed using test infrastructure system software (TISS) executing on a host computing device, where the test suite can include tests and related software images provided by a framework vendor (FV) to one or more device-related entities for a computing device being tested as a DUT. The test suite and/or host computing device can also include test results from reference hardware; e.g., using joint testing, software, and/or hardware branches of the test suite, software images, and/or hardware implementation. Then, some or all of the device-related entities can perform automatic, continuous testing using the TISS executing on the host computing device and/or the test suite and provide test results to the ecosystem coordinator using the host computing device. The ecosystem coordinator can review the test results from the device-related entities, and when the test results warrant, provide one or more approvals for a device to the device-related entities. In addition, the ecosystem coordinator can provide waivers for failing tests based on confirmed defects/faults in the test suite. In some of these examples, the framework vendor can act as the ecosystem coordinator.

Tests can be triaged, or reordered, omitted, and/or waived, based on a triaging algorithm. The triaging algorithm can receive test results from the device-related entities and determine one or more likely entities that are source(s) of error leading to failing test results. The triaging algorithm can apply one or more triaging criteria to determine the likely source(s) of error. Then, the triaging algorithm can triage tests on all DUTs associated with the likely source(s) of error. As additional test results are received at the triaging algorithm, the triaging algorithm can continue determining likely source(s) of error associated with failing tests and subsequently triaging tests on all DUTs associated with the likely source(s) of error, thereby dynamically adjusting what tests are run on different devices as test results are received.

An ecosystem coordinator can provide software, test suites, reference hardware, hardware and software developer support in building and testing hardware and software to enable the ecosystem to provide additional services/content beyond those provided by the ecosystem coordinator, support more and different kinds of devices throughout the ecosystem, and to attract more users to use devices associated with the ecosystem. By providing support for test suites and the TISS, the ecosystem coordinator can support distributed hardware (and software) verification to provide uniform testing, approvals, and waivers quickly to the device-related entities throughout the ecosystem, thereby enabling faster debugging, approval, and deployment of devices in the ecosystem.

In some examples, the computing device can utilize system software that has been divided into two portions: device-independent software (DIS) and device-dependent software (DDS), with a "vendor interface" between the device-independent software and the device-dependent software. The test suite can then include tests for the device-independent software and the device-dependent software, with a "vendor test suite" of tests that concentrate on the device-dependent software. In particular cases, the vendor test suite can include tests written by the ecosystem coordinator and executed by a device-related entity to support approval of device-dependent software and/or one or more specific hardware implementations of the computing device.

The vendor test suite can involve an extensive set of tests; for example, one such vendor test suite has more than 100 test modules with more than 5000 compliance tests and a larger optional set of quality tests. Such a large test suite takes a large amount of time and computations resources to execute, verify, and approve. Further, as devices evolve, tests, test modules, and interfaces change, leading to changes in testing and approval processes.

To better utilize testing time and effort, test execution times can be measured and reviewed to see where large amounts of execution time are utilized. A long duration test can then be optimized to reduce execution time, and revised tests with the optimizations can be provided as improved tests to the test suite. This process can be (continuously) repeated to optimize tests based on test execution time. A related approach can be used to optimize tests based on test coverage, and by using both approaches simultaneously, tests can be optimized to minimize test execution time while increasing test coverage, thereby leading to more efficient test with respect to test execution and coverage. To decrease test times, tests can be reviewed for possible parallelism (i.e., possible execution of a test on multiple devices having the same design and/or same implementation of a design) and then parallelizable portions and/or entire tests can be executed in parallel when multiple DUTs are available. In addition, tests, test modules, and/or test suites can be "sharded" or broken down into smaller executable portions to enable selection of specific tests and/or test modules. For example, a plurality of DUTs can be grouped into one or more test clusters at a testing facility, and the tests can be sharded to enable selection of execution of one or more specific tests and/or test modules on one or more specific DUTs and/or selection of execution of one or more specific tests and/or test modules on all DUTs of one or more test clusters.

Additional features can be provided by the TISS and/or host computing device to better support testers in carrying out testing efforts. For example, the TISS and/or host computing device can support re-execution of commands, which can in turn be edited, to enable repeated execution of the same and/or similar commands. Test results can be protected from tampering to ensure that approvals are based on accurate and actual test outcomes. Various outputs of the TISS and/or host computing device, such as test logs, can be provided in easy-to-read and/or condensed forms. Other such features to support testers are possible as well.

In some examples, one or more device-related entities can include proprietary and/or otherwise sensitive software as part of the device-dependent software. As such, the use of device-dependent software can enable separate ownership of device-independent software and device-dependent software. Further, laboratory space for testing sensitive device-dependent software and related devices using the herein-described TISS, host computing device, and test suites can be provided by an owner of the sensitive device-dependent software to reduce possible unintended disclosure of the device-dependent software. In addition, by using a common test suite for verification and approval of all designs and related implementations of the computing device, a designer and/or implementer can design and implement the computing device as they see fit as long as the tests of the test suite are passed, thereby leading to approval of the computing device.

In other examples, some "reference devices" can include reference hardware and/or software. For example, a reference device can have reference hardware and/or software can be hardware and/or software that has already been verified to be correct (e.g., under an earlier release of software) and/or can contain hardware and/or software designated as references (e.g., a system on a chip (SoC) device accompanied by a board support package and/or other turnkey software). In some of these other examples, different "non-reference" devices can have hardware and/or software other than reference hardware and/or software; e.g., an OEM device operating on a later release of software and/or a relatively-new version of hardware. Then, testing results of devices including reference hardware and/or software, particularly failing results, can affect triaging of tests for devices without the reference hardware and/or software. For examples, a test T_REF_FAIL that has been reported to fail on one or more devices REF_DEVS that include reference hardware and software can be omitted from execution by one or more other devices NEW DEVS that do not include the reference hardware and software. In some of these examples, the one or more other devices NEW DEVS can receive a waiver from executing test T_REF_FAIL until the test T REF FAIL passes on at least one of the REF_DEVS device(s).

The TISS (e.g., while executing on a host computing device) can provide faster device and test repairs, as testing results are more quickly propagated through an ecosystem of device-related entities that are testing DUTs related by common hardware and/or software; e.g., all of the DUTs in the ecosystem utilize the same device-independent software. The TISS can automate testing for hardware and software releases at the premises of a device-related entity and/or the premises of the ecosystem coordinator, and can enable real-time tracking of an approval status of a DUT. For device-related entities that are silicon vendors providing hardware to other device-related entities, the use of the TISS can speed delivery of fixes to software and/or tests for DUTs in the ecosystem, as all device-related entities utilizing the silicon vendor can use the TISS to obtain such fixes, and can use the TISS to speed approval and waiver processes conducted by the ecosystem coordinator. For device-related entities that are original design manufacturers, use of the host computing device and/or TISS can lead to fault localization among various implementations of a designed computing device, as well as speeding approval and waiver processes.

Table 1 below shows an example of propagating a fix of a test throughout an ecosystem prior to the use of the TISS/host computing system over a seven-day interval.

TABLE 1

| | |
|---|---|
| Day 0 | A silicon vendor SV1 releases a board support package (BSP) to one or more original design manufacturers ODM1, ODM2 . . . ODMn. |
| Day 1 | SV1 finds a bug in a test T1 and reports the bug to the ecosystem coordinator. |
| Day 2 | The ecosystem coordinator fixes test T1 and starts internal testing of the test T1 - such internal testing takes 5 days (until Day 7). |
| Days 2-6 | The ODMs ODM1, ODM2 . . . ODMn report the same bug in test T1 to the ecosystem coordinator. |
| Day 7 | After internal testing is completed, the ecosystem coordinator releases the fixed test T1 to SV1 and ODM1, ODM2 . . . ODMn. |

Table 2 shows a similar example of propagating the same test fix throughout the ecosystem using the TISS/host computing system over a three day interval—four days shorter than the example shown in Table 1.

TABLE 2

| | |
|---|---|
| Day 0 | Silicon vendor SV1 releases a BSP to original design manufacturers ODM1, ODM2 . . . ODMn. |
| Day 1 | SV1 finds a bug in a test T1 and reports the bug to the ecosystem coordinator. |
| Day 2 | The ecosystem coordinator fixes test T1 and uses TISS to release the fix to test T1 to the ecosystem. |
| Days 2-3 | SV1's test lab downloads the fix to test T1 via TISS shortly after release and confirms the fix to test T1 automatically. |
| Day 3 | ODM1, ODM2 . . . ODMn use the fix to test T1 automatically without discovering that test T1 had a fault. |

As illustrated by the example shown in Tables 1 and 2 above, the use of the TISS can speed propagation of fixes and reduce wasted efforts and time in executing tests that have been fixed but are not yet released to the ecosystem, such as occurred during Days 2-6 in Table 1.

The host computing device, TISS test suite, and/or device-independent software can include features to enable distributed testing and approval; e.g., to enable device-related entities to execute tests, such as tests of the vendor test suite, to their implementation(s) and design(s) of the computing device. The tests can be improved to improve compatibility test coverage. Further, laboratory space provided by the ecosystem coordinator and/or one or more device-related entities can include one or more DUTs and host testing systems using the TISS on the host computing device to automate test execution. The use of device-dependent software and the testing thereof can increase parallelism in testing computing devices, by allowing multiple device-dependent software designers and/or implementers to test their devices, design, and/or implementations independently/in parallel. Further, tests in the test suite can be selected to verify that device-independent-related features of the vendor interface and device-dependent software are fully tested, to allow for robust system testing, and in some cases, backwards compatibility.

Accelerated Computing Device Approvals

Turning to the figures, FIG. 1 depicts system 100 that includes computing device 110 acting as a device under test and test suite 150, in accordance with at least some example embodiments. Computing device/DUT 110 can include device-independent software 120, device-dependent software 130, and hardware 140. Device-independent software 120 can include framework software, such as an operating system, which can include kernel software, a runtime environment, one or more frameworks for one or more software languages (e.g., Java, Python, etc.), software in one or more software libraries that provide library functionality, and system applications.

Device-dependent software 130 can include one or more hardware abstraction layers (HALs) 132, kernel interface 134, and library interface 136. A HAL can provide a set of interfaces for creating software hooks between the device-independent software and user-level hardware drivers (e.g. a camera driver, a Bluetooth™ driver).

In some examples, HALs 132, kernel interface 134, and library interface 136 can be part or all of vendor interface 138, which is an interface between device-dependent software 120 and device-dependent software 130. The one or more HALs 132 can include hardware abstraction layers for hardware components of computing device 110, such as, but not limited to, audio components, communications (e.g., Bluetooth™, Wi-Fi™, etc.) components, cameras/video components, sensor components. Kernel interface 134 can provide software and/or related data for communicating with device-independent software 120; e.g., communicating with the operating system and/or kernel. Library interface 136 can provide software and/or related data for utilizing library functionality of one or more software libraries of device-independent software 120 and/or other software libraries.

Test suite 150 can include test infrastructure system software/TISS 160, test cases 170, and one or more software images 180. TISS 160 can include software for performing the functionality of herein-described test infrastructure system software/TISS, including, but not limited to, functionality for: coordinating and executing tests on one or more DUTs, receiving test results from the one or more DUTs, determine whether tests pass or fail using comparison test results 174, and/or communicate test-related information, including but not limited to tests and test results, with one or more other computing devices, such as computing device(s) associated with the ecosystem coordinator.

For instance, TISS 160 can provide an infrastructure for testing hardware and software of one or more DUTs. For example, TISS 160 can enable automatic testing of the device-independent and/or device-dependent software of the DUTs. In some examples, TISS 160 can execute on a host computing device that is networked with the DUTs (i.e., the host computing device is in the cloud and/or providing a testing platform as a service). In other examples, the host computing device is co-located with the DUTs at a testing facility; e.g., testing is performed using an on-premises model. In particular of these examples, software images are generated/built at the testing facility, while in other particular of these examples, a cloud testing computing device is co-owned by a testing entity that owns, designs, and/or implements one or more DUTs. In still other examples, tests, test suites, testing-related software (e.g., the TISS), and software images (e.g., images of device-independent software) can be (continuously) downloaded and/or tested using TISS 160 and/or test results can be (continuously) uploaded using TISS 160 and/or other software (e.g., a testing "front end" or user interface that enables access to and/or by the ecosystem coordinator).

Test cases 170 include software/hardware tests 172 and related comparison tests results 174. Software/hardware tests 172 can include one or more tests designed to verify one or more aspects of DUT 110, including but not limited to, aspects of DUT 110 related to device-independent software 120, device-dependent software 130, and/or hardware 140.

Comparison test results 174 can include results generated by executing and/or simulating execution of some or all software/hardware tests 172. For example, some or all of comparison test results 174 can be test results obtained from running or one or more of software/hardware tests 172 on one or more reference computing devices executing some or all of the software included in software images 180.

Comparison test results 174 can be used to determine correctness or failure of a test executed by DUT 110. For example, suppose test T1 has a comparison test result of R1 in comparison test results 174. Then, suppose two DUTs DUT_A and DUT_B execute test T1. The output, or result, of executing test T1 on respective DUTs DUT_A and DUT_B can be saved as respective test results TR_A and TR_B. If a comparison of TR_A (or TR_B) with R1 shows that TR_A (or TR_B) equals or is otherwise equivalent to R1, then the comparison of TR_A (or TR_B) with R1 indicates DUT_A (or DUT_B) passes test T1. However, if a comparison of TR_A (or TR_B) with R1 shows that TR_A (or TR_B) does not equal or is otherwise not equivalent to R1, then the comparison of TR_A (or TR_B) with R1 indicates DUT_A (or DUT_B) fails test T1. Many other examples of test results, comparison test results, and determining equality/equivalency of test results are possible as well.

Software images 180 can include binary and/or other representations of software to be executed by a DUT during testing. These representations of software can include, but are not limited to, compiled versions of part or all of device-independent software 120 and/or device-dependent software 130. In some examples, the ecosystem coordinator can provide part or all of the content of test suite 150; that is, part or all of TISS 160, test cases 170 and/or software image(s) 180. In particular of these examples, the ecosystem coordinator can provide TISS 160, test cases 170, and software image(s) for device-independent software 120, while another entity can provide software image(s) for device-dependent software 130.

FIG. 2 includes block diagrams of software/hardware tests 172 and software image(s) 180, in accordance with at least some example embodiments. As mentioned above, software/hardware tests 172 and software image(s) 180 can be part of test suite 150. Software/hardware tests 172 can include compatibility test suite tests 210, vendor test suite tests 212, and device-dependent tests 214.

Compatibility test suite tests 210 can include one or more tests designed to determine "compatibility" of software and hardware of the DUT with other software and/or hardware in an ecosystem of devices that can operate using device-independent software 120 and/or device-dependent software 130. Compatibility test suite tests 210 can include one or more tests designed to be integrated into the daily workflow (such as during test driven development) while building and testing a DUT. Compatibility test suite tests 210 can include one or more tests for testing: particular units of code and/or data (e.g. a particular class) of the device-independent software 120 and/or device-dependent software 130, one or more application programming interfaces (APIs) of the device-independent software 120 and/or device-dependent software 130 (i.e., by carrying out one or more use cases that exercise the API(s) under test), reaction/durability of a DUT under stress, and/or performance of the DUT, such as in comparison to one or more benchmark values. Other tests of compatibility test suite tests 210 are possible as well. In some examples, software/hardware tests 172 do not have any compatibility test suite tests 210

Vendor test suite tests 212 can include one or more tests designed to verify expected functionality of a vendor interface; e.g., vendor interface 138 between device-independent software 120 and device-dependent software 130. In some examples, vendor test suite tests 212 can include tests for verifying expected functionality of one or more aspects of one or more HALs, one or more libraries, and/or an operating system of the DUT. In other cases, vendor test suite tests 212 can include one or more tests to verify security-related aspects of the HALs and/or operating system of the DUT. In some examples, software/hardware tests 172 do not have any vendor test suite tests 212

Device-dependent tests 214 can include one or more tests designed to verify expected performance of one or more aspects of a particular design, a particular implementation, one or more particular functions, one or more particular components, and/or other particular aspects of a DUT. These aspects may be design-related entity specific. In some examples, some or all of device-dependent tests 214 are written by one or more design-related entities other than the ecosystem coordinator. In other examples, software/hardware tests 172 do not have any device-dependent tests 214

Software image(s) 180 can include one or more device-independent images 230 and one or more device-dependent images 240. Device-independent images 230 can include one or more generic system images (GSIs) 232 and one or more kernel/boot images 234. Device-dependent images 240 can include one or more device images 242 and one or more device-related entity specific images 244.

Generic system image(s) 232 can include one or more software images of a known release/version of device-independent software 120. Kernel/boot image(s) 234 can include one or more software images for initializing/booting a computing device, such as a DUT. In operation, a computing device, such as a DUT, can use kernel/boot image(s) 234 to boot/initialize the computing device, and as part of a boot/initialization sequence, software from generic system image(s) 232 can be loaded onto the computing device to initialize and/or restore the DUT to the known release/version of device-independent software 120. For example, kernel/boot image(s) 234 can be used to perform a boot/initialization of the computing device by (a) restarting the computing device and (b) starting to execute software at a particular location in memory which can (c) load into a memory of the computing device from a fixed location in persistent storage (e.g., a fixed file system location/name) and/or from an auxiliary persistent storage device (e.g., a flash drive, a compact disc), and (d) after loading is complete, start executing the loaded software. Then, if software from generic system image(s) 232 is stored at the fixed location in persistent storage or is stored on the auxiliary persistent storage device, the software from generic system image(s) 232 can be loaded during the boot.

Device-related entity specific images 244 can include one or more software images for device-dependent software 130. In some examples, software from device-related entity specific images 244 can be loaded during a boot/initialization sequence in a similar fashion as software is loaded from generic system image(s) 232. In other examples, software in device-related entity specific images 244 is merged with software of generic system image(s) 232; i.e., there is one (or one set of) image(s) for both device-independent software 120 and device-dependent software 130. In still other examples, generic system image(s) 232 are created by and/or maintained by one device-related entity, such as the ecosystem coordinator, and device-related entity specific images 244 are created by and/or maintained by a different device-related entity, such as an original design manufacturer or silicon vendor.

Figure 3:
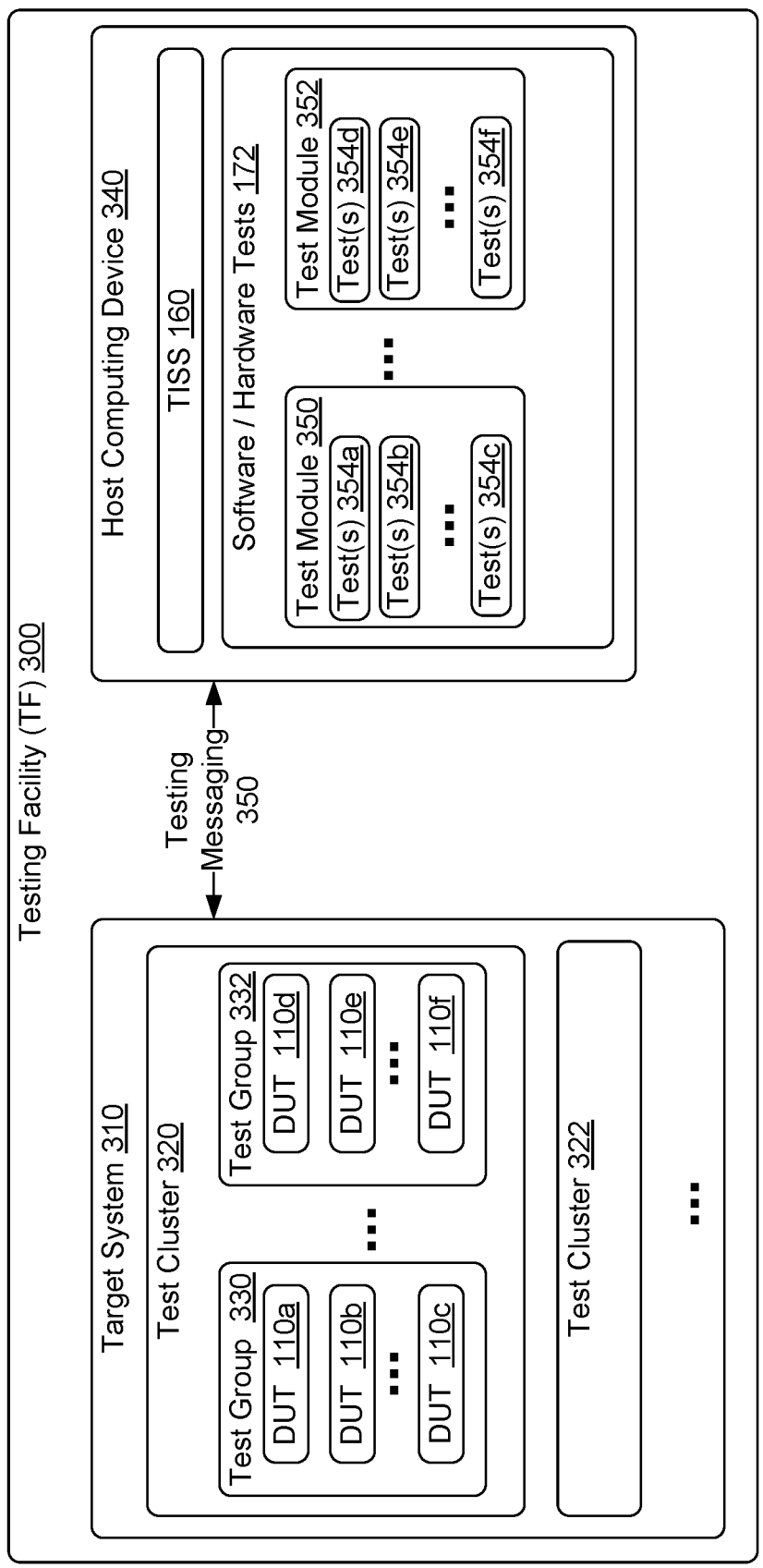
FIG. 3 is a block diagram of a testing facility, in accordance with at least some example embodiments.

FIG. 3 is a block diagram of testing facility (TF) 300, in accordance with at least some example embodiments. Testing facility 300 includes target system 310 and host computing device 340. Target system 310 includes one or more test clusters 320, 332. A test cluster can include one or more test groups of DUTs, and each test group can include one or more DUTs. For example, test cluster 320 includes at least two test groups 330, 332, where test group 330 includes at least three DUTs 110a, 110b, 110c, and where test group 332 includes at least three DUTs 110d, 110e, 110f. Other examples of test clusters, test groups, and target systems at testing facility 300 are possible as well. For example, testing facility 300 can include multiple target systems.

In some examples, target system 310 can include one or more test-assistance devices used for testing DUTs. For example, a test-assistance device can have a reference device, a DUT, and a camera. Then, to test a display of the DUT, both the DUT and the reference device can be instructed to show an image or other pre-determined display, and the camera of the test-assistance device can be used to capture images of the pre-determined display as provided by the DUT and/or the reference device for comparison, verification of the display, and/or for other reasons.

Host computing device 340 can include one or more computing devices which include one or more instances of test infrastructure system software 160 and one or more software/hardware tests 172. In the example shown in FIG. 3, host computing device 340 has software/hardware tests 172 organized into test modules 350, 352. Each test module 350, 352 can include one or more tests of software/hardware tests 172; for example, test module 350 has at least three tests 354a, 354b, 354c, and test module 352 has at least three tests 354d, 354e, 354f. Other examples of host computing device(s) 340 are possible as well. In some examples, testing facility 300 is a virtual testing facility; e.g., host computing device 340 is not co-located with target system 310. In particular, host computing device 340 can be a networked/cloud device providing testing as a service for DUTs in target system 310 (and perhaps other target systems).

To ensure test coverage, such as test coverage of the vendor interface and/or device-dependent software, software/hardware tests 172 can include tests that cover device-independent-related features, such as HALs and features that span multiple DUTs. Some of the tests in the test suite can be automatically generated, such as "fuzz tests". Fuzz testing or fuzzing involves input of random and/or otherwise generated data, called "fuzz", to the DUT. For an example of non-random fuzz testing, one or more fuzz tests can be used test values within a range of values.

For example, if a speaker or other sound output device SD of a DUT, can produce outputs having a range between A and B dB, B<A, then a set of m fuzz tests FT1, FT2, ... FTm could involve setting a volume setting to a respective volume level L1(=A), L2>L1, Lm(=B), causing a sound to be output by SD, and measuring the resulting output sound level to have the an actual output volume corresponding to the volume setting. Many other fuzz tests are possible and/or can be automatically generated as well. The tests in the test suite can be generated using a systematic methodology to test and/or find dependencies between layers of software, between HALs, between devices on the DUT, and/or other dependencies.

In some examples, fuzz tests can be generated using a "fuzzer" tool. In particular, the fuzzer tool can use HIDL annotations for fuzzing based on complex support for HIDL syntax (e.g., syntax of HIDL for nested interfaces, message queues, and/or HIDL memory)—such fuzz tests can be used to test call flow, API blacklisting, and multi-DUT scenarios, among others. The fuzzer tool can be used as part of a fuzz testing infrastructure that can exclude redundant and/or similar failures to those previously experienced, while continue to explore new cases, including new failure cases, to ensure (more) complete test coverage.

Tests of software/hardware tests 172 can be developed and executed to find dependencies between a DUT and software (e.g., device-dependent software and/or device-independent software); i.e., during hardware initialization and/or a boot of the DUT. Static analysis of software can be used in generating dependency and/or other tests. For example, a script can be executed to parse test case code to generate tests for identifying system calls that can indicate one or more boot dependencies.

In some cases, a test driven development (TDD) methodology can be used in producing software for one or more DUTs in target system 310. This methodology can lead to new and/or improved testing and/or additional tests in software/hardware tests 172 for verifying HALs and/or related hardware interface definition language (HIDL) products, integrity checking, device-independent software (e.g., kernel software, operating system software), development kit software, complex data types, message queues, shared memory, fuzz tests, application binary interface(s) (ABIs), vendor interfaces, and/or other software. Some of these tests can utilize record-and-replay testing; that is, a set of inputs is stored or "recorded" and later used or "replayed' during test execution. (~5% gain as compared with structural tests in multiple HALs). Other tests can introduce failures in one or more HALs to ensure other software and/or hardware systems are not (overly) adversely affected.

Target system 310 and host computing device 340 can use testing messaging 350 to cooperatively test one or more devices under test of target system 310; for example, to obtain compatibility or other certifications of the device(s) under test. In some cases, testing messaging 350 can include testing commands and/or other instructions sent from host computing device 340 to target system 310 and test results/reports sent from target system 310 to host computing device 340.

Testing commands can include one or more commands to execute one or more tests, test modules, and/or test suites one or more DUTs of target system 310. An example test command to execute a specific test module is "run vts-m <module name>" where "vts" refers to the vendor test suite, and "<module name> is a name for the specific test module. Another example test command to execute one or more specific tests is "run vts-kernel-m VtsKernelOStp-t <testname1,testname2, ... >" where "vts-kernel" refers to kernel tests in the vendor test suite, "VtsKernelOStp" refers to a test module for the operating system (OS) test project, and "testname1" and "testname2" refer to specific tests in the VtsKernelOStp test module. Other possible selections and/or formats of specific tests, test modules, DUTs, test clusters, and/or testing commands are possible as well.

As another example, an operating system operating on one or more DUTs of target system 310, such as the SELinux operating system, can be used to aid in testing. For example, the operating system can generate log files, such as audio log files, that can be monitored by TISS 160 and/or host computing device 340. The operating system can provide security policies that can be audited and/or updated during testing and can be used to find dependencies between the hardware and software of the DUT. The operating system can generate violations and/or exceptions during testing that can help identify failing software and/or hardware—if such a violation and/or exception is observed during testing, the test can be considered to have failed, and as such lead to a resolution involving fault repair in the hardware and/or software of a failing DUT of target system 310 and/or rewriting of the failing test.

The operating system can support monitoring access to one or more APIs, including but not limited to, vendor interface APIs (e.g., procfs, sysfs, dev/). In some cases, the operating system can run in a secure computing mode (seccomp) which enables monitoring of system calls during testing. In some examples, one or more tests can cause the operating system to run in the secure computing mode during part or all of the test(s). In other examples, the operating system can be initialized to run in the secure computing mode throughout part or all of a testing session where one or more tests are run; e.g., execution of the operating system in the secure testing mode can be a precondition for starting the testing session. In still other examples, TISS 160, host computing device 340, and/or the operating system can provide support for post-processing and continuous monitoring and/or filtering of system calls and/or other operating system supported features of a DUT of target system 310.

Figure 4:
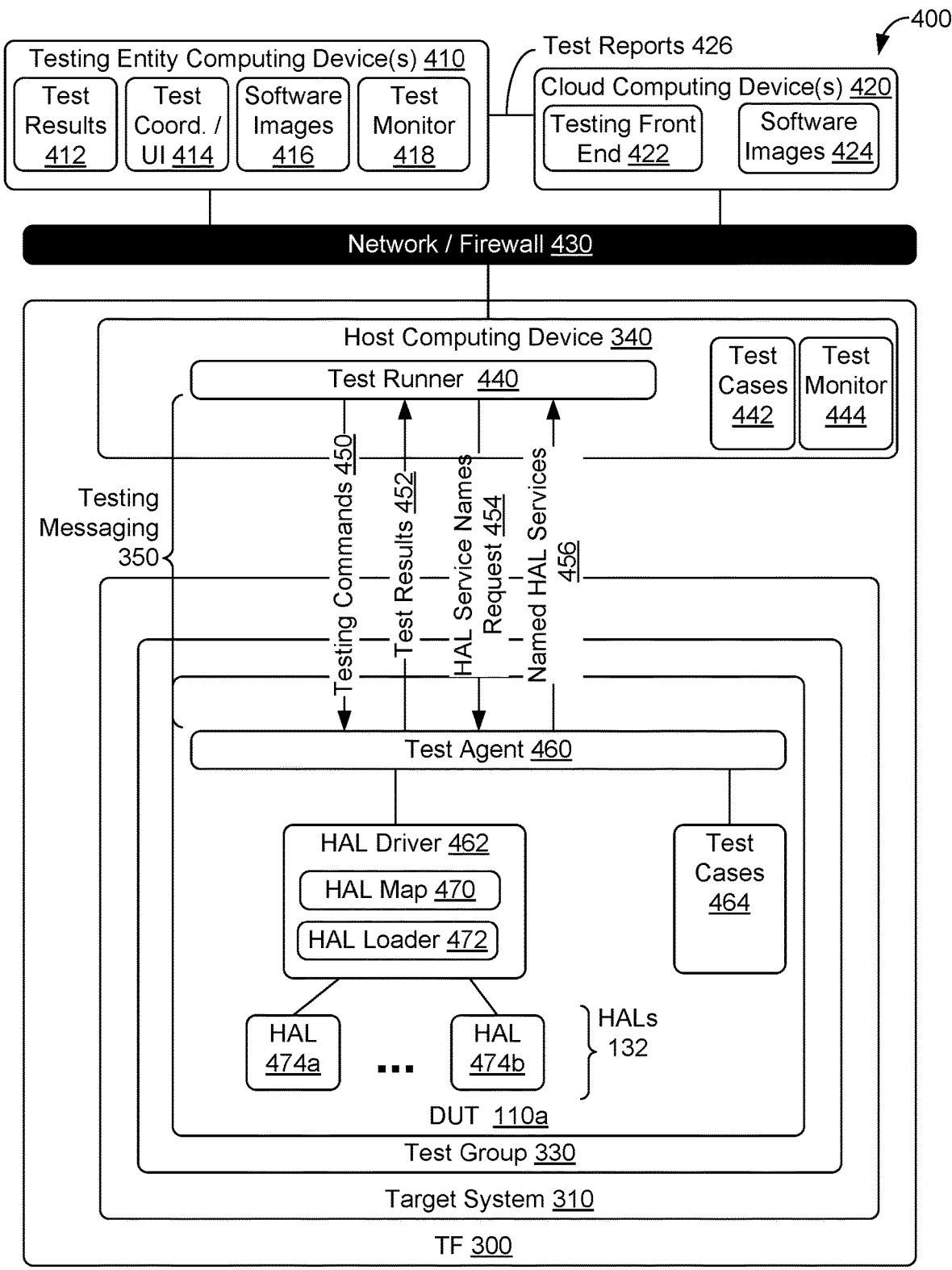
FIG. 4 is a block diagram of a testing system, in accordance with at least some example embodiments.

FIG. 4 is a block diagram of testing system 400, in accordance with at least some example embodiments. Testing system 400 includes one or more testing entity computing devices 410, one or more cloud computing devices 420, and testing facility 300, all communicatively coupled using network/firewall 430.

Testing entity computing devices 410 can include one or more computing devices that include and/or store test results 412, test coordinator/user interface 414, one or more software images 416, and test monitor 418. Test results 412 can include one or more results of tests executed on DUTs at testing facility 300 and/or other test results. For example, test results 412 can be results of tests included in test suite 150.

Test coordinator/user interface 414 can include software and/or hardware for controlling testing activities, such as, but not limited to, scheduling tests to be executed by one or more DUTs (e.g., the DUTs at testing facility 300), obtaining, maintaining, and/or removing software images 416, loading software images onto the one or more DUTs, and obtaining, maintaining, reporting, and/or removing test results 412 received from the one or more DUTs. Test coordinator/user interface 414 can also include software and/or hardware for displaying test results, test reports, information about testing activities, DUT status (e.g., software and/or hardware available on a DUT, whether or not a DUT is available for testing, an indication of a test (or tests) being run on a DUT), and/or other information. For example, test coordinator/user interface 414 can provide a dashboard providing information about and/or controls for about one or more testing activities and/or a display of one or more notifications related to testing activities.

Software images 416 can include one or more software images for testing DUTs, including but not limited to images of device-independent software 120 and/or device-dependent software 130. In some examples, images of device-independent software 120 can be generated by the same device-related entity and/or at the same geographical location as where images of device-dependent software 130 were generated. In other examples, images of device-independent software 120 can be generated by a different device-related entity and/or at a different geographical location than where images of device-dependent software 130 were generated.

Test monitor 418 can direct and observe execution of one or more tests by one or more DUTs, perhaps as instructed by test coordinator/user interface 414. In the example shown in FIG. 4, test monitor 418 can cooperate with test monitor 444 on host computing device 340 to direct and observe execution of tests at testing facility 300. In some examples, test execution can be continuous; i.e., when one test of a group of tests is completed, the next test in the group of tests is executed as soon as possible after test completion. In other examples, test monitor 418 can communicate and/or generate/build some or all of software images 416; e.g., for use in setting up for and/or executing tests.

Cloud computing devices 420 include one or more computing devices that include and/or store testing front end 422 and one or more software images 424. Cloud computing devices 420 can provide computing support, testing software, and software images for testing activities of testing system 400. Testing front end 422 can provide a user interface for receiving (uploading) test results from testing facility 300 and/or testing entity computing devices 410 at cloud computing devices 420, for sending (downloading) some or all images of software images 424, and/or for viewing one or more testing statuses of one or more tests, DUTs, designs, implementations, features, components, etc., where a testing status can indicate approval, failure, waiver (e.g., of a test that is currently under development/repair), and/or other status values. In some examples, testing front end 422 can provide more, less, and/or different functionality; e.g., enable uploading of tests and/or software images for testing and/or debugging.

FIG. 4 shows that testing facility 300 includes host computing device 340, which in turn includes test runner 440, test cases 442, and test monitor 444. Testing facility 300 also includes target system 310, which has test group 330. FIG. 4 depicts DUT 110a of test group 330 with test agent 460, HAL driver 462, and test cases 464. HAL driver 462 includes HAL map 470 and HAL loader 472 and can communicate with one or more HALs 132, including but not limited to, HALs 474a, 474b.

Test runner 440 can include host-side software executing on host computing device 340 that can process test logic and communicate with one or more target-side test components (e.g., DUT 110a) to send testing commands 450 to the target-side test component(s) and get test results 452 from the target-side test component(s). Test cases 442 can include one or more tests to be executed on DUTs at testing facility 300; e.g., DUT 110a. Test monitor 444 can cooperate with test monitor 444 on host computing device 340 to direct and observe execution of tests at testing facility 300, as discussed above in the context of test monitor 418. In some examples, TISS 160 of host computing device 340 can include test runner 440, test cases 442, and/or test monitor 444.

Test agent 460 can include target-side software executing on a DUT, e.g., DUT 110a, for relaying commands, test results, and/or other communications between test runner 440 and one or more HAL drivers, including HAL driver 462. HAL driver 462 can include target-side software executing on the DUT implementing a daemon that exercises one or more target HALs; e.g., one or more of HALs 132, which include HALs 474a 474b. HAL driver 462 can load multiple HAL instances using HAL loader 472 and maintain information, such as HAL map 470, for each target HAL, where the information can include an instance pointer with a unique HAL instance identifier (ID). HAL driver 462 can pass the HAL instance ID to test runner 440 so that test runner 440 can use the HAL instance ID to select a HAL for interaction via one or more HAL remote procedure calls.

DUT 110a can also include test cases 464 that include one or more tests for execution on DUT 110a. In some examples, test cases 442 on host computing device 340 can differ from test cases 464 based on a computer language associated with the test cases, such as test cases 442 being associated with the Python and Java computer languages and test cases 464 being associated with the C and C++ computer languages.

Host computing device 340 and target system 310 can communicate using testing messaging 350, as mentioned above. In the example of testing system 400, testing messaging 350 includes: testing commands 450 sent from test runner 440 executing on host computing device 340 to test agent 460 executing on DUT 110a; test results 452 sent from test agent 460 to test runner 440; HAL service names request 454 sent from test runner 440 to test agent 460; and named HAL services 456 sent from test agent 460 to test runner 440. In other examples, more, less, and/or different testing messaging 350 can be communicated between host computing device 340, test runner 440, test agent 460, DUT 110a, and/or target system 310.

Testing commands 450 can be sent from test runner 440 to instruct test agent 460 to execute one or more tests; e.g., one or more tests of test cases 442 and/or test cases 464. In response to testing commands 450, test agent 460 can send test results 452 to test runner 440 with some or all of the results of tests commanded for execution by testing commands 450.

HAL service names request 454 can be sent by test runner 440 to determine all service names of one or more HALs of a DUT; e.g., DUT 110a via test agent 460. A HAL can have multiple instances and each of those instances can be named with a service name. Then, HAL service names request 454 can be used to determine all of the service names, or the names of all instances, of one or more HALs. In response to HAL service names request 454, test agent 460 can send named HAL services 456 with a list of the requested service names.

For example, a test T1 can be executed on DUT 110a and corresponding test results TR1 can be communicated as part of testing messaging 350 from DUT 110a to host computing device 340. Host computing device 340 can then communicate test results TR1 to testing entity computing devices 410 via network/firewall 430 for storage of TR1 as part of test results 412 and/or uploading to cloud computing devices 420. When test results TR1 are uploaded to cloud computing devices 420, cloud computing devices 420 can analyze test results TR1 and determine a testing status for a test T1 with respect to DUT 110a, a testing status of DUT 110a, a testing status of a design of DUT 110a, a testing status of an implementation of 110a, and/or a testing status one or more features and/or components associated with DUT 110a.

In some cases, test suite 150 includes HAL tests for HAL validation and verification. Some HAL tests involve complex testing scenarios. For example, some testing scenarios involving testing multiple HALs of HALs 132 to validate correct behavior across the multiple HALs As another example, multiple HALs of HALs 132 can be tested to see how DUT 110a behaves under various stressed conditions, such as having less memory than another (more modern) device designated as reference hardware and/or otherwise determined to be a device of interest.

Testing combinations of multiple HALs can be time consuming given that each HAL of HALs 132 can have multiple instances running on DUT 110a (e.g., due to multiple possible hardware configurations of DUT 110a). All possible combinations of HAL instances can be tested to completely test DUT 110a. Testing combinations of HALs, including various HAL instances can be performed using test infrastructure system software that includes test runner 440.

Host computing device 340 can use TISS 160, including test runner 440, to perform testing of DUTs using target-side binaries for multi-HAL testing. For example, the host computing device 340 can execute tests involving one or more target-side binary images for one or more corresponding HALs on a target device and process subsequent test results for verification. In addition, host computing device 340 can use augmented target-side tests that register HALs under test of HALs 132, so that the augmented tests can later be used for automatic (or manual) testing for HAL instances.

Host computing device 340 can also use TISS 160 to perform host-side testing, which can provide finely calibrated testing control and support for multi-DUT testing. Regarding finely calibrated testing control, the host computing device can allow a user (such as a device tester) to interact with multiple target HALs of HALs 132 and validate their behaviors at an API level. Host computing device 340 can also allow specification of additional host-side control/monitoring logic during the test execution. Regarding support for multi-DUT testing, host computing device 340 can enable testing of even more complicated scenarios involving multiple DUTs (e.g., peer-to-peer communication among devices). In some of these scenarios, the host computing device can coordinate activities between the multiple DUTs.

For example, suppose a list of n (n>0) target HALs H1, H2 . . . Hn are exercised/tested as part of testing collaborative functions of a device under test DUT1. Each HAL H1, H2 . . . has one or more instances running on DUT1; e.g., HAL H1 has N1 (N1>0) instances running on DUT1, H2 has N2 (N2>0) instances running on DUT1, . . . and HAL Hn has Nn (Nn>0) instances running on DUT1. For a complete test of DUT1 in this example, all combinations of the HAL instances are to be tested, i.e., there are $\Pi_{i=1}^{n} N_i$ different combinations to be tested. In this scenario, n=2, where HAL H1 has N1=2 instances with corresponding service names of H1A and H1B, and where HAL H2 has N2=3 instances with corresponding service names of H2A, H2B, and H2C.

For this scenario, there are $\Pi_{i=1}^{n} N_i$=6 different combinations of HAL instances to be tested: (1) H1A, H2A; (2) H1A, H2B; (3) H1A, H2C; (4) H1B, H2A; (5) H1B, H2B; and (6) H1B, H2C. Host computing device 340 can use TISS 160 to support automatic testing against some or all different HAL instance combinations. For example, host computing device 340 and TISS 160 can: (a) pre-process each test of a set of tests to determine all target HALs used in the set of tests, where the target HAL information can be obtained from a test or a test runner; (b) obtain all the available service names of each of the target HALs at runtime, where the service names can be obtained by querying one or more HAL registration servers for service names corresponding to HAL instances used at runtime; (c) compute all combinations of service names for the target HALs used in the set of tests; and (d) execute each test in the set of tests against each combination of service names.

As indicated above, the combinations of HAL instances can grow to be very large when many HALs are targeted and/or if one or more HALs have many instances. So, the host computing device and TISS can determine a parameter K, perhaps as user input, where K<n. Then, to reduce/optimize the number of tests, full combinations are tested for K of the n HALs; and only one combination is chosen for the remaining (n−K) HALs. Selection of K can be based on a spectrum of optimization techniques that select K based on a tradeoff between testing runtime/resources (indicating a smaller value for K) and testing coverage (indicating a larger value for K)

Host computing device 340 and TISS 160 can provide robust and reliable testing of DUTs with one or more HALs, as well as APIs for a test developer to interact with one or more target HALs and other aspects on a target device such as DUT 110a to reduce (or eliminate) developer effort regarding loading and communication of tests and related images. Further, for multi-HAL testing, host computing device 340 can automatically perform tests against all combinations of HAL instances, or, if desired, a parameter-based subset of the HAL instances.

In some cases, testing facility 300, testing entity computing devices 410, and cloud computing devices 420 are under the control (e.g., owned and/or operated) by one device-related entity, such as the ecosystem coordinator. In other cases, testing facility 300 and testing entity computing devices 410 are under the control of a first device-related entity, such as a silicon vendor or original device manufacturer, and cloud computing devices 420 are under the control of a second different device-related entity, such as the ecosystem coordinator or another device-related entity. In still other cases, testing entity computing devices 410, and cloud computing devices 420 are under the control (e.g., owned and/or operated) of three different device-related entities. Other cases are possible as well; e.g., cases of control where a testing facility is being used by multiple device-related entities.

Figure 5:
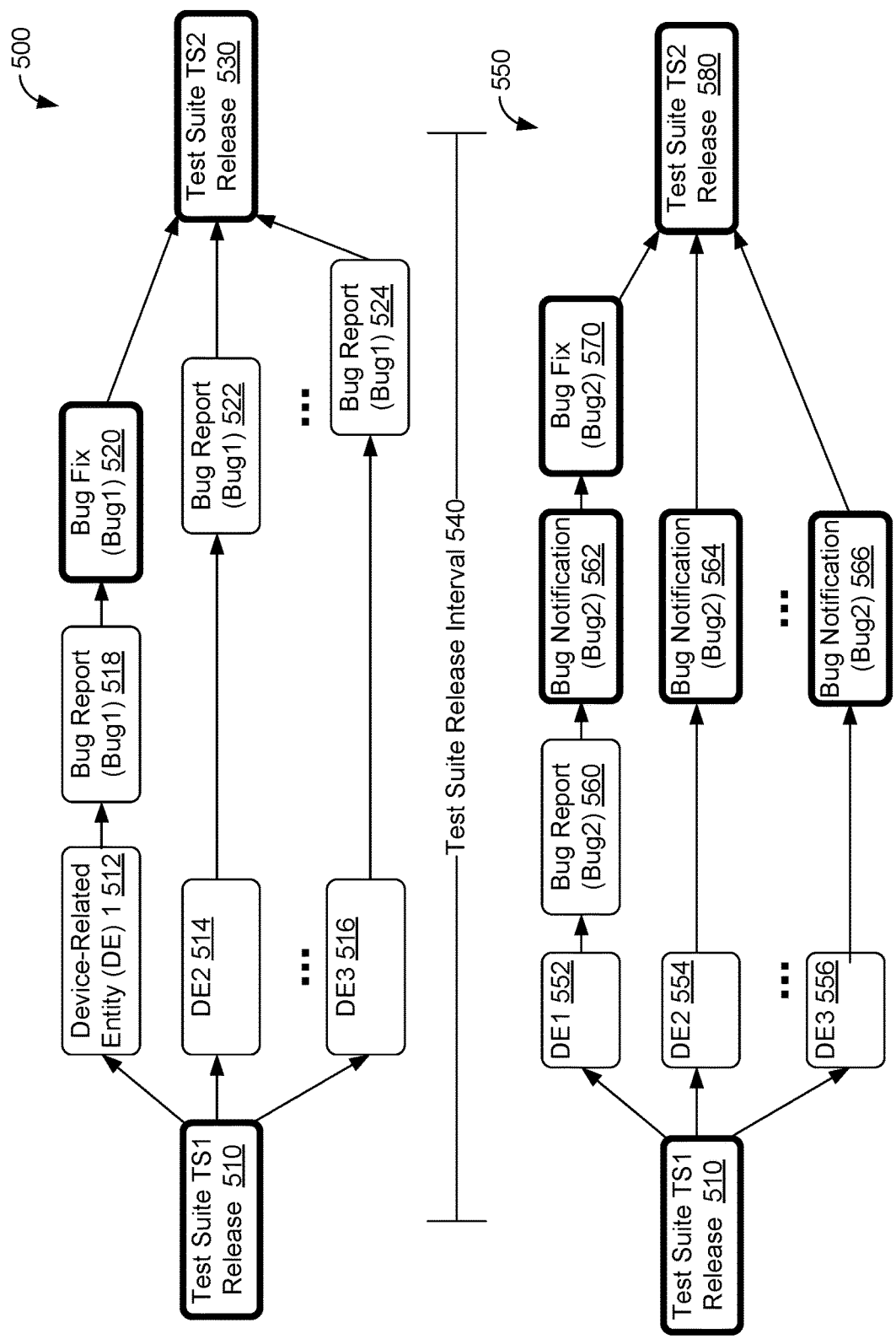
FIG. 5 shows two scenarios of releases of test suites over an interval of time, in accordance with at least some example embodiments.

FIG. 5 shows two scenarios 500, 550 of releases of test suites over an interval of time, in accordance with at least some example embodiments. Aspects of scenarios 500, 550, and 600 mainly related to the ecosystem coordinator are shown in boxes with relatively-thick outlines in FIGS. 5 and 6, and aspects of scenarios 500, 550, and 600 mainly related to one or more device-related entities other than the ecosystem coordinator are shown with relatively-thick outlines in FIGS. 5 and 6.

Scenario 500, shown in an upper portion of FIG. 5, begins with the ecosystem coordinator releasing test suite release 510 that includes a test suite TS1 at a beginning of test release interval 540. In scenario 500, test suite TS1 is a version of a test suite, such as test suite 150, that includes test cases for a particular version V1.1 of device-independent software 120. Test release interval 540 can be an interval of time between distributions or releases of test suite versions. In scenario 500, test release interval 540 is approximately 30 days long.

After TS1 is released, scenario 500 continues at blocks 512, 514, 516 where respective device-related entities DE1, DE2, and DE3 obtain a copy of test suite TS1. After obtaining test suite TS1, each of device-related entities DE1, DE2, and DE3 begin testing computing devices using test suite TS1 in parallel.

In scenario 500, device-related entity DE1 executes a test TBug of test suite TS1 and determines there is a bug/error Bug1 in test TBug and sends bug report 518 to inform the ecosystem coordinator about Bug1. Upon receipt of bug report 518, the ecosystem coordinator corrects the error in test TBug as indicated in FIG. 5 by bug fix 520 and releases the corrected version of test TBug as part of test suite release 530 for test suite TS2 at the end of test suite release interval 540.

During an interval of time between bug report 518 being sent to the ecosystem coordinator and test suite release 530 of test suite TS2, respective device-related entities DE2 and DE3 each executes test TBug, finds Bug1 in test TBug, and subsequently send respective bug reports 522, 524 to report Bug1 to the ecosystem coordinator. In other scenarios, the ecosystem coordinator can waive successful completion of test TBug by device-related entities during at least part of the interval of time between bug report 518 being sent to the ecosystem coordinator and test suite release 530 and can send corresponding waivers related to test TBug to some or all device-related entities that have obtained test suite TS1. In scenario 500, all three device-related entities DE1, DE2, and DE3 wait until the end of test suite release interval 540 for the corrected version of test TBug.

Then, upon release of test suite TS2, each of respective device-related entities DE1, DE2, and DE3 obtain a copy of test suite TS1 and begin testing using test suite TS2. Scenario 500 can then be concluded.

Scenario 550, shown in a lower portion of FIG. 5, is related to scenario 500. Scenario 550 begins with the ecosystem coordinator releasing test suite release 510 that includes a test suite TS1 at a beginning of test release interval 540. In scenario 550, test suite TS1 is a test suite described in the context of scenario 500 and test release interval 540 is the same as in scenario 500.

After TS1 is released, scenario 550 continues at blocks 552, 554, 556 where respective device-related entities DE1, DE2, and DE3 obtain a copy of test suite TS1. After obtaining test suite TS1, each of device-related entities DE1, DE2, and DE3 begin testing computing devices using test suite TS1 in parallel.

In scenario 550, device-related entity DE1 executes a test TBug2 of test suite TS1 and determines there is a bug/error Bug2 in test TBug2 and sends bug report 560 to inform the ecosystem coordinator about Bug2. Upon receipt of bug report 560, the ecosystem coordinator sends bug notifications 562, 564, 566 to respective device-related entities DE1, DE2, DE3 informing the device-related entities about reported bug Bug2 in test TBug2. In scenario 550, device-related entities DE2, DE3 review respective bug notifications 564, 566 and determine not to execute test TBug2 on their respective computing devices. In some scenarios, bug notifications 564, 566 can act as (effective) waivers of successful completion of test TBug2 during an interval of time between sending of bug notifications 564, 566 and test suite TS2 release 580 at the end of test suite release interval 540.

After sending bug notifications 562, 564, 566, the ecosystem coordinator corrects the error in test TBug2, as indicated in FIG. 5 by bug fix 570, and releases the corrected version of test TBug2 as part of test suite release 580 for test suite TS2 at the end of test suite release interval 540. In scenario 550, all three device-related entities DE1, DE2, and DE3 wait until the end of test suite release interval 540 for the corrected version of test TBug2. Then, upon release of test suite TS2, each of respective device-related entities DE1, DE2, and DE3 obtain a copy of test suite TS1 and begin testing using test suite TS2. Scenario 550 can then be concluded.

Figure 6:
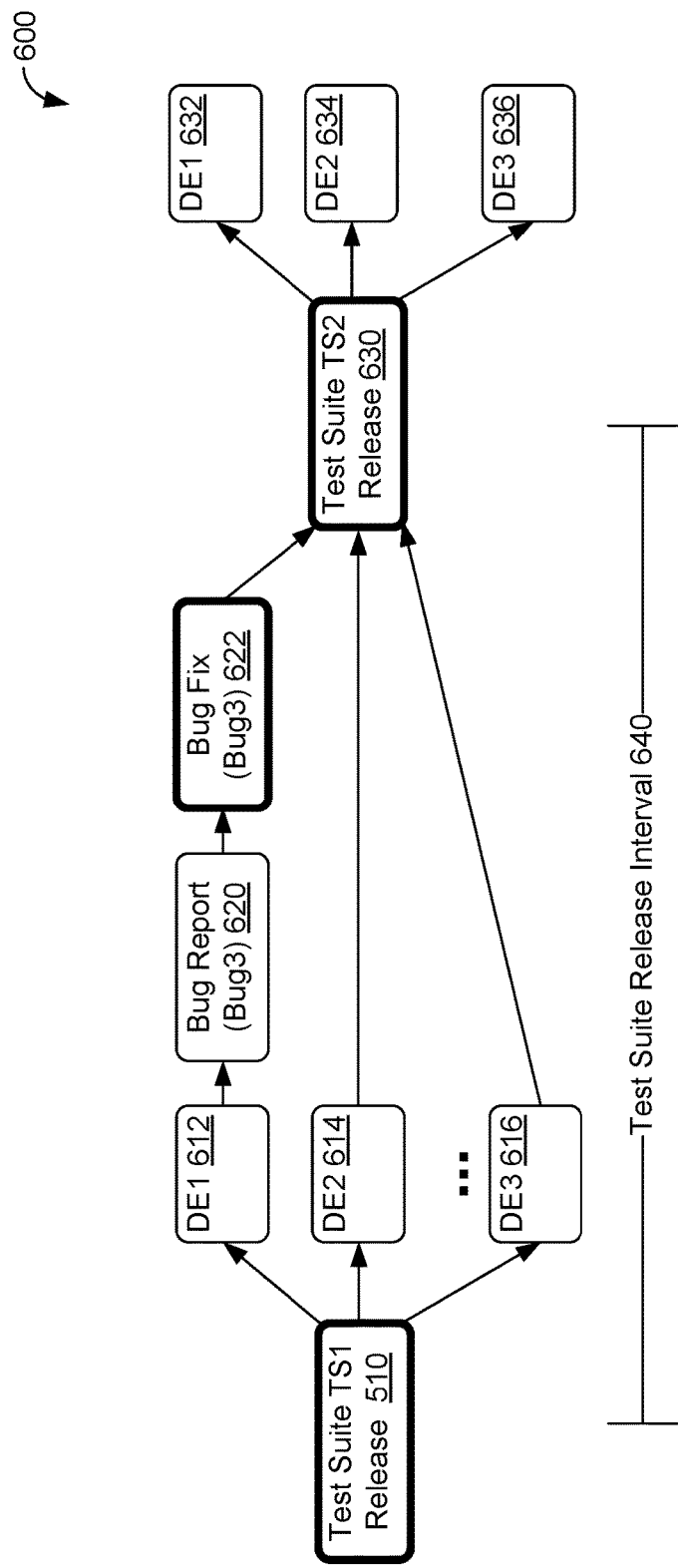
FIG. 6 shows a scenario of a release of test suites over an interval of time, in accordance with at least some example embodiments.

FIG. 6 shows scenario 600 of a release of test suites over an interval of time, in accordance with at least some example embodiments. Scenario 600 is related to scenarios 500 and 550. Scenario 600 begins with the ecosystem coordinator releasing test suite release 510 that includes a test suite TS1 at a beginning of test release interval 640. In scenario 600, test suite TS1 is a test suite described in the context of scenarios 500 and 550.

After TS1 is released, scenario 600 continues at blocks 612, 614, 616 where respective device-related entities DE1, DE2, and DE3 obtain a copy of test suite TS1. After obtaining test suite TS1, each of device-related entities DE1, DE2, and DE3 begin testing computing devices using test suite TS1 in parallel.

In scenario 600, device-related entity DE1 executes a test TBug3 of test suite TS1 and determines there is a bug/error Bug3 in test TBug3 and sends bug report 620 to inform the ecosystem coordinator about Bug3. Upon receipt of bug report 620, the ecosystem coordinator corrects the error in test TBug3, as indicated in FIG. 6 by bug fix 622, and releases the corrected version of test TBug3 as part of test suite release 630 for test suite TS2 at the end of test suite release interval 640. In scenario 600, a continuous release process for test suites is used and so test suite release interval 640 is one day; in related scenarios, test suite release interval 640 is 1-3 days long.

In scenario 600, all three device-related entities DE1, DE2, and DE3 wait until the end of test suite release interval 540 for the corrected version of test TBug3. Then, upon release of test suite TS2, each of respective device-related entities DE1, DE2, and DE3 obtain a copy of test suite TS1 and begin testing using test suite TS2, as shown in FIG. 6 by respective blocks 632, 634, 636. Scenario 600 can then be concluded.

Use of the continuous release process for test suites can provide benefits to the ecosystem. Test suite release interval 640 is considerably shorter than test suite release interval 540; e.g., test suite release interval 640 can be 1-3 days, while test suite release interval 540 is 30 days. Use of the continuous release process shortens a test suite release interval, such as test suite release interval 540 of 30 days, considerably; e.g., reduced from 30 days to 1-3 days as used for test suite release interval 640. The continuous release process for test suites can provide for an updated version of test suite TS1 by the ecosystem coordinator as soon as at least one change (e.g., a change for a bug fix, a change for a new functionality, a change for a new test) in test suite TS1. By not waiting for a specific release time and/or by releasing test suites more frequently, a test suite release interval can be shortened, thereby getting changed/updated test suites to device-related entities faster, reducing time spent waiting for updated tests. Further, redundant work by multiple device-related entities, such as the execution of the failing test TBug by device-related entities DE2 and DE3 in scenario 500 after bug report 518 was sent, can be reduced and perhaps eliminated. Additionally, as test suite releases occur more frequently, fewer waivers and/or bug notifications may be issued by the ecosystem coordinator.

Figure 7:
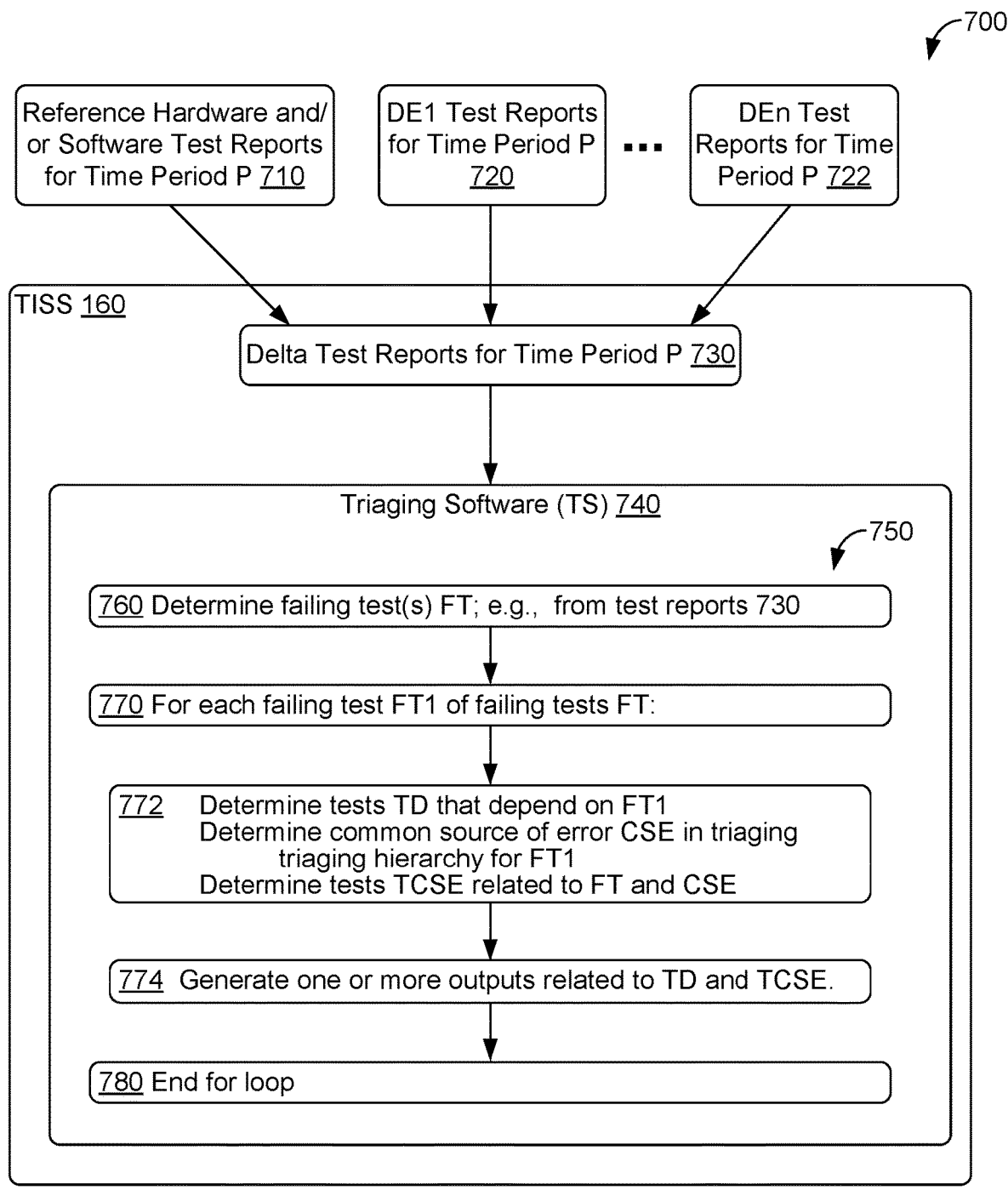
FIG. 7 is a block diagram of a system related to triaging tests, in accordance with at least some example embodiments.

FIG. 7 is a block diagram of system 700 related to triaging tests, in accordance with at least some example embodiments. System 700 includes test reports 710, 720, ... 722 being received at TISS 160, where test reports 710 can include test reports for a time period P received from tests executed on reference hardware and/or software, test reports 720 can include test reports for the time period P from tests executed by device-related entity DE1, and test reports 722 can include test reports for the time period P from tests executed by device-related entity DEn. In some examples, time period P can be a time period whose duration is pre-determined; e.g., 8 hours, 12 hours, one day, one week, two weeks, 15 days, one month, three months, etc. That is, at a time period P, test reports are received at TISS 160 from tests executed on reference hardware and/or software and from tests executed n different device-related entities. In some examples, test reports 710, 720 ... 722 are test reports from DUTs all executing a pre-determined release of software; e.g., a pre-determined release of device-independent software 120 and/or a pre-determined release of device-dependent software 130.

Test reports 710, 720 ... 722 can be processed by TISS 160 to create one or more delta test reports for time period P 730. A delta test report is a test report indicating changes or "deltas" between two or more different test reports. In some examples, a test report includes a list of test module names, test case names, and test case results (e.g., pass or fail). In a particular example, TISS 160 can receive test reports from multiple different reference hardware and/or non-reference devices, where non-reference device test reports can be based on different hardware and/or software versions. TISS 160 can then generate one or more delta test reports representing changes between different device types; e.g., test results that differ between different instances, designs and/or implementations of a device. In some cases, a tree of different device types in a delta test report can be formed; e.g., a delta test report can show deltas for all DUTs associated with a particular device-related entity, which can have multiple designs of DUTs, and each different design of the particular device-related entity can have multiple implementations, and each different implementation of the particular device-related entity can multiple instances/DUTs. Then, the delta test report can show common failures among instances, designs and/or implementations and/or when a device-related entity introduced or fixed a bug or other error in a device, Tests can be triaged; that is, reordered, omitted, and/or waived, based on triaging algorithm 750. In the example shown in FIG. 7, triaging algorithm 750 is executed by triaging software (TS) 740 of TISS 160. Triaging algorithm 750 can begin at block 760, where triaging software 740 can determine zero or more failing tests FT from test results, such as but not limited to delta test reports for time period P 730. In examples where there are zero failing tests FT for time period P, then triaging algorithm 750 can end at block 760.

Assuming there are one or more failing tests FT, triaging software 740 can proceed to block 770 to begin execution of a for loop to select and operated on a failing test FT1 of failing tests FT. The for loop includes the procedures of blocks 770, 772, 774, and 780.

At block 772, triaging software 740 can determine tests that can be triaged based on the fact that test FT1 is a failing test. In particular, triaging software 740 can determine zero or more tests TD that depend on test FT1. A test T2 depends on test T1 when test T2 has to be executed subsequent to test T1; e.g., test T1 establishes one or more initial conditions necessary to begin test T2, test T2 is only executed if test T1 passes.

Triaging software 740 can determine a common source of error for DUTs reporting failure of failing test FT1. For example, triaging software 740 can use a triaging hierarchy and/or triaging criteria to determine one or more source of errors for failing test FT1. The triaging hierarchy can start with a source of error that is common to all reporting DUTs reporting test reports 710, 720, ... 722; e.g., a particular release of device-independent software, work through intermediate sources of error; e.g., a particular computer device design that is common to some, but not all, reporting DUTs, a particular implementation of the particular computer device design that is common to some but not all reporting DUTs that have the particular computer device design, a common component for some but not all reporting DUTs, a common hardware or software feature for some but not all reporting DUTs, etc., to end at a particular DUT.

For example, a DUT DUT FT1 that is an implementation IMP1 of design DES1 from silicon vendor SV1 and is executing release RIND1 of device-independent software 120 provided by ecosystem coordinator EC1 and release RDEP1 of device-dependent software provided by SV1 can have a triaging hierarchy THier1 of: (a) all reporting DUTs executing device-independent software release RIND1, (b) all reporting DUTs executing RIND1 built by silicon vendor SV1, (c) all reporting DUTs executing RIND1 built by SV1 having design DES1, (d) all reporting DUTs executing RIND1 having implementation IMP1 of design DES1 by SV1, (e) all reporting DUTs executing RIND1 having implementation IMP1 of design DES1 by SV1 and executing RDEP1 of device-dependent software, and (f) the specific reporting DUT indicating failure; e.g., DUT_FT1.

Triaging criteria can be used to determine which source of error in the triaging criteria is implicated as a likely common source of error for failing test FT1. Initially, triaging software 740 can determine an initial common source of error as a lowest source of error in the triaging hierarchy; e.g., a DUT as a current source of error. Then, triaging software 740 can attempt to move up the triaging hierarchy by determining whether the triaging criteria for a next-higher source of error above the current source of error are satisfied. If the triaging criteria for the next-higher source of error above the current source of error are satisfied, then triaging software 740 can move up the triaging hierarchy to set the current source of error equal to the next-highest source of error. Triaging software 740 can then continue to attempt to move up the triaging hierarchy until either (a) the triaging criteria for the next-higher source of error above the current source of error are not satisfied, or (b) determine that the current source of error is the highest source of error in the triaging hierarchy. Then, once the attempt to move up the triaging hierarchy is complete, triaging software 740 can implicate the current source of error for the failing test.

In some examples, triaging criteria can be based on a triaging percentage, or percentage of DUTs failing a test that share a common source of error. In the particular example, listed above, suppose that 10 DUTs, including DUT FT1, executed test FT1 and were in triaging hierarchy THier1 group (e), which is a group of DUTs that includes all reporting DUTs executing RIND1 having implementation IMP1 of design DES1 by SV1 and executing RDEP1 of device-dependent software, and that the triaging percentage for THier1group (e) is 55%. When more than 55%*10 DUTs=5.5 DUTs in THier1 group (e) fail test FT1, THier1 group (e) can be implicated as part (or all) of the common source of error. In one particular example, 7 DUTs in THier1 group (e) fail test FT1, and so THier1 group (e) is implicated as part (or all) of the common source of error.

Then, if a lower source of error in the triaging hierarchy is indicated as a possible source of error, triaging software 740 can attempt to move up the triaging hierarchy by checking triaging criteria of the next higher source of error in the triaging hierarchy as a possible source of error. Continuing the example above, since the common source of error includes THier1 triaging group (e), triaging software 740 can then check the next higher group in triaging hierarchy THier1—in this case, triaging THier1_group (d) which is a group of all reporting DUTs executing RIND1 having implementation IMP1 of design DES1 by SV1. To continue this example, suppose that THier1group (d) includes 30 reporting DUTs and that the triaging percentage for THier1 group (d) is 60.1%, then THier1 group (d) would be implicated as part of the common source of error if 30*60.1%=18.3 DUTs of THier1 group (d) failed test FT1. In this particular example, 13 DUTs of THier1group (d) failed FT1, and so triaging software 740 can determine that further movement up the triaging hierarchy cannot take place for FT1, and so the common source of error implicated for failed test FT1 is THier1 group (e).

In another example, if only 3 DUTs of THier1 group (e) failed FT1, then group (e) would not be implicated as part of the common source of error, and so only group (f), which includes only DUT_FT1 would be implicated under the example triaging hierarchy and triaging criteria.

In other examples, a statistical model of indicating an expected number of DUTs failing test FT1 having a common source of error can be determined, and if the expected number of DUTs failing test FT1 is exceeded, then the common source of error can be implicated in failing test FT1. In still other examples, the default source of error is the specific DUT reporting failure of test FT1. Other triaging hierarchies, other triaging criteria, and other techniques for determining a common source of error for one or more failing tests are possible as well.

Triaging software 740 can also determine zero or more tests TCSE that can be triaged based on the determined common source of error CSE for failing test FT1. To continue the example that used triaging hierarchy THier1 mentioned above, if THier1 group (e) is implicated, then a set of tests TSCE that include failing test FT1 and any dependent tests FT that depend on FT1 can be triaged for all DUTs in THeir1 group (e).

At block 774, triaging software 740 can generate one or more outputs related to FT and TSCE. The output(s) can include, but are not limited to, instructions to omit, reorder, waive, and/or otherwise triage waive tests TD and/or TCSE for some or all DUTs in CSE, one or more test bug reports for TD and/or TCSE, one or more test bug notifications for tests TD and/or TCSE At block 780, triaging software 740 can determine whether there are more failing tests FT to be processed by the for loop. If there are more failing tests, triaging software 740 can proceed to block 770 to restart the for loop. Otherwise, there are no more failing tests, and triaging algorithm 750 can end. In some examples, the outputs mentioned at block 774 can be output after the for loop of triaging algorithm 750 ends.

In some examples, delta test reports 730 can be based on execution of software (device-dependent 130 and/or device-independent software 120) by one or more DUTs DUT1-DUTd (d>0) of having a first software version; e.g., test reports of tests T1-Tn (n>0) executed by DUTs DUT1-DUTd on version 1.1 of the software. Then, triaging software 740 can obtain related version test results from other executions of some or all of tests T1-Tn on some or all of DUTs DUT1-DUTd that executed a second software version that equals or exceeds the first software version; e.g., test results of one or more tests Tm1, Tm2 ($1 \leq m1, m2, \ldots \leq n$) that were executed by some or all of DUTs DUT1-DUTd on a version 1.2 (or later) of the software, where version 1.2 is later than version 1.1. Triaging software 740 can then analyze the test results related to version 1.2 to determine whether a test Ts out of Tm1, Tm2 . . . was successful on the some or all of DUTs DUT1-DUTd executing version 1.2 (or later). Then, after determining that test Ts was successful on the one or more DUTs executing the later version of software 1.2, software 740 can determine to triage execution of the successful test Ts on the second DUT on software version 1.1; that is, a successful result of a test on a later version of software can cause triaging software 740 to triage execution of the test on an earlier version of the same software; i.e., since triaging software 740 can rely on the successful result using the later version of software.

Example Scenario Involving Triaging Tests during Device Testing

Figure 8:
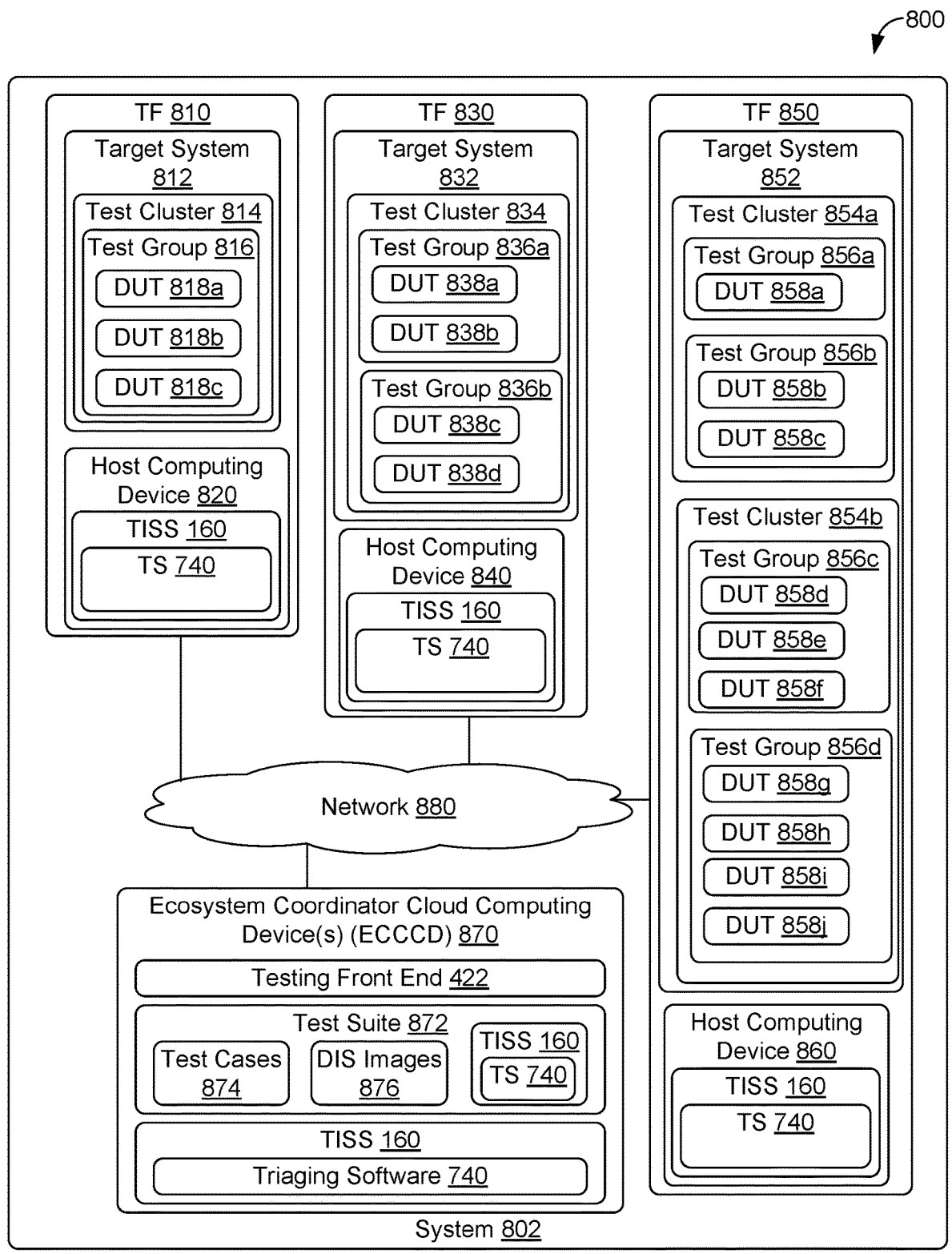
FIG. 8 is a block diagram of a system used in a scenario, in accordance with at least some example embodiments.

FIG. 8 is a block diagram of system 802 used in scenario 800, in accordance with at least some example embodiments. Scenario 800 relates to testing and triaging of tests for devices in system 802. System 802 includes testing facilities 810, 830, 850 and ecosystem coordinator cloud computing system (ECCCS) 870 all communicatively coupled by network 880.

Testing facility 810 is under the control of silicon vendor SV810 and includes testing system 812 and host computing device 820. Testing system 812 includes test cluster 814 that has test group 816 which in turn includes DUTs 818a, 818b, 818c. DUTs 818a, 818b, 818c are computing devices that are each manufactured as an implementation IMP_810 of design DES_810 of silicon vendor SV810. Host computing device 820 includes one or more computing devices configured with test infrastructure system software 160, which includes triaging software 740 and other herein-described aspects of test infrastructure system software 160.

Testing facility 830 is under the control of silicon vendor SV830 and includes target system 832 and host computing device 840. Target system 832 includes test cluster 834 that has test groups 836a, 836b. Test group 836a includes DUTs 838a, 838b and test group 836b includes DUTs 838c, 838d. DUTs 838a, 838b are computing devices that are each manufactured as an implementation IMP_830a of design DES_830 of silicon vendor SV830 and DUTs 838c, 838d are computing devices that are each manufactured as an implementation IMP_830b of design DES_830 of silicon vendor SV830. Host computing device 840 includes one or more computing devices configured with test infrastructure system software 160, which includes triaging software 740 and other herein-described aspects of test infrastructure system software 160.

Testing facility 850 is under the control of silicon vendor SV850 and includes target system 852 and host computing device 860. Target system 852 includes test clusters 854a, 854b. Test cluster 854a has test groups 856a, 856b and test cluster 854b has test groups 856c, 856d. Test group 856a has DUT 858a, test group 856b has DUTs 858b, 858c, test group 856c has DUTs 858d, 858e, 858f, and test group 856d has DUTs 858g, 858h, 858i, 858j.

DUT 858a is a computing device that is manufactured as an implementation IMP_850a of design DES_850 of silicon vendor SV850. DUTs 858b, 858c are computing devices that are manufactured as an implementation IMP_850b of design DES_850 of silicon vendor SV850. DUTs 858d, 858e, 858f are computing devices that are manufactured as an implementation IMP_851a of design DES_851 of silicon vendor SV850. DUTs 858g, 858h, 858i, 858j are computing devices that are manufactured as an implementation IMP_851b of design DES_851 of silicon vendor SV850. Host computing device 860 includes one or more computing devices configured with test infrastructure system software 160, which includes triaging software 740 and other herein-described aspects of test infrastructure system software 160.

In scenario 800, each testing facility is under the control of a different silicon vendor; that is, testing facilities 810, 820, 830 are under the control of respective silicon vendors SV810, SV820, SV830. Each test cluster in scenario 800 includes DUTs that share a common hardware design; that is, test clusters 814, 834, 854a, 854a includes DUTs that have respective designs DES_810, DES_830, DES_850, DES_851. Each test group in scenario 800 includes DUTs that share a common implementation of a design; that is, test groups 816, 836a, 836b, 856a, 856b, 856c, 856d includes DUTs that are respective implementations IMP_810, IMP_830a, IMP_830b, IMP_850a, IMP_850b, IMP_851a, IMP_851b. Thus, in scenario 800, each target system is associated with one silicon vendor, each test cluster is associated with one design, and each test group is associated with one implementation of a corresponding design.

Ecosystem coordinator cloud computing device (ECCCD) 870 includes one or more computing devices configured with testing front end 422, test suite 872, and test infrastructure system software 160, which includes triaging software 740 and other herein-described aspects of test infrastructure system software 160. Test suite 872 includes one or more test cases 874, one or more device-independent software images 876, which include software images of device-independent software 120, and a copy of test infrastructure system software 160 that includes triaging software 740.

In scenario 800, ECCCD 870 is under the control of the ecosystem coordinator, and the ecosystem coordinator authored and provided test suite 872, including both test cases 874 and device-independent software images 876, and test infrastructure system software 160 to testing facilities 810, 830, 850 via network 880. ECCCD 870 also provides access to testing front end 422 to testing facilities 810, 830, 850 via network 880 during scenario 800. Additionally, during scenario 800, ECCCD 870 is executing an instance of test infrastructure system software 160 that includes triaging software 740.

Figure 9:
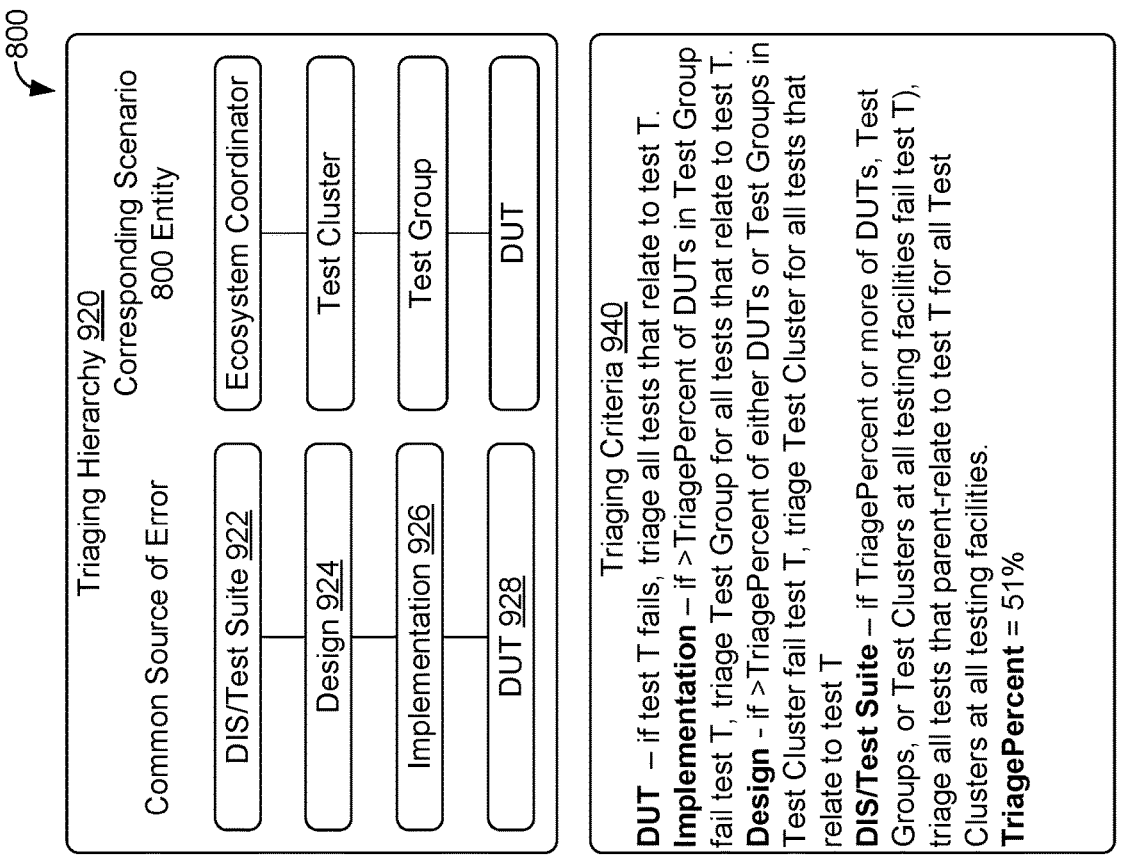
FIG. 9 shows block diagrams of a test suite, a triaging hierarchy, and triaging criteria used in the scenario of FIG. 8, in accordance with at least some example embodiments.
Figure 9:
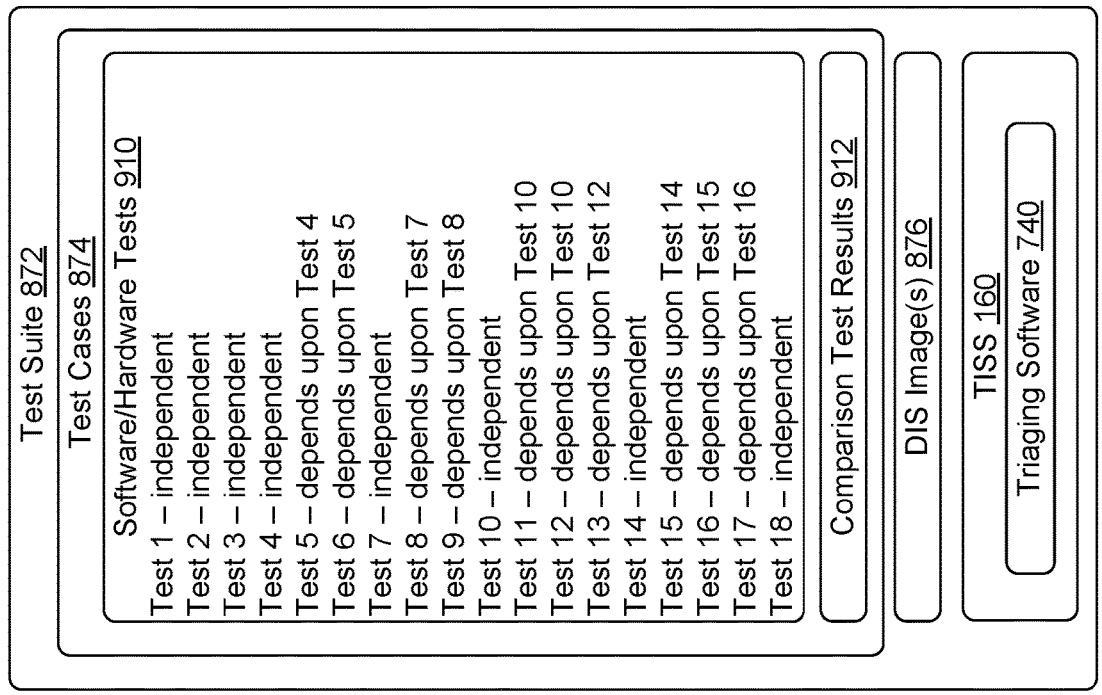

FIG. 9 shows block diagrams of test suite 872, triaging hierarchy 920, and triaging criteria 940 used in scenario 800, in accordance with at least some example embodiments. As mentioned above, test suite 872 includes test cases 874, device-independent software images 876, and a copy of test infrastructure system software 160 with triaging software 740. FIG. 9 shows that test cases 874 include software/hardware tests 910 and related comparison test results 912.

In scenario 800, 18 tests numbered Tests 1-18 of software/hardware tests 910 are executed, where Tests 1-18 include one or more tests for testing device-independent software image 876 and related API and one or more tests for testing a software image of device-dependent software 130 and related APIs and HALs. These tests include API tests. In some scenarios, a software image can include a representation of both device-independent software 120 and device-dependent software 130. In particular, one or more examples of device-independent software image 876 can include a representation of both device-independent software 120 and device-dependent software 130. These examples of device-independent software image 876 can be generated in one geographical location. For instance, a geographical location of a facility under the control of the ecosystem coordinator capable of building software images that include a software image that includes both device-independent software 120 and device-dependent software 130) or can be generated in multiple geographical locations. As another instance, software image 876 can be generated at a geographical location LOC1 of a facility under the control of a silicon vendor or other device-related entity using a first software image that includes device-independent software 120 generated at a geographical location LOC2 by the ecosystem coordinator and a second software image that includes device-dependent software 130 generated at geographical location LOC1 or a different geographical location by the silicon vendor or other device-related entity. In some of these instances, a software image SD of software image 876 that includes device-independent software 120 can be communicated from LOC1 to LOC2 as part of test suite 872, a software image SI2 is generated at LOC2 that includes the device-independent software 120 of software image SD as well as software implementing device-dependent software 130. Then, Tests 1-18 can be executed by DUTs executing software of software image SI2.

As illustrated in FIG. 9, several tests of software/hardware tests 910 are independent tests, including Tests 1, 2, 3, 4, 7, 10, 14, and 18, while the remaining tests are dependent tests. The dependent tests include Test 5, which depends upon Test 4; Test 6, which depends upon Test 5; Test 8, which depends upon Test 7; Test 8, which depends upon Test 8; Tests 10 and 11, each of which depend upon Test 10; Test 13, which depends upon Test 12; Test 15, which depends upon Test 14; Test 16, which depends upon Test 15; and Test 17 which depends upon Test 16. Comparison test results 912 include passing test results for executions of all of software/hardware tests 910, including passing test results for each of tests Test 1 through Test 18. In scenario 900, comparison test results 912 are generated and provided by the ecosystem coordinator as test results from successfully executing each test of software/hardware tests 910 on reference computing devices under the control of the ecosystem coordinator.

Triaging hierarchy 920 provides a hierarchy for triaging tests during scenario 800. Triaging hierarchy 920 includes a common source of error hierarchy and a corresponding scenario 800 entity hierarchy. The common source of error hierarchy of triaging hierarchy 920 includes a highest source of error of device-independent software/test suite source of error 922, which is above design source of error 924, which is above implementation source of error 926, which is above a lowest source of error, which is DUT source of error 928. As shown in FIG. 9, triaging hierarchy 920 also includes a hierarchy of corresponding entities for scenario 800 that is associated with the common sources of error. That is, FIG. 9 illustrates that "DIS/Test Suite" source of error 922 is associated with the "Ecosystem Coordinator" during scenario 800; "Design" source of error 924 is associated with a "Test Cluster" during scenario 800; "Implementation" source of error 926 is associated with a "Test Group" during scenario 800; and "DUT" source of error 928 is associated with a "DUT" during scenario 800. In other scenarios, triaging hierarchy 920 includes a different common source of error hierarchy, does not include a corresponding entity hierarchy, and/or includes more, fewer, and/or different hierarchies.

When triaging tests associated with a failing test, triaging software 740 can initially implicate the lowest source of error; e.g., DUT source of error 928, and attempt to move up triaging hierarchy 920 to find a highest source of error for the failing test, as discussed above in the context of triaging algorithm 750. In scenario 800, triaging software 740 can move up triaging hierarchy 920 from a current source of error S1 to a next-highest source of error S2 as long as triaging criteria 940 for source of error S2 are satisfied. If triaging criteria 940 for next-highest source of error S2 are not satisfied, triaging software 740 can determine that current source of error S1 is the source of error implicated for the failing test and stop attempting to move up the triaging hierarchy.

If triaging criteria 940 for the next-highest source of error S2 are satisfied and S2 is the highest source of error in triaging hierarchy 920 (e.g., device-independent software/test suite source of error 922), then triaging software 740 can stop attempting to move up triaging hierarchy 920 and determine that the ecosystem coordinator is the source of error implicated with the failing test, as the ecosystem coordinator is the corresponding entity in scenario 800 to the highest source of error in triaging hierarchy 920. Once triaging software 740 has implicated a source of error for the failing test, triaging software 740 can use the triaging criteria for the implicated source of error to triage tests.

Triaging criteria 940 include criteria for triaging tests during scenario 800. One or more triaging criteria of triaging criteria 940 can be associated with one common source of error of triaging hierarchy 920. That is, there are separate criteria of triaging criteria 940 for each of the device-independent software/test suite, design, implementation, and DUT sources of error in triaging hierarchy 920. Triaging criteria 940 also includes a triaging percentage "TriagePercent" of "51%", which is used for all other triaging criteria during scenario 800. In other scenarios, each common source of error can have more and/or different criteria and/or the triaging criteria can include fewer, more, and/or different triage percentages.

As illustrated in FIG. 9, triaging criteria of triaging criteria 940 associated with the "DUT" source of error 928 indicate that "if test T fails, triage all tests that relate to test T". In scenario 800, a test T1 relates to test T if either (a) T1=T or (b) T1 depends on T. Also, in scenario 800, a test T1 parent-relates to test T if either (a) T1=T, (b) T1 depends on T, or (c) T depends on T1. That is, triaging criteria 940 associated with the "DUT" source of error 928 indicate that after test T fails for a DUT, triaging software 740 is to triage all tests related to test T for the DUT.

The triaging criteria of triaging criteria 940 that are associated with "Implementation" source of error 926 indicate that "if" more than a "TriagePercent of DUTs in [a] Test Group", which is the entity corresponding to the implementation source of error 926, "fail test T", then triaging software 740 is to "triage [the] Test Group for all tests that relate to test T". That is, after more TriagePercent of DUTs in a test group TG_FAIL fail test T, triaging software 740 is to triage all tests that relate to test T for all DUTs in the test group TG_FAIL.

The triaging criteria of triaging criteria 940 that are associated with "Design" source of error 924 indicate that "if" more than the "TriagePercent of either DUTs or Test Groups in [a] Test Cluster", which is the entity corresponding to design source of error 924, "fail test T", then triaging software 740 is to "triage [the] Test Cluster for all tests that relate to test T". That is, after more than TriagePercent of either (a) DUTs in a test cluster TC_FAIL fail test T or (b) test groups in the test cluster TC_FAIL fail test T, triaging software 740 is to triage all tests that relate to test T for all DUTs in the test cluster TC_FAIL The triaging criteria of triaging criteria 940 that are associated with "DIS/Test Suite" source of error 922 indicate that "if" more than the "TriagePercent or more of DUTs, Test Groups, or Test Clusters at all testing facilities fail test T", then triaging software 740 is to "triage all tests that parent-relate to test T for all Test Clusters at all testing facilities". In scenario 800, all testing facilities are using device-independent software 120 and test suite 872 that are both provided by the ecosystem coordinator, and so a criterion mentioning "all testing facilities" is equivalent to a criterion mentioning device-independent software/test suite source of error 922. In scenario 800, the ecosystem coordinator is the entity corresponding to device-independent software/test suite source of error 922. That is, if test T fails at more than TriagePercent of either (a) all DUTs at all testing facilities, (b) all test groups at all testing facilities, or (c) all test clusters at all testing facilities, triaging software 740 is to triage all tests that parent-relate to test T for all DUTs at all testing facilities. During scenario 800, when a test is triaged, the test is omitted.

In other scenarios, triaging criteria, such as triaging criteria 940, include one or more criteria associated with both a source of error implicating device-independent software and/or a test suite; e.g., "DIS/Test Suite" source of error 922, and with data, such as a number or percentage, about device-related entities reporting failure of a test. For example, suppose that the ecosystem coordinator receives test results for a test T_GFAIL from a total number N1 of device-related entities for N2 DUTs and that the test results indicate that test T_GFAIL failed for N3 DUTs (N3≤N2) associated with N4 (N4≤N1) device-related entities. Then, computing devices associated with the ecosystem coordinator, e.g., ECCCD 870, can apply one or triaging criteria associated with a number of device-related entities exceeding a threshold number, percentage, or other value before determining to triage test T_GFAIL; e.g., if N4 is greater than a threshold number of failing-device-related entities NF (e.g., NF=2, NF=3, NF=10, NF=25, NF=100, . . . ), if N4/N1 is greater than a threshold percentage of failing-device-related entities NP (e.g., NP=3.33%, NP=5%, NP=20%, NP=50%), if greater than a threshold number of failing-device-related entities NF and greater than a threshold number of DUTs ND (e.g., ND=10, ND=16, ND=50, . . . ) fail test T_FAIL. Other triaging criteria related to numbers, percentages, and/or other values of failing DUTs, tests, test groups, test clusters, testing facilities, and/or device-related entities are possible as well.

In scenario 800, when triaging criteria 940 are applied, a DUT, test group, test cluster, or ecosystem coordinator is considered to have failed a test T if test T either fails during execution or is triaged, and therefore is presumed to have failed, for a DUT, test group, test cluster, or ecosystem coordinator. So, let a test group TG_EX1 have three DUTs DUT_EX1, DUT_EX2, DUT_EX2, and for a particular test T_EX, DUT_EX1 had test T_EX triaged, DUT_EX2 failed test T, and DUT_EX3 passes test T. Then, the failing percentage of test group TG_EX1 would be 2/3=approximately 67%, since DUT_EX1 and DUT_EX1 either failed or triaged test T, and three DUTs are in test group TG_EX1. Other examples are possible as well.

FIGS. 10, 11, 12, 13, 14, and 15 collectively show a communications flow for scenario 800, in accordance with at least some example embodiments. The communications flow involves communications between testing facilities 810, 830, 850 and ECCCD 870. The communications flow begins with ECCCD 870 making test suite 872 available to testing facilities 810, 830, 850, each of which then downloads and installs test suite 872. Each of testing facilities 810, 830, 850 then registers their respective DUTs for testing sessions involving test suite 872. Testing using the 18 tests of test suite 872 commences with all DUTs at all testing facilities passing Tests 1-5, and all DUTs but DUT 818*b* at testing facility 810 pass Test 6. Test 6 is then triaged by host computing device 820 for DUT 818*b*. Tests 7-9 are then executed on all DUTs at testing facilities 810, 830, 850—all DUTs at testing facilities 810 and 850 pass all three tests. At testing facility 830, DUT 838*a* fails Test 7 and so Tests 7-9 are triaged by host computing device 840 for DUT 838*a*. Then, DUTs 838*b* and 838*c* both fail Test 8, and so Tests 8 and 9 are triaged by host computing device 840 for all DUTs in test cluster 834.

Tests 10-13 are then executed on all DUTs at testing facilities 810, 830, 850—all DUTs at testing facilities 810 and 830 pass all four tests. At testing facility 850, DUTs 858*a* and 858*j* both fail Test 10, so test computing device and so Tests 10-13 are triaged by host computing device 860 for test group 856*a* and DUT 858*j*. Then, DUT 858*b* fails Test 11, and so Tests 11-13 are triaged by host computing device 860 for all DUTs in test cluster 854*a*. DUTs 854*d* and 854*g* both fail Test 12, and so Tests 12 and 13 are triaged by host computing device 860 for DUTs 854*d* and 854*g*. All non-triaged DUTs at testing facility 850 then pass Test 13.

The communication flow indicates that testing at test facility 810 is paused, while testing continues at both testing facilities 830 and 850 with all DUTs executing Tests 14-17. All DUTs at testing facility 830 pass Test 14, but DUTs 858*e*, 858*f*, 858*h*, and 858*i* all fail Test 14, and so Tests 14-17 are triaged by host computing device 860 for test group 856*c* and DUTs 858*h* and 858*i*. DUTs 838*b*, 838*c*, 838*d* at testing facility 830 and DUTs 858*a*, 858*b*, 858*c*, 858*g* at testing facility 850 fail Test 15. Subsequently, host computing device 840 triages Tests 15-17 for test cluster 834, and host computing device 860 triages Tests 15-17 for test clusters 854*a* and 854*b*. Upon receiving reports of the triaged test clusters 834, 854*a*, and 854*b* for Tests 15-17, ECCCD 870 triages Tests 14-17 for all DUTs at testing facilities 810, 830, 850. Test 18 is then executed and passed by all DUTs at each of testing facilities 810, 830, 850, and test reports for test suite 872 are sent from each of testing facilities 810, 830, 850 to ECCCD 870.

Scenario 800 then continues with ECCCD 870 providing an updated test suite 872 to testing facilities 810 and 850 with fixes to Tests 14-17. At testing facility 850, Tests 14-17 are re-executed and pass on all DUTs. At testing facility 810, all of Tests 1-18 are re-executed and pass on all DUTs, except that Test 6 fails again on DUT 818*b*. DUT 818*b* is updated and, after the update, DUT 818*b* passes Test 6. Testing facility 810 then requests an approval for test suite 872 for test cluster 814, and ECCCD 870 then approves test cluster 814 for the functionality tested by test suite 872. Scenario 800 then ends.

Figure 10:
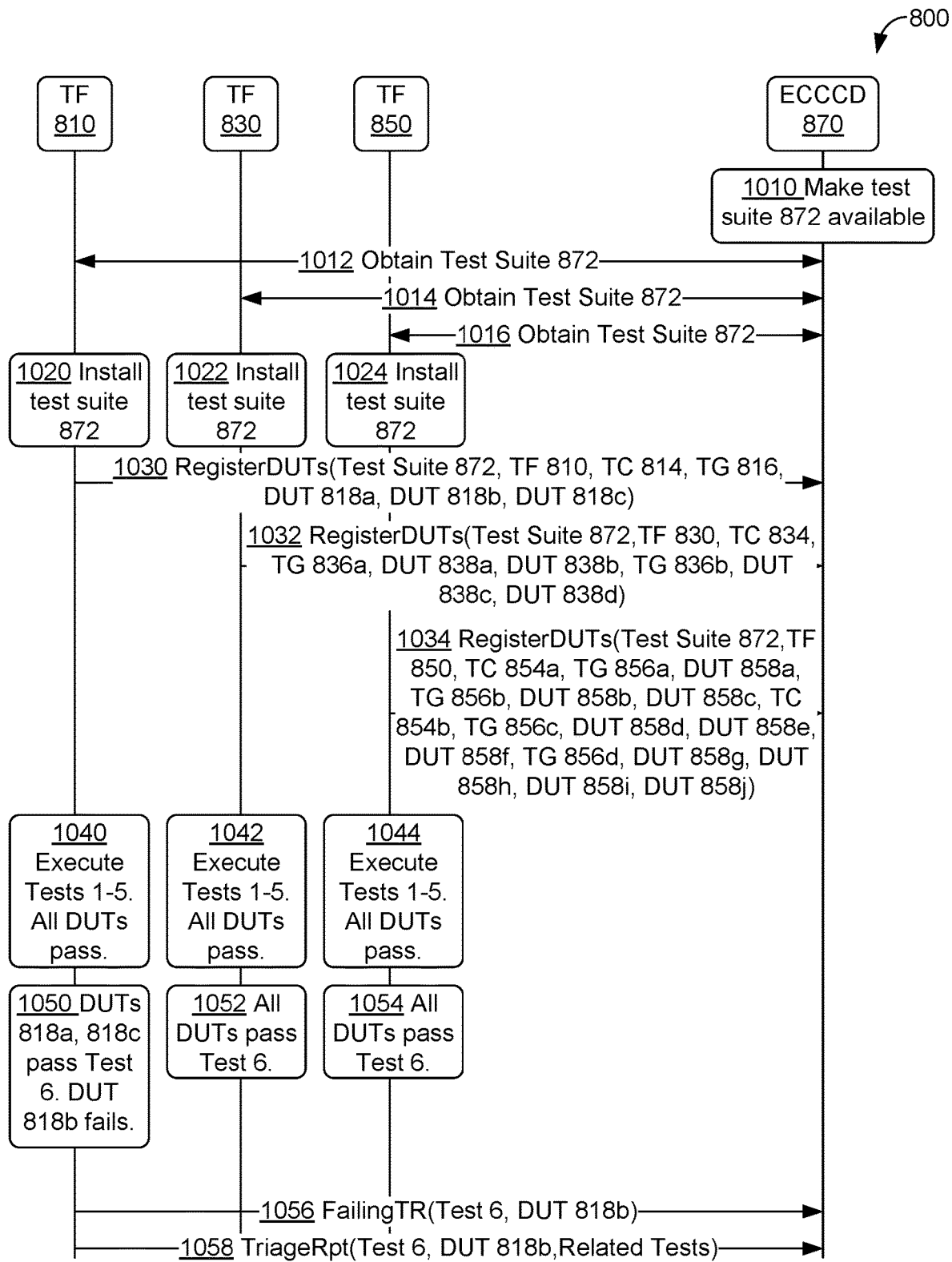
FIGS. 10, 11, 12, 13, 14, and 15 show a communications flow for the scenario of FIG. 8, in accordance with at least some example embodiments.

FIG. 10 shows that the communication flow of scenario 800 begins at block 1010, where ECCCD 870 makes test suite 872 generally available. Then, communications 1012 ensue where testing facility 810 obtains test suite 872. Then, testing facility 830 obtains test suite 872 using communications 1014 and testing facility 850 obtains test suite 872 using communications 1016.

At block 1020, testing facility 810 installs test suite 872; that is, testing facility 810 obtains test cases 874, device independent image(s) 876, and TISS 160 with triaging software 740 from test suite 872 and prepares TISS 160 for execution by host computing device 820. In scenario 800, when TISS 160 is executed by a host computing device at a testing facility, such as testing facility 810, TISS 160 is used to execute, prior to triaging, Tests 1-18 of software/hardware tests 910 of test cases 874 in numerical order on all DUTs at the testing facility, compare test results from execution of the Tests with comparison test results 912, and determine whether or not each of Tests 1-18 passed based on the comparison of test results with comparison test results 912. TISS 160 also records the pass/fail status for each of Tests 1-18 for each DUT executing the test at the testing facility, and if a test fails, triages the test and reports the failing test to ECCCD 870.

At block 1022, testing facility 830 installs test suite 872 as indicated above at block 1020 for the installation of test suite 872 at testing facility 810. At block 1024, testing facility 850 installs test suite 872 as indicated above at block 1020 for the installation of test suite 872 at testing facility 810.

Testing facility 810 then sends RegisterDUTs message 1030 to inform ECCCD 870 about, or register, DUTs, test groups, and test clusters executing "Test Suite 872" at "TF 810"; e.g., testing facility 810. RegisterDUTs message 1030 informs ECCCD 870 that testing facility 810 has "TC 814" as a notification of test cluster 814, which includes "TG 816" for test group 816, and where test group 816 includes DUTs "DUT 818*a*, DUT 818*b*" and "DUT 818*c*". Based on this information in RegisterDUTs message 1030, TISS 160 and triaging software 740 executing at ECCCD 870 can determine that testing facility 810 has one test cluster that has one test group that includes three DUTs.

Testing facility 830 then sends RegisterDUTs message 1032 to inform ECCCD 870 about DUTs, test groups, and test clusters executing "Test Suite 872" at "TF 830"; e.g., testing facility 830. RegisterDUTs message 1032 informs ECCCD 870 that testing facility 830 has "TC 834" as a notification of test cluster 834, which includes "TG 836*a*" for test group 836*a* with DUTs "DUT 838*a*" and "DUT 838*b*"; RegisterDUTs message 1032 also informs ECCCD 870 that test cluster 834 includes "TG 836*b*" for test group 836*b* with DUTs "DUT 838*c*" and "DUT 838*d*". Based on this information in RegisterDUTs message 1032, TISS 160 and triaging software 740 executing at ECCCD 870 can determine that testing facility 830 has one test cluster that has two test groups, and that both test groups have two DUTs.

Testing facility 850 then sends RegisterDUTs message 1034 to inform ECCCD 870 about DUTs, test groups, and test clusters executing "Test Suite 872" at "TF 850"; e.g., testing facility 850. RegisterDUTs message 1034 informs ECCCD 870 that testing facility 850 has "TC 854*a*" as a notification of test cluster 854*a*, which includes "TG 856*a*" for test group 856*a* with "DUT 858*a*" and "TG 856*b*" for test group 856*b* with DUTs "DUT 858*b*" and "DUT 858*c*". RegisterDUTs message 1034 also informs ECCCD 870 that test facility 850 includes test cluster 854*b* as notified using "TC 854*b*", which includes test group 856*c* indicated as "TG 856*c*" having DUTs "DUT 858*d*, DUT 858*e*" and "DUT 858*f*" and includes test group 856*d* indicates as "TG 856*d*" that includes DUTs "DUT 858*g*, DUT 858*h*, DUT 858*i*" and "DUT 858*j*". Based on this information in RegisterDUTs message 1034, TISS 160 and triaging software 740 executing at ECCCD 870 can determine that testing facility 850 has two test clusters—test cluster "TC 854*a*" that has two test groups, which respectively have one and two DUTs, and test cluster ""TC 854*b*" that has two test groups, which respectively have three and four DUTs TISS 160 and triaging software 740 executing at ECCCD 870 can use the information provided by RegisterDUTs messages 1030, 1032, and 1034 to make triaging decisions regarding tests of test suite 872. In other scenarios, TISS 160 and triaging software 740 executing at ECCCD 870 can be provided with triaging-related information at various testing facilities using other techniques than registration messages.

Scenario 800 continues with testing facilities 810, 830, and 850 each beginning to execute tests in test suite 872—during scenario 800, Tests 1-18 of test suite 872 are scheduled for execution. As indicated at blocks 1040, 1042, and 1044 of FIG. 10, all DUTs pass all of Tests 1-5 at respective testing facilities 810, 830, and 850. Regarding Test 6, block 1050 indicates that at testing facility 810, both DUTs 818*a* and 818*c* pass Test 6 but DUT 818*b* fails Test 6. Block 1052 indicates that all DUTs at testing facility 830 pass Test 6. And block 1054 indicates that all DUTs at testing facility 850 pass Test 6.

Upon determining that DUT 818*b* failed Test 6, testing facility 810 (e.g., using host computer 820) sends FailingTR message 1056 to indicate to ECCCD 870 that "DUT 818*b*" failed "Test 6" at testing facility 810. After triaging software 740 of TISS 160 executing at host computer 820 determines that DUT 818*b* failed Test 6, triaging software 740 executing at host computer 820 determines, based on triaging hierarchy 920 and triaging criteria 940, that the common source of failure for failing Test 6 is DUT source of error 928; thereby implicating DUT 818*b* for failing Test 6—DUT 818*b* is in test group 816, which has a percentage of DUTs failing Test 6 of 33% which is less than TriagePercent=51%. Therefore, based on triaging criteria 940, test group 816 (which is related implementation source of error 926 in triaging hierarchy 920) is not implicated for failing Test 6, and so DUT source of error 928 is implicated for DUT 818*b* failing Test 6.

As Test 6 relates only to itself (as no other tests depend on Test 6), only Test 6 is triaged—in this scenario, omitted—for DUT 818*b* by triaging software 740 executing on host computer 820. Then, testing facility 810 sends TriageRpt message 1058 to ECCCD 870 to indicate that "Test 6" of test suite 872 has been triaged for "DUT 818*b*" as a "Related Tes[t]" to failing test "Test 6" indicated by FailingTR message 1056. In other scenarios, the information in FailingTR message 1056 and TriageRpt message 1058 can be combined to indicate both failing test results and triaged test results.

Figure 11:
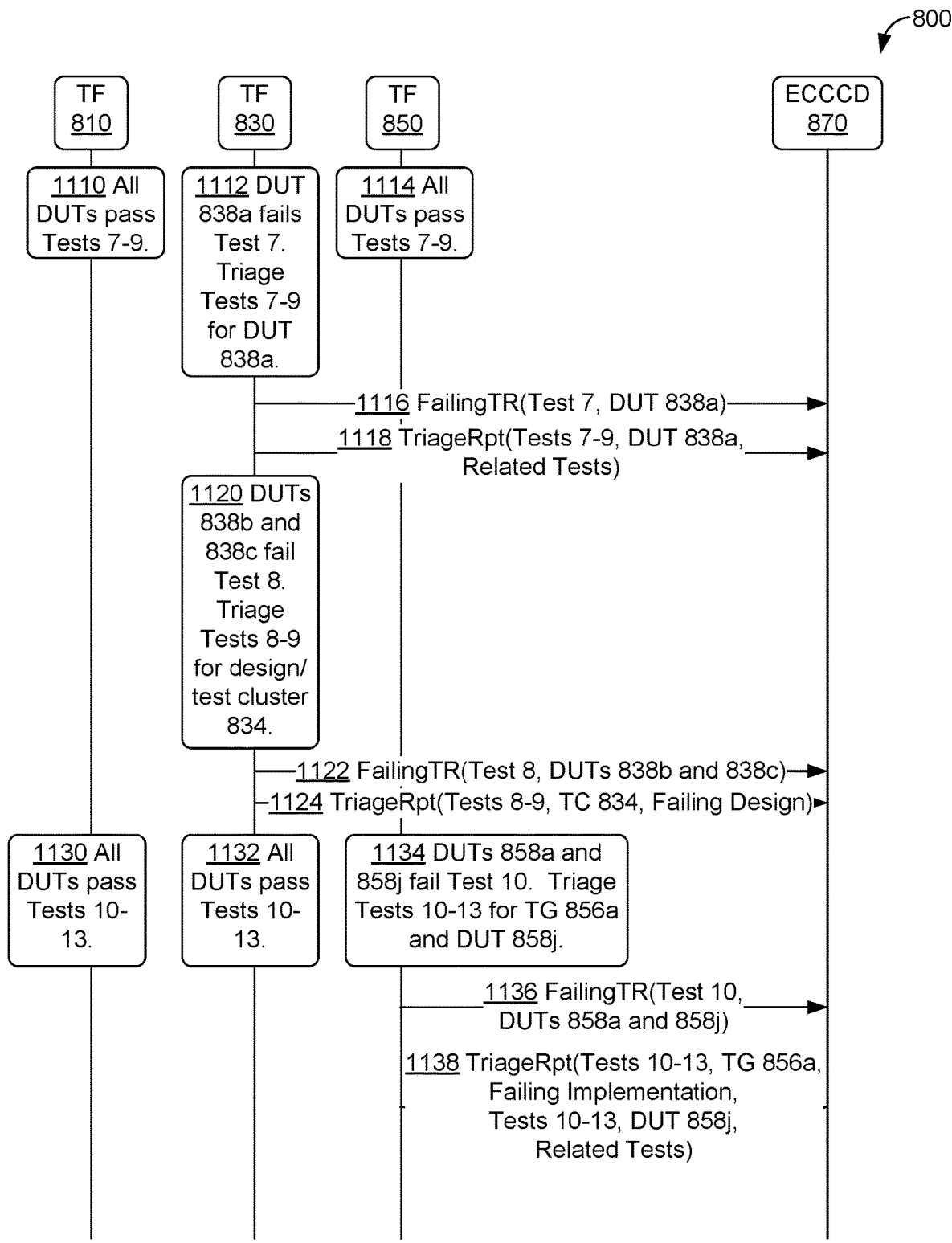

As indicated by FIG. 11, scenario 800 continues with testing facilities 810, 830, and 850 each executing Tests 7-9. As indicated at blocks 1110 and 1114, all DUTs pass all of Tests 7-9 at respective testing facilities 810 and 850. However, block 1112 indicates that, at testing facility 830, DUT 838*a* fails Test 7. In response, testing facility 830 (e.g., using host computer 840) sends FailingTR message 1116 to indicate to ECCCD 870 that "DUT 838*a*" failed "Test 7" at testing facility 830.

After triaging software 740 of TISS 160 executing at host computer 840 determines that DUT 838*a* failed Test 7, triaging software 740 determines, based on triaging hierarchy 920 and triaging criteria 940, that the common source of failure for failing Test 7 is DUT source of error 928; thereby implicating DUT 838*a* for failing Test 7. In particular, triaging software 740 determines that DUT 838*a* is in test group 836*a*, which has a percentage of DUTs failing Test 7 of 50% which is less than TriagePercent=51%. Therefore, based on triaging criteria 940, test group 836*a* and related implementation source of error 926 is not implicated for failing Test 7, and so DUT source of error 928 is implicated for DUT 838*a* failing Test 7. Test 7 relates to Tests 7, 8, and 9, as Tests 8 and 9 depend on Test 7. Then, Tests 7-9 are triaged—in this scenario, omitted—for DUT 838*a* by triaging software 740 executing at host computer 840. Then, testing facility 830 sends TriageRpt message 1118 to ECCCD 870 to indicate that "Tests 7-9" of test suite 872 have been triaged for "DUT 838*a*" as "Related Tests" to failing test "Test 7" indicated by FailingTR message 1116.

By triaging and omitting Tests 7-9 on DUT 838*a*, execution of Tests 1-18 have also been reordered for DUT 838*a* by triaging software 740. That is, prior to triaging Tests 7-9, Test 10 would have been the 10$^{th}$ test executed by DUT 838*a*. However, since Tests 8 and 9 will not be executed by DUT 838*a*, Test 10 would be the 8$^{th}$ test executed by DUT 838*a*. In other scenarios, triaging software 740 can explicitly reorder tests during triaging; e.g., reschedule unexecuted Tests 8 and 9 to be executed by DUT 838*a* after a first pass through Tests 1-18.

As indicated at block 1120, DUTs 838*b* and 838*c* fail Test 8. In response, testing facility 830 sends FailingTR message 1122 to indicate to ECCCD 870 that "DUT 838*b*" and "DUT 838*c*" failed "Test 8" at testing facility 830. Test 8 relates to Tests 8 and 9, as Test 9 depends on Test 8. After triaging software 740 of TISS 160 executing at host computer 840 determines that DUTs 838*b* and 838*c* failed Test 8, triaging software 740 determines the number of failing DUTs in test group 836*a* is 100%, when DUTs that have either failed Test 8 or have been triaged from Test 8, and therefore can be considered to have failed, which exceeds TriagePercent (51%). Then, triaging software 740 can determine that the number of failing DUTs in test cluster 834 for Test 8 (75%) exceeds TriagePercent, and so Tests 8 and 9 are triaged for all DUTs in test cluster 834, indicating that the common source of error for Test 8 is design source of error 924. Then, testing facility 830 sends TriageRpt message 1124 to ECCCD 870 to indicate that "Tests 8-9" of test suite 872 have been triaged for test cluster "834" as a "Failing Design" for these two tests.

Scenario 800 continues with testing facilities 810, 830, and 850 each executing Tests 10-13. As indicated at blocks 1130 and 1132, all DUTs pass all of Tests 10-13 at respective testing facilities 810 and 830. However, block 1134 indicates that, at testing facility 850, DUTs 858*a* and 858*j* fail Test 10. In response, testing facility 850 (e.g., using host computer 860) sends FailingTR message 1136 to indicate to ECCCD 870 that "DUTs 858*a* and 858*j*" failed "Test 10" at testing facility 850.

After triaging software 740 of TISS 160 executing at host computer 860 determines that DUTs 858*a* and 858*j* failed Test 10, triaging software 740 determines, based on triaging hierarchy 920 and triaging criteria 940, that the common source of failure for Test 10 by DUT 858*a* is implementation source of error 926 corresponding to test group 856*a*, as 100% of the DUTs in test group 856*a* failed Test 10, which exceeds TriagePercent (51%). Triaging software 740 also determines, based on triaging hierarchy 920 and triaging criteria 940, that the common source of failure for Test 10 by DUT 858*j* is DUT source of error 928 corresponding to DUT 858*j*. Implementation source of error 926 is not implicated for DUT 858*j* failing Test 10 by triaging software 740, as 25% of the DUTs in test group 856*d* failed Test 10, which is less than TriagePercent (51%). Test 10 relates to Tests 10, 11, 12, and 13, as Tests 11-13 depend on Test 10. Then, Tests 10-13 are triaged—in this scenario, omitted—for test group 856*a* and DUT 858*j* by triaging software 740 executing at host computer 860. Then, testing facility 830 sends TriageRpt message 1138 to ECCCD 870 to indicate that "Tests 10-13" of test suite 872 have been triaged for "TG 854*a*"/test group 856*a* due to a "Failing Implementation" of test group 856*a*, and that "Tests 10-13" have been triaged for "DUT 858*j*" as "Related Tests" to failing test "Test 10" indicated by FailingTR message 1136.

Figure 12:
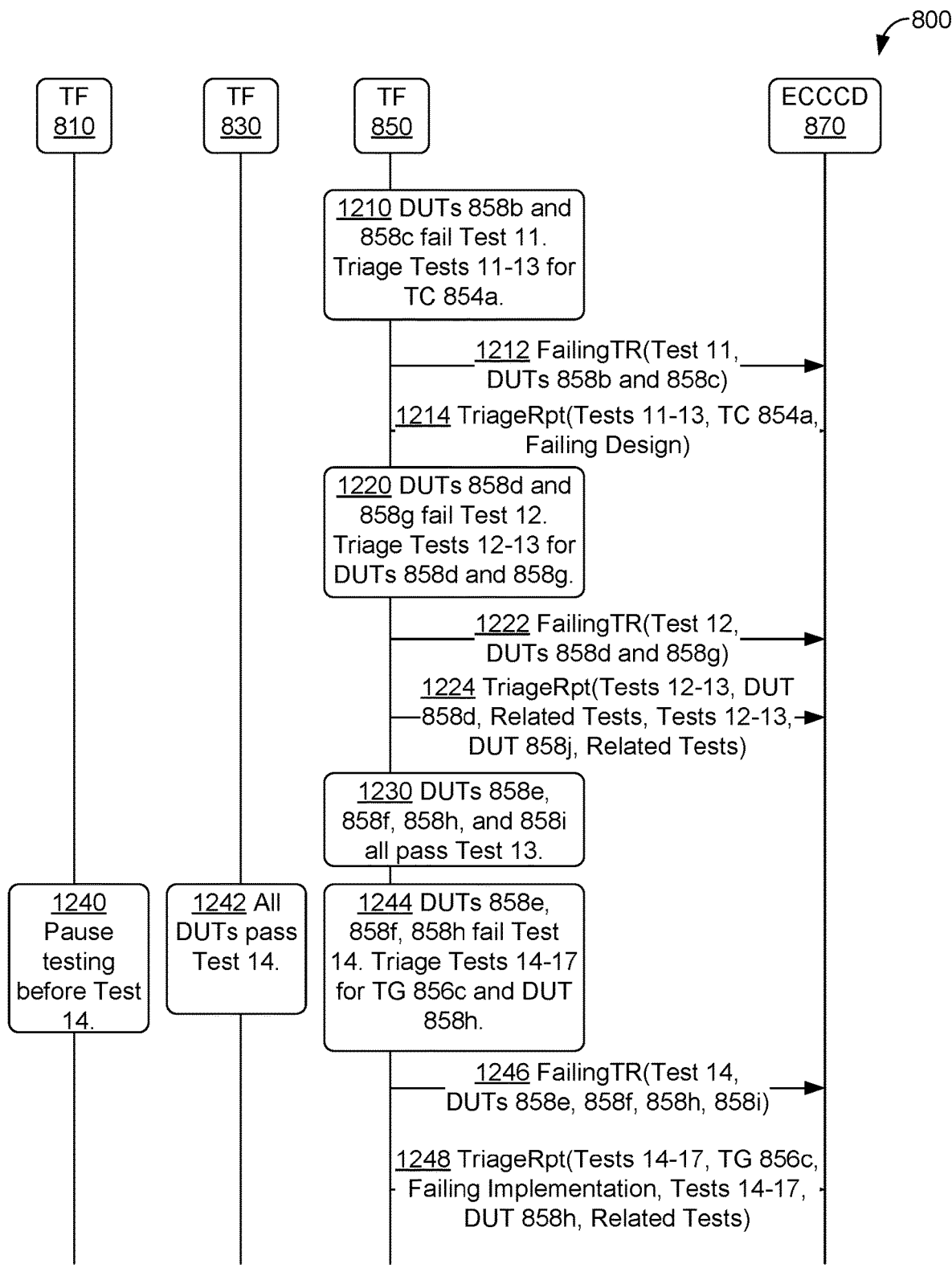

Scenario 800 continues, as shown by block 1210 of FIG. 12, with Test 11 failing on DUTs 858*b* and 858*c* of testing facility 850. In response, testing facility 850 sends FailingTR message 1212 to indicate to ECCCD 870 that "DUTs 858*b* and 858*c*" failed "Test 11" at testing facility 850.

After triaging software 740 of TISS 160 executing at host computer 860 determines that DUTs 858*b* and 858*c* failed Test 11, triaging software 740 determines, based on triaging hierarchy 920 and triaging criteria 940, that the common source of failure for Test 11 by DUTs 858*b* and 858*c* is design source of error 924 corresponding to test cluster 854*a*, as 100% of the DUTs in test cluster 854*a* failed or triaged Test 11, which exceeds TriagePercent (51%). Test 11 relates to Tests 11, 12, and 13, as Tests 12 and 13 depend on Test 11. Then, Tests 11-13 are triaged—in this scenario, omitted—for test cluster 854*a* by triaging software 740 executing at host computer 860. Then, testing facility 850 sends TriageRpt message 1214 to ECCCD 870 to indicate that "Tests 11-13" of test suite 872 have been triaged for "TC 854*a*"/test cluster 854*a* due to a "Failing Design" of test cluster 854*a*.

Scenario 800 continues, as shown by block 1220 of FIG. 12, with Test 12 failing for DUTs 858*d* and 858*g*. In response, testing facility 850 sends FailingTR message 1222 to indicate to ECCCD 870 that "DUTs 858*d* and 858*g*" failed "Test 12" at testing facility 850.

After triaging software 740 of TISS 160 executing at host computer 860 determines that DUTs 858*d* and 858*g* failed Test 12, triaging software 740 determines, based on triaging hierarchy 920 and triaging criteria 940, that the common source of failure for Test 12 by each of DUTs 858*d* and 858*g* is DUT source of error 928. For DUT 858*d*, the failing percentage of DUTs in test group 856*c* is 33%, which is less than TriagePercent (51%), so test group 856*c* is not implicated as a common source of error. For DUT 858*g*, the failing percentage of DUTs in test group 856*d* is 25%, which is less than TriagePercent (51%), so test group 856*d* is not implicated as a common source of error. Test 12 relates to Tests 12 and 13, as Test 13 depends on Test 12. Then, Tests 12 and 13 are triaged—in this scenario, omitted—for both DUTs 858*d* and 858*g* by triaging software 740 executing at host computer 860. Then, testing facility 850 sends TriageRpt message 1224 to ECCCD 870 to indicate that "Tests 12-13" of test suite 872 have been triaged for each of "DUT 858*d*" and "DUT 858*f*" as being "Related Tests" to failed Test 12 reported in FailingTR message 1222.

Scenario 800 continues, as shown by block 1230 of FIG. 12, with Test 13 passing on DUTs 858*e*, 858*f*, 858*h*, and 858*i*, which are the non-triaged DUTs for Test 13 at testing facility 850.

FIG. 12 shows that testing facility 810 determines to pause testing of test suite 872 at Test 14, as indicated by block 1240, while both testing facilities 830 and 850 continue testing of test suite 872. Block 1242 indicates that all DUTs at testing facility 830 pass Test 14. Block 1244 indicates that DUTs 858*e*, 858*f*, 858*h*, and 858*i* at testing facility 830 failed Test 14. In response, testing facility 850 sends FailingTR message 1246 to indicate to ECCCD 870 that "DUTs 858*e*, 858*f*, 858*h*" and DUT "858*i*" failed "Test 14" at testing facility 850.

After triaging software 740 of TISS 160 executing at host computer 860 determines that DUTs 858*e*, 858*f*, and 858*h* failed Test 14, triaging software 740 determines, based on triaging hierarchy 920 and triaging criteria 940, that the common source of failure for Test 14 for DUTs 858*e* and 858*f* is implementation source of error 926 and that the common source of failure for Test 14 for DUTs 858*h* is DUT source of error 928.

For DUT 858*e* and 858*f*, which are in test group 856*c*, the failing percentage of DUTs in test group 856*c* is 66%, which is more than TriagePercent (51%), so test group 856*c* is implicated as a common source of error. Moving up the triaging hierarchy, the failing percentage of DUTs in test cluster 854*b* is approximately 43%, which is less than TriagePercent, and the failing percentage of test groups in test cluster 854*b* is 50%, which is also less than TriagePercent; thus, design source of error 924 is not implicated for failing Test 14. For DUT 858*h*, which is in test group 856*c*, the failing percentage of DUTs in test group 856*d* is 25%, which is less than TriagePercent (51%), so test group 856*d* is not implicated as a common source of error. Test 14 relates to Tests 14, 15, 16, and 17, as Tests 15, 16, and 17 depends on Test 14. Then, Tests 14-17 are triaged—in this scenario, omitted—for both test group 856*c* and DUT 858*h* by triaging software 740 executing at host computer 860. Then, testing facility 850 sends TriageRpt message 1248 to ECCCD 870 to indicate that "Tests 14-17" of test suite 872 have been triaged for test group "856*c*" due to a "Failing Implementation" and have been triaged for "DUT 858*h*" as being "Related Tests" to failed Test 14 reported in FailingTR message 1246.

Figure 13:
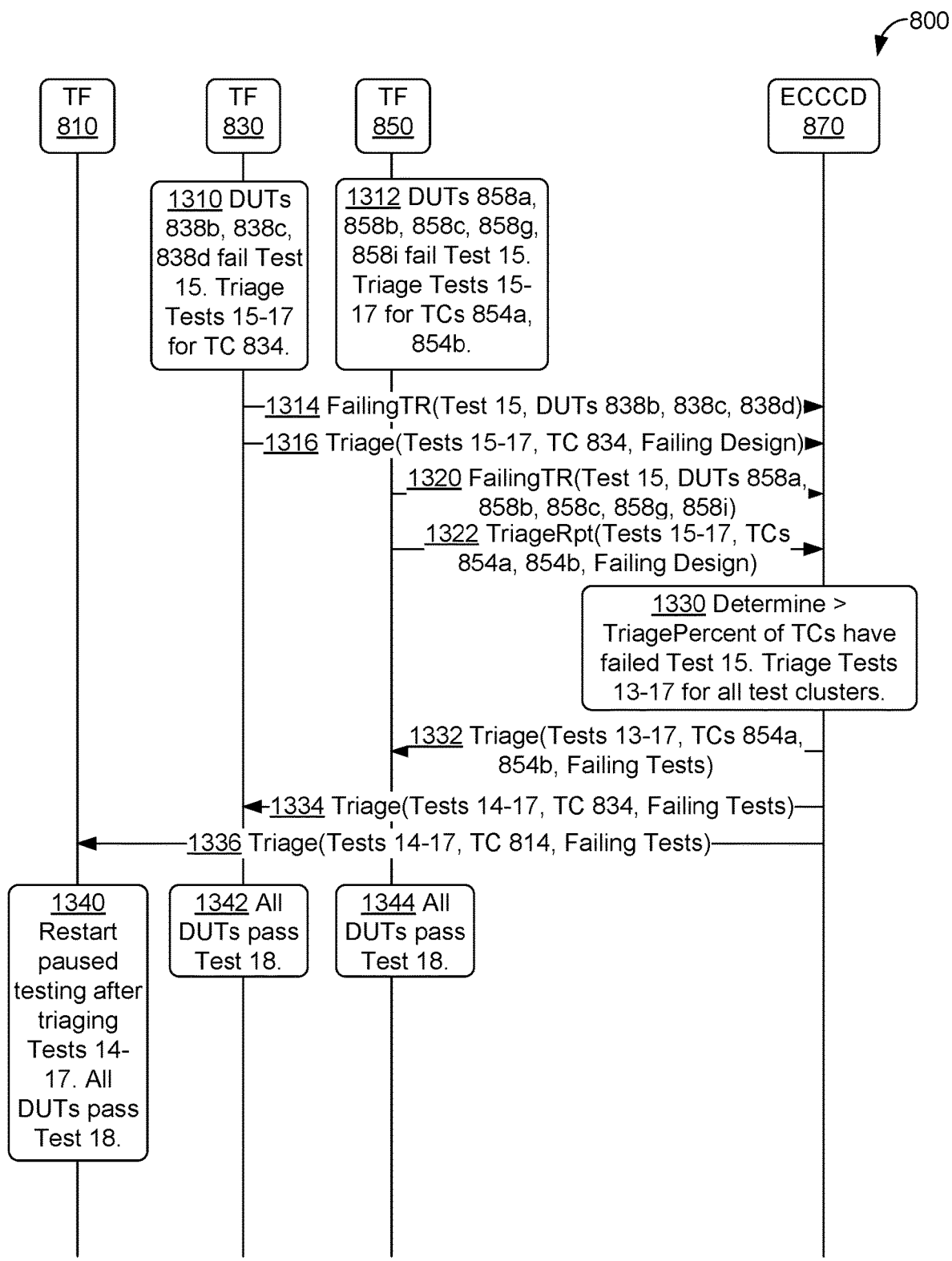

Scenario 800 continues with execution of Test 15 at testing facilities 830 and 850. Block 1310 of FIG. 13 shows that DUTs 838*b*, 838*c*, 838*d* at testing facility 830 fail Test 15. In response, testing facility 830 sends FailingTR message 1314 to indicate to ECCCD 870 that "DUTs 838*b*, 838*c*" and DUT "838*d*" failed "Test 15" at testing facility 830.

After triaging software 740 of TISS 160 executing at host computer 840 determines that DUTs 838*b*, 838*c* and 858*d* failed Test 15, triaging software 740 determines, based on triaging hierarchy 920 and triaging criteria 940, that the common source of failure for Test 14 for DUTs 838*b*, 838*c* and 858*d* is design source of error 924. Triaging software 740 can determine that, for test group 836*b* that includes DUTs 838*c* and 858*d*, 100% of DUTs in the test group have failed which exceeds TriagePercent (51%). Then, triaging software 740 can determine that, for test cluster 834, 75% of DUTs in the test cluster have failed, which exceeds TriagePercent (51%). Then, triaging software 740 can implicate test cluster 834 as a common source of error, which corresponds to design source of error 924. Then, Tests 15-17 are triaged—in this scenario, omitted—for test cluster 834 by triaging software 740 executing at host computer 840. Then, testing facility 830 sends TriageRpt message 1316 to ECCCD 870 to indicate that "Tests 15-17" of test suite 872 have been triaged for test cluster "834" due to a "Failing Design".

Block 1312 shows that DUTs 858*a*, 858*b*, 858*c*, 858*g*, 858*i* at testing facility 850 fail Test 15. In response, testing facility 850 sends FailingTR message 1320 to indicate to ECCCD 870 that "DUTs 858*a*, 858*b*, 858*c*, 858*g*" and DUT "858*i*" failed "Test 15" at testing facility 850.

After triaging software 740 of TISS 160 executing at host computer 860 determines that DUTs 858*a*, 858*b*, 858*c*, 858*g*, and 858*i* failed Test 15, triaging software 740 determines, based on triaging hierarchy 920 and triaging criteria 940, that the common source of failure for Test 15 for DUTs 858*a*, 858*b*, and 858*c* is design source of error 924 and that the common source of failure for Test 15 for DUTs 858*g* and 858*i* is design source of error 924.

For DUT 858*a*, 858*b*, and 858*c*, which are in test groups 856*a* and 856*b*, the failing percentage of DUTs in both test groups 856*a* and 856*b* is 100%, which is more than TriagePercent (51%), so both test groups 856*a* and 856*b* are implicated as a common source of error. Moving up the triaging hierarchy, the failing percentage of DUTs in test cluster 854*a* is 100% which is greater than TriagePercent, which implicates test cluster 854*a* as a common source of error. For DUTs 858*g* and 858*i*, which are in test group 856*d*, the failing percentage of DUTs in test group 856*d* is 75% which is more than TriagePercent. Moving up the triaging hierarchy, the failing and triaged percentage of DUTs in test cluster 854*a* is approximately 86% which is greater than TriagePercent, which implicates test cluster 854*b* as a common source of error. Test 15 relates to Tests 15, 16, and 17, as Tests 16 and 17 depends on Test 15. Then, Tests 15-17 are triaged—in this scenario, omitted—for both test clusters 854*a* and 854*b* by triaging software 740 executing at host computer 860. Then, testing facility 850 sends TriageRpt message 1332 to ECCCD 870 to indicate that "Tests 15-17" of test suite 872 have been triaged for test clusters "854*a*" and "854*b*" due to "Failing Design[s]".

In response to receiving TriageRpt messages 1316 and 1322, triaging software 740 executing at ECCCD 870 can determine that four test clusters 814, 834, 854*a*, and 854*b* are registered for execution of test suite 854, and that at least Tests 15-17 have been triaged for three test clusters—834, 854*a*, and 854*b*. As such, the percentage of failing or triaged test clusters in the ecosystem reporting to ECCCD 870 for Test 15 is 75%, which is greater than TriagePercent (51%) as indicated at block 1330. As such, device-independent software/test suite source of error 922 is implicated for failing Test 15. Triaging criteria 940 for device-independent software/test suite source of error 922 indicates that triaging involves triaging all tests that parent-relate to test T for all Test Clusters at all testing facilities.

Test 15 is parent-related to Tests 14-17. Then, triaging software 740 executing at ECCCD 870 determines to triage Tests 14-17, as parent-related tests to triaged Test 15, at test clusters 814, 834, 854*a*, and 854*b*. ECCCD 870 sends Triage message 1336 to testing facility 810 to triage "Tests 14-17" for test cluster "814" due to "Failing Tests". By sending Triage message 1336 to testing facility 810 and host computer 820 triaging tests 14-17, ECCCD 870 and host computer 820 direct each of DUTs 818*a*, 818*b*, 818*c* to reorder execution of Test 14 from being the next test executed when testing resumes after the testing pause indicated by block 1240, to being executed at some later time. Rather, Tests 14-17 will be omitted, and so Test 18 will be scheduled to be the next test executed by DUTs 818*a*, 818*b*, 818*c* as directed by host computer 820. Also, as indicated above, Triage message 1336 was sent to testing facility 810 based on results of failing tests at testing facilities 830 and 850. Thus, Triage message 1336 causes reordering of the execution of Tests 14-17 by DUTs 818*a*, 818*b*, 818*c* based on failing tests of DUTs that share at least a common software design (e.g., a software design that involves the use of device-independent software, such as provided via software images 876), but where the failing tests did not occur by any of DUTs 818*a*, 818*b*, 818*c* at testing facility 810. In other scenarios, DUTs 818*a*, 818*b*, 818*c* can share common hardware designs, implementations, components, and/or additional software designs with DUTs at other testing facilities; e.g., testing facilities 830 and/or 850.

ECCCD 870 also sends Triage message 1334 to testing facility 830 to triage "Tests 14-17" for test cluster "834" due to "Failing Tests" and sends Triage message 1332 to testing facility 850 to triage "Tests 14-17" for test clusters "854*a*" and "854*b*" due to "Failing Tests".

In some scenarios, a Triage message sent by triaging software 740 executing at ECCCD 870, such as message 1332, 1334, or 1336, can be treated by TISS 160 executing at a testing facility receiving the Triage message as a waiver of any tests triaged by ECCCD 870. In particular of these scenarios, a Triage message sent from ECCCD 870 triaging tests T_Triage1 . . . T_TriageN can include an explicit waiver for tests T_Triage1 . . . T_TriageN.

Scenario 800 continues with testing facility 810 resuming testing with Test 18, and with Test 18 being executed at testing facilities 830 and 850 as well. Block 1340 indicates that Test 18 passes for all DUTs at testing facility 810. And, blocks 1342 and 1344 indicate that Test 18 passes for all DUTs at respective testing facilities 830 and 840.

After completion of Test 18 at all of testing facilities 810, 830, 850, a first pass through Tests 1-18 has been completed at all three of these testing facilities. Then, each of testing facilities 810, 830, 850 sends a test report to ECCCD 870 reporting the outcome of the execution of Tests 1-18 of test suite 872.

Figure 14:
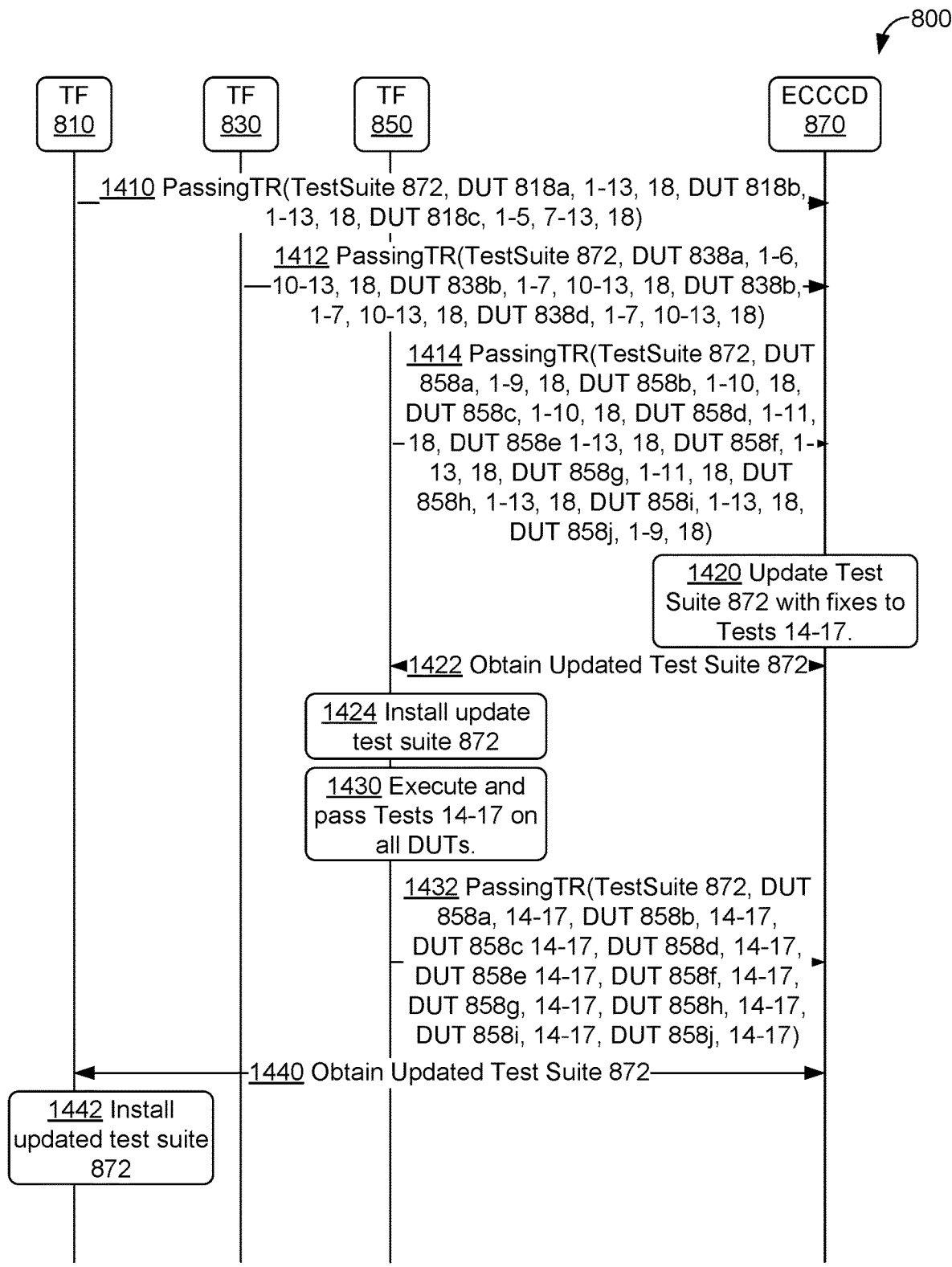

FIG. 14 shows that testing facility 810 sends PassingTR message 1410 to ECCCD 870 to report which tests of test suite 872 passed and were not later triaged during the first pass. PassingTR message 1410 indicates that at testing facility 810: "DUT 818a" passed Tests "1-13" and "18", indicating that Tests 14-17 either failed or were triaged for this DUT; "DUT 818b" passed Tests "1-13" and "18", and "DUT 818c" passed Tests "1-5, 7-13," and "18".

Testing facility 830 sends PassingTR message 1412 to ECCCD 870 to report which tests of test suite 872 passed and were not later triaged during the first pass. PassingTR message 1412 indicates that at testing facility 830: "DUT 838a" passed Tests "1-6, 10-13" and "18"; "DUT 838b" passed Tests "1-7, 10-13" and "18"; DUT 838b" passed Tests "1-7, 10-13" and "18"; and "DUT 838d" passed Tests "1-7, 10-13", and "18".

Testing facility 850 sends PassingTR message 1414 to ECCCD 870 to report which tests of test suite 872 passed and were not later triaged during the first pass. PassingTR message 1414 indicates that at testing facility 850: "DUT 858a" passed Tests "1-9" and "18"; "DUT 858b" passed Tests "1-10" and "18"; "DUT 858c" passed Tests "1-10" and "18"; "DUT 858d" passed Tests "1-11" and "18"; "DUT 858e" passed Tests "1-13" and "18"; "DUT 858f" passed Tests "1-13" and "18"; "DUT 858g" passed Tests "1-11" and "18"; "DUT 858h" passed Tests "1-13" and "18"; "DUT 858i" passed Tests "1-13" and "18"; and "DUT 858j" passed Tests "1-9" and "18".

Scenario 800 continues, as indicated by block 1420, with ECCCD 870 releasing updated version of test suite 872 with fixes to Tests 14-17. Then, testing facility 850 obtains the updated version of test suite 872 using messages 1422 and installs updated test suite 872 as indicated at block 1424. Subsequently, testing facility 850 executes Tests 14-17 of updated test suite 872 on all DUTs, and all DUTs pass all of Tests 14-17 as indicated at block 1430. Testing facility 850 sends PassingTR message 1432 to ECCCD 870 to report which tests of test suite 872 passed and were not later triaged during retesting of Tests 14-17. PassingTR message 1432 indicates that at testing facility 850 each of DUTs 854a-854j passed all of Tests 14-17.

Figure 15:
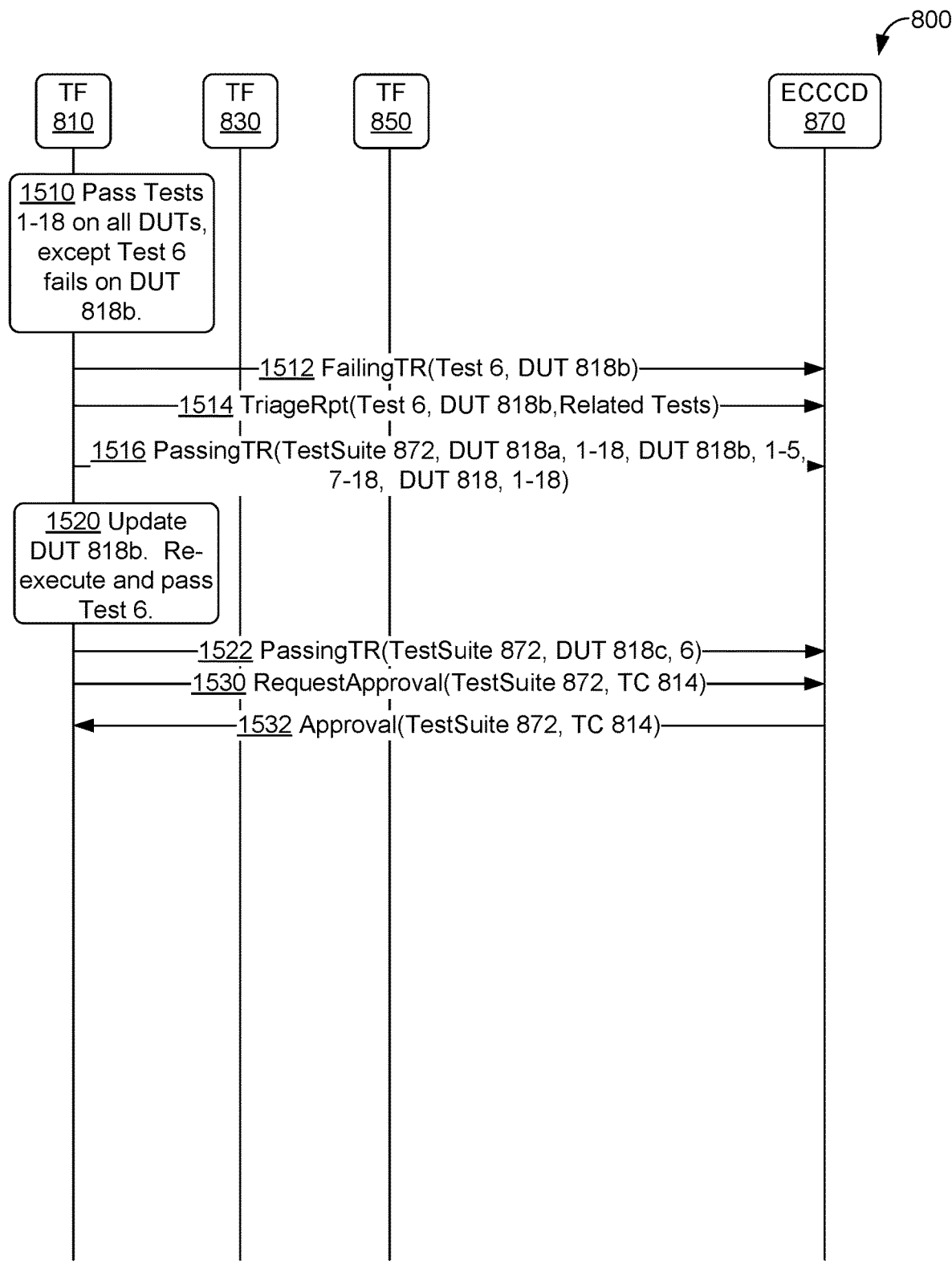

Scenario 800 continues with testing facility 810 obtaining the updated version of test suite 872 using messages 1440 and installing updated test suite 872 as indicated at block 1442. Turning to FIG. 15, testing facility 850 subsequently executes Tests 1-18 of updated test suite 872 on all DUTs, and all DUTs pass all of Tests 1-18, except that DUT 818a fails Test 6 as indicated at block 1510.

Upon determining that DUT 818b failed Test 6, testing facility 810 (sends FailingTR message 1512 to indicate to ECCCD 870 that "DUT 818b" failed "Test 6" at testing facility 810. After triaging software 740 of TISS 160 executing at host computer 820 determines that DUT 818b failed Test 6, triaging software 740 executing at host computer 820 determines, based on triaging hierarchy 920 and triaging criteria 940, that the common source of failure for failing Test 6 is DUT source of error 928. DUT 818b is in test group 816, which has a percentage of DUTs failing Test 6 of 33% which is less than TriagePercent=51%. Therefore, based on triaging criteria 940, DUT source of error 928 is implicated for DUT 818b failing Test 6.

As Test 6 relates only to itself (as no other tests depend on Test 6), only Test 6 is triaged—in this scenario, omitted—for DUT 818b by triaging software 740 executing on host computer 820. Then, testing facility 810 sends TriageRpt message 1514 to ECCCD 870 to indicate that "Test 6" of test suite 872 has been triaged for "DUT 818b" as a "Related Tes[t]" to failing test "Test 6" indicated by FailingTR message 1512.

After executing Tests 1-18 using updated test suite 872, testing facility 810 sends PassingTR message 1516, which indicates that at testing facility 810: "DUT 818a" passed Tests "1-18"; "DUT 818b" passed Tests "1-5" and "7-18", and "DUT 818c" passed Tests "1-18".

Scenario 800 continues with DUT 818b being updated at testing facility 810. DUT 818b then re-executes and passes Test 6, as indicated by block 1520. Then, testing facility 810 sends PassingTR message 1522 to ECCCD 870 to indicate that "DUT 818b" has passed "Test 6". As all DUTs at testing facility 810 have passed all of Tests 1-18 of test suite 872, testing facility 810 sends RequestApproval message 1530 to ECCCD 870 to request approval of the design and implementation of DUTs tested in test cluster "814" at testing facility 810 for the functionality tested by "Test Suite 872".

In response to RequestApproval message 1530, ECCCD 870 examines registration messages and test reports provided by testing facility 810 and determines that all DUTs of test cluster 814 of testing facility 810 have passed all tests of test suite 872. Therefore, ECCCD 870 sends Approval message 1532 to testing facility 810 which approves DUTs of test cluster "814" for the functionality tested by "Test Suite 872". After testing facility 810 receives Approval message 1532, scenario 800 can be completed.

In other scenarios, ECCCD 870 can send approval messages based on passing test reports without being requested by a testing and/or a device-related entity; e.g., testing facility 810 would not have to send RequestApproval message 1530 to obtain Approval message 1532.

In even other scenarios, some of the DUTs in system 802 can be designated as reference DUTs having reference hardware and/or software. Then, if a reference DUT fails a test of test suite 872, tests on non-reference DUTs (e.g., one or more DUTs not having the reference hardware and/or software) can be eligible for triaging and/or waiver, under the logic that a test failing on the reference DUT will also fail on a non-reference DUT (but not vice versa). In some of these even other scenarios, when some tests, such as regression tests designed to verify previously-released and/or relatively-old functionality, fail on a reference DUT, those tests can be immediately eligible for triaging and/or waiver for non-reference DUTs; while other tests, such as tests designed specifically to test previously-unreleased and/or relatively-new functionality, may not be eligible for triaging and/or waiver for non-reference DUTs if these test(s) fail on reference DUTs, as the reference DUTs may not have the previously-unreleased and/or relatively-new functionality.

Example Data Network

Figure 16:
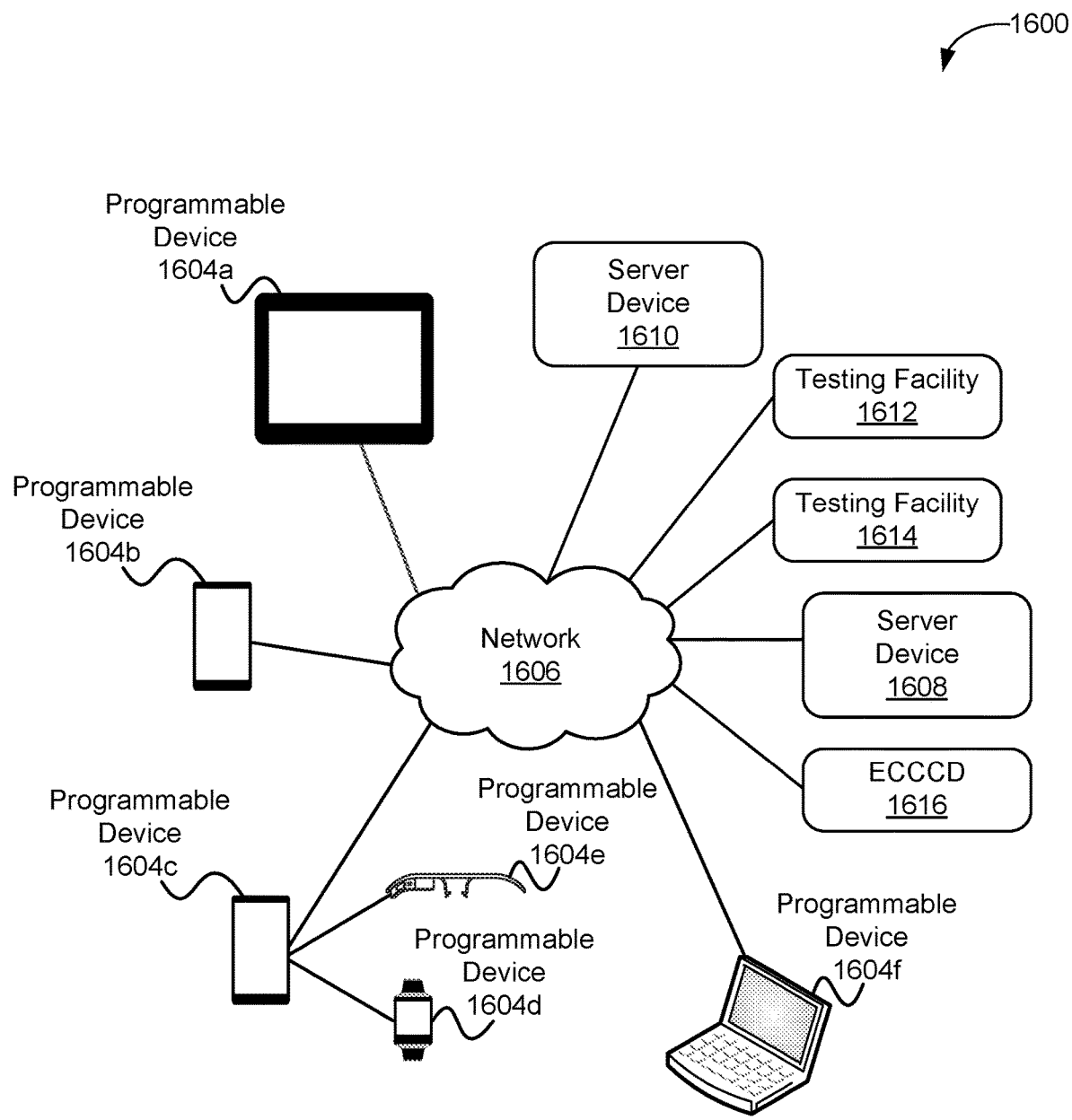
FIG. 16 depicts a distributed computing architecture, in accordance with at least some example embodiments.

FIG. 16 depicts a distributed computing architecture 1600 with server devices 1608, 1610, testing facilities 1612, 1614, and ECCCD 1616 configured to communicate, via network

1606, with programmable devices 1604*a*, 1604*b*, 1604*c*, 1604*d*, 1604*e*, and 1604*f*, in accordance with at least some example embodiments. Network 1606 can correspond to a LAN, a wide area network (WAN), a corporate intranet, the public Internet, or any other type of network configured to provide a communications path between networked computing devices. Network 1606 can also correspond to a combination of one or more LANs, WANs, corporate intranets, and/or the public Internet. In particular, network 1606 can perform one or more functions of networks 430 and/or 880; e.g., enable communications at least between testing facilities 1612, 1614, and ECCCD 1616.

Although FIG. 16 shows six programmable devices, distributed computing architecture 1600 can serve more or fewer programmable devices. Moreover, programmable devices 1604*a*, 1604*b*, 1604*c*, 1604*d*, 1604*e*, and 1604*f* (or any additional programmable devices) may be any sort of computing device, such as an ordinary laptop computer, desktop computer, wearable computing device, mobile computing device, head-mountable device, network terminal, wireless communication device (e.g., a smart phone or cell phone), and so on. In some embodiments, such as indicated with programmable devices 1604*a*, 1604*b*, 1604*c*, and 1604*f*, programmable devices can be directly connected to network 1606. In other embodiments, such as indicated with programmable devices 1604*d* and 1604*e*, programmable devices can be indirectly connected to network 1606 via an associated computing device, such as programmable device 1604*c*. In this example, programmable device 1604*c* can act as an associated computing device to pass electronic communications between programmable devices 1604*d* and 1604*e* and network 1606. In still other embodiments not shown in FIG. 16, a programmable device can be both directly and indirectly connected to network 1606.

Server devices 1608, 1610 can be configured to perform one or more services, as requested by programmable devices 1604*a*-1604*f*. For example, server device 1608 and/or 1610 can provide content to programmable devices 1604*a*-1604*f*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1608 and/or 1610 can provide programmable devices 1604*a*-1604*f* with access to software for database, search, computation, graphical, audio, video, World Wide Web/Internet utilization, and/or other functions. Many other examples of server devices are possible as well.

Computing Device Architecture

Figure 17A:
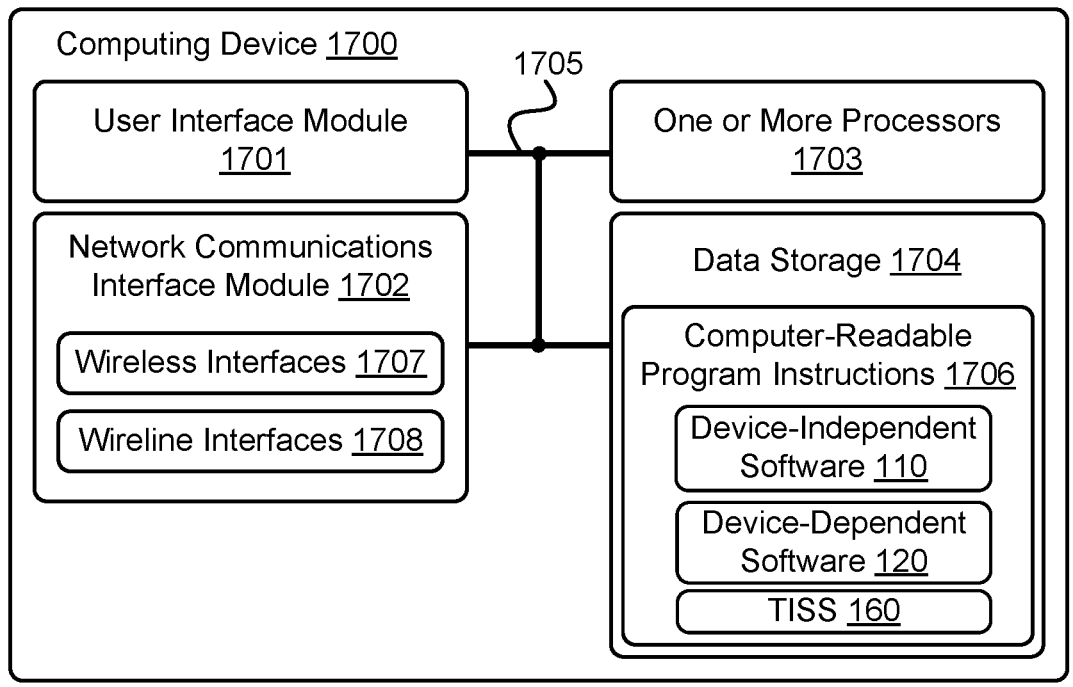
FIG. 17A is a block diagram of a computing device, in accordance with at least some example embodiments.

FIG. 17A is a block diagram of a computing device 1700 (e.g., system), in accordance with at least some example embodiments. In particular, computing device 1700 shown in FIG. 17A can be configured to perform one or more functions related to one or more of: system 100, computing device 110, devices under test 110*a*, 110*b*, 110*c*, 110*d*, 110*e*, 110*f*, test suite 150, TISS 160, testing facilities 300, 810, 830, 850, 1612, 1614 target system 310, host computing device 340, testing messaging 350, testing system 400, testing entity computing devices 410, cloud computing devices 420, network/firewall 430, scenarios 500, 550, 600, 800, system 700, test reports 710, 720, 722, 730, triaging software 740, triaging algorithm 750, ECCCD 870, 1616, network 800, network 1606, server devices 1608, 1610, programmable devices 1604*a*, 1604*b*, 1604*c*, 1604*d*, 1604*e*, 1604*f*, and method 1800.

A computing device, such as computing device 800, can be or include any machine performing calculations automatically, and examples include, but are not limited to, desktop computers, laptop computers, tablets, mobile phones, smart phones, watches, smart watches, headsets, and HMDs such as smart glasses. A mobile computing device is any computing device that includes a mobile source of power, such as a battery and/or is configured to be readily transported—examples include, but are not limited to, laptop computers, tablets, mobile phones, smart phones, watches, smart watches, headsets, vehicle infotainment system, and HMDs. An immobile computing device is a computing device that is not a mobile computing device—examples include, but are not limited to, desktop computers, rack-mounted computers/servers, mainframe computers, home entertainment systems, smart thermostats, and appliance computers. A wearable computing device is a computing device configured to be readily transported or carried on and/or by a person or animal—examples include, but are not limited to, mobile phones, smart phones, watches, smart watches, headsets, and HMDs.

Computing device 1700 may include a user interface module 1701, a network-communication interface module 1702, one or more processors 1703, and data storage 1704, all of which may be linked together via a system bus, network, or other connection mechanism 1705.

User interface module 1701 can be operable to send data to and/or receive data from exterior user input/output devices. For example, user interface module 1701 can be configured to send and/or receive data to and/or from user input devices such as a keyboard, a keypad, a touch screen, a computer mouse, a trackball, a joystick, a camera, a voice recognition module, and/or other similar devices. User interface module 1701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices. User interface module 1701 can also be configured to generate audible output(s), such as a speaker, speaker jack, audio output port, audio output device, earphones, and/or other similar devices.

Network-communications interface module 1702 can include one or more wireless interfaces 1707 and/or one or more wireline interfaces 1708 that are configurable to communicate via a network, such as network 706 shown in FIG. 7. Wireless interfaces 1707 can include one or more short range and/or wide area wireless transmitters, receivers, and/or transceivers, such as a Bluetooth™ transceiver, a ZigBee™ transceiver, an IEEE 802.11/Wi-Fi™ transceiver, a WiMAX transceiver, cellular, and/or other similar type of wireless transceiver configurable to communicate via a wireless network. Wireline interfaces 1708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1702 can be configured to provide reliable, secured, and/or authenticated communications. For each communication described herein, information for ensuring reliable communications (i.e., guaranteed message delivery) can be provided, for example as part of a message header and/or footer (e.g., packet/message sequencing information, encapsulation header(s) and/or footer(s), size/time information, and transmission verification information such as CRC and/or parity check values). Communications can be made secure, for example, by encoding or encrypting, and/or decrypting and decoding, using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure and then recover communications.

Processors 1703 can include one or more general purpose processors and/or one or more special purpose processors (e.g., central processing units, digital signal processors, graphics processing units, application specific integrated circuits, etc.). Processors 1703 can be configured to execute computer-readable program instructions 1706 that are contained in the data storage 1704 and/or other instructions as described herein.

Data storage 1704 can include one or more computer-readable storage media that can be read and/or accessed by at least one of processors 1703. The one or more computer-readable storage media can include volatile and/or non-volatile storage components, such as optical, magnetic, organic or other memory or disc storage, which can be integrated in whole or in part with at least one of processors 1703. In some embodiments, data storage 1704 can be implemented using a single physical device (e.g., one optical, magnetic, organic or other memory or disc storage unit), while in other embodiments, data storage 1704 can be implemented using two or more physical devices.

Data storage 1704 can include computer-readable program instructions 1706 and, in some cases, additional data. In some embodiments, data storage 1704 can additionally include storage required to perform at least part of the herein-described scenarios, methods, and techniques and/or at least part of the functionality of the herein-described devices and networks. Computer-readable program instructions 1706 can include instructions at least for device-independent software 110, device-dependent software 120, TISS 160 and/or any other herein-described software.

In some embodiments, computing device 1700 can include one or more sensors. The sensor(s) can be configured to measure conditions in an environment for computing device 1700 and provide data about that environment. The data can include, but is not limited to, location data about computing device 1700, velocity (velocity including speed and/or direction) data about computing device 1700, acceleration data about computing device 1700, and other data about the environment for computing device 1700. The one or more sensors can include, but are not limited to, Global Positioning System (GPS) sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 17B:
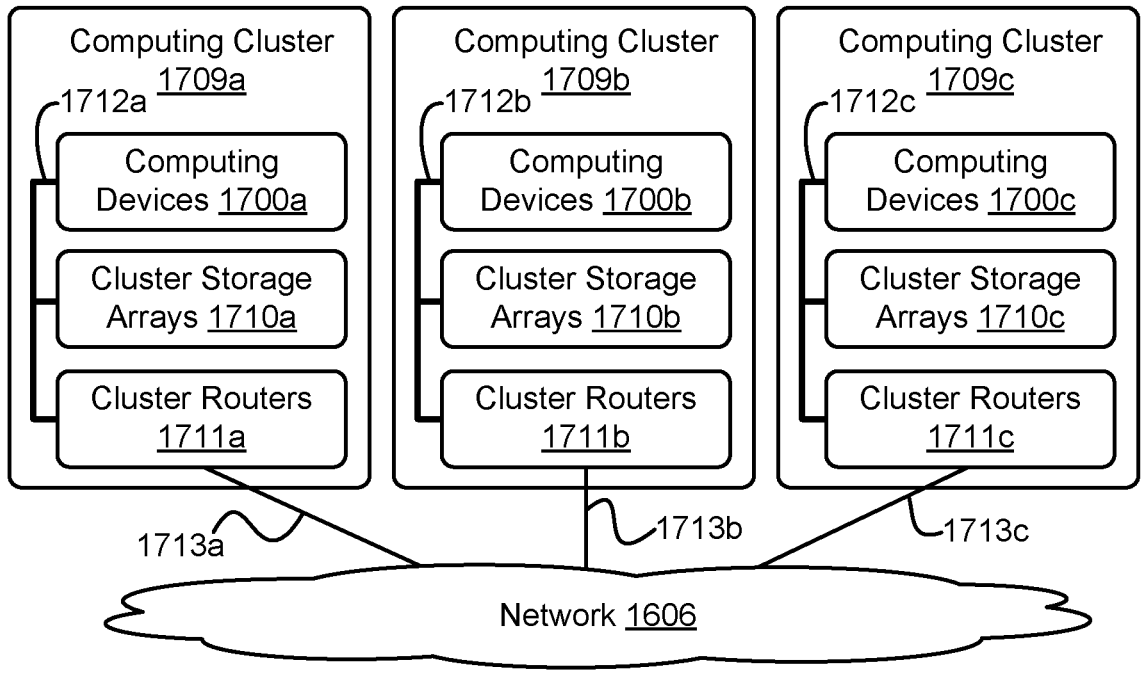
FIG. 17B depicts a cloud-based server system, in accordance with at least some example embodiments.

FIG. 17B depicts network 1606 of computing clusters 1709a, 1709b, 1709c arranged as a cloud-based server system, in accordance with at least some example embodiments. Computing clusters 1709a, 1709b, and/or 1709c can represent one or more computing devices that can generate and/or utilize one or more memory, boot, and/or other images written using the herein-described techniques related to image generation; e.g., algorithm A1. In particular, computing clusters 1709a, 1709b, and/or 1709c configured to perform one or more functions related to one or more of: system 100, computing device 110, devices under test 110a, 110b, 110c, 110d, 110e, 110f, test suite 150, TISS 160, testing facilities 300, 810, 830, 850, 1612, 1614 target system 310, host computing device 340, testing messaging 350, testing system 400, testing entity computing devices 410, cloud computing devices 420, network/firewall 430, scenarios 500, 550, 600, 800, system 700, test reports 710, 720, 722, 730, triaging software 740, triaging algorithm 750, ECCCD 870, 1616, network 800, network 1606, server devices 1608, 1610, programmable devices 1604a, 1604b, 1604c, 1604d, 1604e, 1604f, and method 1800.

Some or all of the modules/components of testing facilities 1612, 1614 and/or ECCCD 1616 can be cloud-based devices that store program logic and/or data of cloud-based applications and/or services. In some embodiments, testing facilities 1612, 1614 and/or ECCCD 1616 can be on a single computing device residing in a single computing center. In other embodiments, testing facilities 1612, 1614 and/or ECCCD 1616 can include multiple computing devices in a single computing center, or even multiple computing devices located in multiple computing centers located in diverse geographic locations. For example, FIG. 16 depicts each of testing facilities 1612, 1614 and ECCCD 1616 residing in different physical locations.

In some embodiments, software and data associated with testing facilities 1612, 1614 and/or ECCCD 1616 can be encoded as computer readable information stored in non-transitory, tangible computer readable media (or computer readable storage media) and accessible by one or more of programmable devices 1604a-1604f and/or other computing devices. In some embodiments, data associated with testing facilities 1612, 1614 and/or ECCCD 1616 can be stored on a single disk drive, flash drive, or other tangible storage media, or can be implemented on multiple disk drives, flash drives, or other tangible storage media located at one or more diverse geographic locations.

In FIG. 17B, the functions of testing facilities 1612, 1614 and/or ECCCD 1616 can be distributed among three computing clusters 1709a, 1709b, and 1709c. Computing cluster 1709a can include one or more computing devices 1700a, cluster storage arrays 1710a, and cluster routers 1711a connected by a local cluster network 1712a. Similarly, computing cluster 1709b can include one or more computing devices 1700b, cluster storage arrays 1710b, and cluster routers 1711b connected by a local cluster network 1712b. Likewise, computing cluster 1709c can include one or more computing devices 1700c, cluster storage arrays 1710c, and cluster routers 1711c connected by a local cluster network 1712c.

In some embodiments, each of the computing clusters 1709a, 1709b, and 1709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1709a, for example, computing devices 1700a can be configured to perform various computing tasks of testing facilities 1612, 1614 and/or ECCCD 1616. In one embodiment, the various functionalities of testing facilities 1612, 1614 and/or ECCCD 1616 can be distributed among one or more of computing devices 1700a, 1700b, and 1700c. Computing devices 1700b and 1700c in computing clusters 1709b and 1709c can be configured similarly to computing devices 1700a in computing cluster 1709a. On the other hand, in some embodiments, computing devices 1700a, 1700b, and 1700c can be configured to perform different functions.

In some embodiments, computing tasks and stored data associated with testing facilities 1612, 1614 and/or ECCCD 1616 can be distributed across computing devices 1700a, 1700b, and 1700c based at least in part on the storage and/or processing requirements of some or all components/modules of server devices 708 and/or 710, the storage and/or processing capabilities of testing facilities 1612, 1614 and/or ECCCD 1616, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1710a, 1710b, and 1710c of the computing clusters 1709a, 1709b, and 1709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of testing facilities 1612, 1614 and/or ECCCD 1616 can be distributed across computing devices 1700a, 1700b, and 1700c of computing clusters 1709a, 1709b, and 1709c, various active portions and/or backup portions of data for these components can be distributed across cluster storage arrays 1710a, 1710b, and 1710c. For example, some cluster storage arrays can be configured to store the data of one or more modules/components of testing facilities 1612, 1614 and/or ECCCD 1616, while other cluster storage arrays can store data of other modules/components of testing facilities 1612, 1614 and/or ECCCD 1616. Additionally, some cluster storage arrays can be configured to store backup versions of data stored in other cluster storage arrays.

The cluster routers 1711a, 1711b, and 1711c in computing clusters 1709a, 1709b, and 1709c can include networking equipment configured to provide internal and external communications for the computing clusters. For example, the cluster routers 1711a in computing cluster 1709a can include one or more internet switching and routing devices configured to provide (i) local area network communications between the computing devices 1700a and the cluster storage arrays 1710a via the local cluster network 1712a, and (ii) wide area network communications between the computing cluster 1709a and the computing clusters 1709b and 1709c via the wide area network connection 1713a to network 1606. Cluster routers 1711b and 1711c can include network equipment similar to the cluster routers 1711a, and cluster routers 1711b and 1711c can perform similar networking functions for computing clusters 1709b and 1709b that cluster routers 1711a perform for computing cluster 1709a.

In some embodiments, the configuration of the cluster routers 1711a, 1711b, and 1711c can be based at least in part on the data communication requirements of the computing devices and cluster storage arrays, the data communications capabilities of the network equipment in the cluster routers 1711a, 1711b, and 1711c, the latency and throughput of local networks 1712a, 1712b, 1712c, the latency, throughput, and cost of wide area network links 1713a, 1713b, and 1713c, and/or other factors that can contribute to the cost, speed, fault-tolerance, resiliency, efficiency and/or other design goals of the moderation system architecture.

Example Methods of Operation

FIG. 18 is a flowchart illustrating method 1800, in accordance with at least some example embodiments. Method 1800 can be carried out by a host computing device, such as, but not limited to, one or more computing devices 1700 such as discussed above in the context of FIG. 17A. For example, data storage 1704 of computing device 1700 can store computer readable instructions 1706 that, when executed by one or more processors 1703 of computing device 1700, can cause computing device 1700 to perform at least the herein-described features of method 1800.

Method 1800 can begin at block 1810, where the host computing device is provided. The host computing device can execute test infrastructure system software for testing a plurality of DUTs using a test suite having a plurality of tests to be executed by the plurality of DUTs. The plurality of DUTs can include a first DUT and a second DUT, where the first DUT and the second DUT share a common design, and where the plurality of tests include a first test and a second test, such as discussed above at least in the context of FIGS. 3 and 7-16.

In some embodiments, the plurality of tests can include one or more tests for testing a test image of software that includes a device-independent portion of software, such as discussed above at least in the context of FIGS. 3 and 7-16. In particular of these embodiments, the one or more tests for testing a test image of software that includes a device-independent portion of software can include one or more tests for testing an API associated with the test image of software, such as discussed above at least in the context of FIGS. 7-16. In other particular of these embodiments, the plurality of DUTs can be configured to execute a software image that includes the test image and a device-dependent portion of software; then, method 1800 can further include: generating the test image at a first geographical location; and generating the software image that includes the device-dependent portion of software at a second geographical location that differs from the first geographical location, such as discussed above at least in the context of FIGS. 7-16. In still other particular of these embodiments, the test suite is communicated from the first geographical location to the second geographical location before the first test is executed, such as discussed above at least in the context of FIGS. 7-16.

In even other embodiments, the common design can include a common hardware design, where the first DUT can include a first implementation of the common hardware design, and where the second DUT can include a second implementation of the common hardware design, such as discussed above at least in the context of FIGS. 7-16. In yet other embodiments, the common design includes a common software design, such as discussed above at least in the context of FIGS. 7-16. In some of these embodiments, the common software design includes one or more of a common design for device-dependent software and a common design for device-dependent software, such as discussed above at least in the context of FIGS. 7-16.

In still other embodiments, the first DUT can include reference hardware, and the second DUT can include hardware other than the reference hardware, such as discussed above.

At block 1820, the host computing device can determine to execute the first test before the second test on at least the first DUT, such as discussed above at least in the context of FIGS. 7-16. In some embodiments, each of the plurality of DUTs can utilize a common hardware component; then, determining whether the first test is to be executed on the second DUT includes: selecting first failing test results from the first test results, the first failing test results for failed executions of the first test by the first DUT; analyzing the first failing test results to determine whether the common hardware component is associated with the first failing test results; and after determining that the common hardware component is associated with the first failing test results, determining not to execute the first test on the second DUT, such as discussed above at least in the context of FIG. 7. In other embodiments, the host computing device can determine to execute the first test before the second test on at least the first DUT and the second DUT, such as discussed above at least in the context of FIGS. 7-16.

At block 1830, the host computing device can receive first test results for a failing first test executed by the first DUT, such as discussed above at least in the context of FIGS. 7-16.

At block 1840, the host computing device can determine, based on the first test results and based on the first DUT sharing the common design with the second DUT, to execute the second test before the first test on the second DUT, such as discussed above at least in the context of FIGS. 7-16.

In some embodiments, determining, based on the first test results and based on the first DUT sharing a common design with the second DUT, to execute the second test before the first test on the second DUT can include determining to execute the second test before the first test on the second DUT based on one or more triaging criteria associated with a triaging hierarchy, such as discussed above at least in the context of FIGS. 7-16. In other embodiments, the plurality of DUTs are associated with a plurality of device-related entities; then, determining to execute the second test before the first test on the second DUT can include determining that at least the failing first test failed on one or more DUTs associated with at least a threshold number of the plurality of device-related entities, such as discussed above at least in the context of FIG. 9. In still other embodiments, the plurality of DUTs are associated with a plurality of device-related entities; then, determining to execute the second test before the first test on the second DUT can include determining that at least the failing first test failed on one or more DUTs associated with at least a threshold percentage of the plurality of device-related entities, such as discussed above at least in the context of FIG. 9.

At block 1850, the host computing device can subsequently instruct the second DUT to execute the second test before executing the first test, such as discussed above at least in the context of FIGS. 7-16.

In some embodiments, method 1800 can further include: generating an output of the test infrastructure system that is based on execution of the second test, such as discussed above at least in the context of FIGS. 7-16. In particular of these embodiments, the output of the test infrastructure system that is based on execution of the second test can includes one or more of: an indication that the second test passed on at least one DUT of the plurality of DUTs, an indication that the second test failed on at least one DUT of the plurality of DUTs, and an indication that the second test is waived for at least one DUT of the plurality of DUTs, such as discussed above at least in the context of FIGS. 7-16. In more particular of these embodiments, method 1800 can further include: obtaining second test results for the execution of the second test on the second DUT at the test infrastructure system; determining whether the second DUT passed the second test based on the second test results at the test infrastructure system; and after determining that the second DUT passed the second test, generating the indication that the second test passed on at least the second DUT, such as discussed above at least in the context of FIGS. 7-16.

In other of these embodiments, method 1800 can further include: obtaining second test results for the execution of the second test on the second DUT at the test infrastructure system; determining whether the second DUT failed the second test based on the second test results at the test infrastructure system; and after determining that the second DUT failed the second test, generating the indication that the second test failed on at least the second DUT, such as discussed above at least in the context of FIGS. 7-16. In still other of these embodiments, the plurality of DUTs can further include a third DUT, and method 1800 can further include: obtaining second test results for the execution of the second test on the second DUT at the test infrastructure system; determining whether the second DUT failed the second test based on the second test results at the test infrastructure system; and after determining that the second DUT failed the second test, generating the indication that the second test is waived for at least the third DUT, such as discussed above at least in the context of FIG. 7.

In even other embodiments, the system image of software to be executed is associated with a first software version; then, method 1800 can further include: obtaining related version test results from other executions of the first test on one or more DUTs that executed a software version that equals or exceeds the first software version; analyzing the related version test results to determine whether the first test was successful on the one or more DUTs; and after determining that the first test was successful on the one or more DUTs, determining not to execute the first test on the second DUT, such as discussed above at least in the context of FIG. 7.

In still other embodiments, method 1800 can further include: communicating at least the first test results with a computing device associated with an ecosystem coordinator, such as discussed above at least in the context of FIGS. 8-16. In yet other embodiments, the plurality of tests can include a first HAL test of a first HAL associated with at least the first DUT; then, method 1800 can further include: determining whether the first HAL test is to be executed on the first DUT; and after determining that the first HAL test is to be executed on the first DUT, executing the first HAL test on the first DUT, such as discussed above at least in the context of FIGS. 4 and 7. In some of these embodiments, the first HAL can be part of a plurality of HALs, and executing the first HAL test on the first DUT can include: determining a list of HAL instance names associated with the plurality of HALs; determining one or more combinations of the list of HAL instance names, where each of the one or more combinations includes an instance name of each HAL of the plurality of HALs; determining whether to execute a HAL test for a particular combination of HAL instance names of the one or more HAL instance names; and after determining to execute a HAL test for the particular combination of HAL instance names, executing the first HAL test on the first DUT, such as discussed above at least in the context of FIGS. 4 and 7.

Additional Example Embodiments

The following clauses are offered as further description of the disclosure.

Clause 1—A method, including: providing a host computing device executing test infrastructure system software for testing a plurality of DUTs using a test suite having a plurality of tests to be executed by the plurality of DUTs, the plurality of DUTs including a first DUT and a second DUT, where the first DUT and the second DUT share a common design, and where the plurality of tests include a first test and a second test; determining to execute the first test before the second test on at least the first DUT using the host computing device; receiving, at the host computing device, first test results for a failing first test executed by the first DUT; determining, based on the first test results and based on the first DUT sharing the common design with the second DUT, to execute the second test before the first test on the second DUT; and the host computing device subsequently instructing the second DUT to execute the second test before executing the first test.

Clause 2—The method of Clause 1, further including: generating an output of the test infrastructure system that is based on execution of the second test.

Clause 3—The method of Clause 2, where the output of the test infrastructure system that is based on execution of the second test includes one or more of: an indication that the second test passed on at least one DUT of the plurality of DUTs, an indication that the second test failed on at least one DUT of the plurality of DUTs, and an indication that the second test is waived for at least one DUT of the plurality of DUTs.

Clause 4—The method of Clause 3, where the method further includes: obtaining second test results for the execution of the second test on the second DUT at the test infrastructure system; determining whether the second DUT passed the second test based on the second test results at the test infrastructure system; and after determining that the second DUT passed the second test, generating the indication that the second test passed on at least the second DUT.

Clause 5—The method of Clause 3 or Clause 4, where the method further includes: obtaining second test results for the execution of the second test on the second DUT at the test infrastructure system; determining whether the second DUT failed the second test based on the second test results at the test infrastructure system; and after determining that the second DUT failed the second test, generating the indication that the second test failed on at least the second DUT.

Clause 6—The method of any one of Clauses 3-5, where the plurality of DUTs further include a third DUT, and where the method further includes: obtaining second test results for the execution of the second test on the second DUT at the test infrastructure system; determining whether the second DUT failed the second test based on the second test results at the test infrastructure system; and after determining that the second DUT failed the second test, generating the indication that the second test is waived for at least the third DUT.

Clause 7—The method of any one of Clauses 1-6, where the plurality of tests include one or more tests for testing a test image of software that includes a device-independent portion of software.

Clause 8—The method of Clause 7, where the one or more tests for testing a test image of software that includes a device-independent portion of software include one or more tests for testing an API associated with the test image of software.

Clause 9—The method of Clause 7 or Clause 8, where the plurality of DUTs are configured to execute a software image that includes the test image and a device-dependent portion of software, and where the method further includes: generating the test image at a first geographical location; and generating the software image that includes the device-dependent portion of software at a second geographical location that differs from the first geographical location.

Clause 10—The method of Clause 9, where the test suite is communicated from the first geographical location to the second geographical location before the first test is executed.

Clause 11—The method of any one of Clauses 1-10, where each of the plurality of DUTs utilize a common hardware component, and where determining whether the first test is to be executed on the second DUT includes: selecting first failing test results from the first test results, the first failing test results for one or more failed executions of the first test by the first DUT; analyzing the first failing test results to determine whether the common hardware component is associated with the first failing test results; and after determining that the common hardware component is associated with the first failing test results, determining not to execute the first test on the second DUT.

Clause 12—The method of any one of Clauses 1-11, where the system image of software to be executed is associated with a first software version and where the method further includes: obtaining related version test results from other executions of the first test on one or more DUTs that executed a software version that equals or exceeds the first software version; analyzing the related version test results to determine whether the first test was successful on the one or more DUTs; and after determining that the first test was successful on the one or more DUTs, determining not to execute the first test on the second DUT.

Clause 13—The method of any one of Clauses 1-12, further including: communicating at least the first test results with a computing device associated with an ecosystem coordinator.

Clause 14—The method of any one of Clauses 1-13, where the plurality of tests includes a first HAL test of a first HAL associated with at least the first DUT, and where the method further includes: determining whether the first HAL test is to be executed on the first DUT; and after determining that the first HAL test is to be executed on the first DUT, executing the first HAL test on the first DUT.

Clause 15—The method of Clause 14, where the first HAL is part of a plurality of HALs, and executing the first HAL test on the first DUT includes: determining a list of HAL instance names associated with the plurality of HALs; determining one or more combinations of the list of HAL instance names, where each of the one or more combinations includes an instance name of each HAL of the plurality of HALs; determining whether to execute a HAL test for a particular combination of HAL instance names of the one or more HAL instance names; and after determining to execute a HAL test for the particular combination of HAL instance names, executing the first HAL test on the first DUT.

Clause 16—The method of any one of Clauses 1-15, where the common design includes a common hardware design, where the first DUT includes a first implementation of the common hardware design, and where the second DUT includes a second implementation of the common hardware design.

Clause 17—The method of any one of Clauses 1-16, where the common design includes a common software design.

Clause 18—The method of Clause 17, where the common software design includes one or more of a common design for device-dependent software and a common design for device-dependent software.

Clause 19—The method of Clause 1, where determining, based on the first test results and based on the first DUT sharing a common design with the second DUT, to execute the second test before the first test on the second DUT includes determining to execute the second test before the first test on the second DUT based on one or more triaging criteria associated with a triaging hierarchy.

Clause 20—The method of Clause 1, where the plurality of DUTs are associated with a plurality of device-related entities, and where determining to execute the second test before the first test on the second DUT includes determining that at least the failing first test failed on one or more DUTs associated with at least a threshold number of the plurality of device-related entities.

Clause 21—The method of Clause 1, where the plurality of DUTs are associated with a plurality of device-related entities, and where determining to execute the second test before the first test on the second DUT includes determining that at least the failing first test failed on one or more DUTs associated with at least a threshold percentage of the plurality of device-related entities.

Clause 22—The method of Clause 1, wherein the first DUT comprises reference hardware, and wherein the second DUT comprises hardware other than the reference hardware.

Clause 23—A host computing device, including: one or more processors; and one or more non-transitory computer readable media having computer-readable instructions stored thereon that, when executed by the one or more processors, cause the host computing device to carry out functions that include the method of any one of Clauses 1-22.

Clause 24—A host computing device, including: means for carrying out the method of any one of Clauses 1-22.

Clause 25—An article of manufacture including one or more non-transitory computer readable media having computer-readable instructions stored thereon that, when executed by one or more processors of a host computing device, cause the host computing device to carry out functions that include the method of any one of Clauses 1-22.

Clause 26—A device, including: means to carry out the method of any one of Clauses 1-22.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flowcharts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flowcharts discussed herein, and these ladder diagrams, scenarios, and flowcharts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code, and may include related or other data. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:

providing a host computing device executing test infrastructure system software for testing a plurality of devices under test (DUTs) using a test suite having a plurality of tests to be executed by the plurality of DUTs, the plurality of DUTs comprising a first DUT and a second DUT, wherein the first DUT and the second DUT share a common design, wherein each of the plurality of DUTs utilize a common hardware component, and wherein the plurality of tests comprise a first test and a second test;

determining to execute the first test before the second test on at least the first DUT using the host computing device;

receiving, at the host computing device, first test results for a failing first test executed by the first DUT;

determining, based on the first test results and based on the first DUT sharing the common design with the second DUT, to execute the second test before the first test on the second DUT;

the host computing device subsequently instructing the second DUT to execute the second test before executing the first test; and determining whether the first test is to be executed on the second DUT by:

selecting first failing test results from the first test results, the first failing test results for one or more failed executions of the first test by the first DUT;

analyzing the first failing test results to determine whether the common hardware component is associated with the first failing test results; and after determining that the common hardware component is associated with the first failing test results, determining not to execute the first test on the second DUT.

2. The method of claim 1, further comprising:

generating an output of the test infrastructure system that is based on execution of the second test.

3. The method of claim 2, wherein the output of the test infrastructure system that is based on execution of the second test comprises one or more of: an indication that the second test passed on at least one DUT of the plurality of DUTs, an indication that the second test failed on at least one DUT of the plurality of DUTs, or an indication that the second test is waived for at least one DUT of the plurality of DUTs.

4. The method of claim 3, wherein the method further comprises:

obtaining second test results for the execution of the second test on the second DUT at the test infrastructure system;

determining whether the second DUT passed the second test based on the second test results at the test infrastructure system; and after determining that the second DUT passed the second test, generating the indication that the second test passed on at least the second DUT.

5. The method of claim 3, wherein the method further comprises:

obtaining second test results for the execution of the second test on the second DUT at the test infrastructure system;

determining whether the second DUT failed the second test based on the second test results at the test infrastructure system; and after determining that the second DUT failed the second test, generating the indication that the second test failed on at least the second DUT.

6. The method of claim 3, wherein the plurality of DUTs further comprise a third DUT, and wherein the method further comprises:

obtaining second test results for the execution of the second test on the second DUT at the test infrastructure system;

determining whether the second DUT failed the second test based on the second test results at the test infrastructure system; and after determining that the second DUT failed the second test, generating the indication that the second test is waived for at least the third DUT.

7. The method of claim 1, wherein the plurality of tests comprise one or more tests for testing a test image of software that comprises a device-independent portion of software.

8. The method of claim 7, wherein the one or more tests for testing a test image of software that comprises the device-independent portion of software comprise one or more tests for testing an application programming interface (API) associated with the test image of software.

9. The method of claim 7, wherein the plurality of DUTs are configured to execute a software image that comprises the test image and a device-dependent portion of software, and wherein the method further comprises:

generating the test image at a first geographical location; and generating the software image that includes the device-dependent portion of software at a second geographical location that differs from the first geographical location.

10. The method of claim 9, wherein the test suite is communicated from the first geographical location to the second geographical location before the first test is executed.

11. The method of claim 1, wherein a system image of software to be executed is associated with a first software version and wherein the method further comprises:

obtaining related version test results from other executions of the first test on one or more DUTs that executed a software version that equals or exceeds the first software version;

analyzing the related version test results to determine whether the first test was successful on the one or more DUTs; and after determining that the first test was successful on the one or more DUTs, determining not to execute the first test on the second DUT.

12. The method of claim 1, further comprising:

communicating at least the first test results with a computing device associated with an ecosystem coordinator.

13. The method of claim 1, wherein the plurality of tests comprises a first HAL test of a first hardware abstraction layer (HAL) associated with at least the first DUT, and wherein the method further comprises:

determining whether the first HAL test is to be executed on the first DUT; and after determining that the first HAL test is to be executed on the first DUT, executing the first HAL test on the first DUT.

14. The method of claim 13, wherein the first HAL is part of a plurality of HALs, and executing the first HAL test on the first DUT comprises:

determining a list of HAL instance names associated with the plurality of HALs;

determining one or more combinations of the list of HAL instance names, wherein each of the one or more combinations comprises an instance name of each HAL of the plurality of HALs;

determining whether to execute a HAL test for a particular combination of HAL instance names of the one or more HAL instance names; and after determining to execute a HAL test for the particular combination of HAL instance names, executing the first HAL test on the first DUT.

15. The method of claim 1, wherein the common design comprises a common hardware design, wherein the first DUT comprises a first implementation of the common hardware design, and wherein the second DUT comprises a second implementation of the common hardware design.

16. The method of claim 1, wherein the common design comprises a common software design.

17. The method of claim 16, wherein the common software design comprises one or more of a common design for device-dependent software and a common design for device-independent software.

18. The method of claim 1, wherein determining, based on the first test results and based on the first DUT sharing a common design with the second DUT, to execute the second test before the first test on the second DUT comprises determining to execute the second test before the first test on the second DUT based on one or more triaging criteria associated with a triaging hierarchy.

19. The method of claim 1, wherein the plurality of DUTs are associated with a plurality of device-related entities, and wherein determining to execute the second test before the first test on the second DUT comprises determining that at least the failing first test failed on one or more DUTs associated with at least a threshold number of the plurality of device-related entities.

20. The method of claim 1, wherein the plurality of DUTs are associated with a plurality of device-related entities, and wherein determining to execute the second test before the first test on the second DUT comprises determining that at least the failing first test failed on one or more DUTs associated with at least a threshold percentage of the plurality of device-related entities.

21. The method of claim 1, wherein the first DUT comprises reference hardware, and wherein the second DUT comprises hardware other than the reference hardware.

22. A host computing device, comprising:
one or more processors; and
one or more non-transitory computer readable media having computer-readable instructions stored thereon that, when executed by the one or more processors, cause the host computing device to carry out functions comprising:
providing a host computing device executing test infrastructure system software for testing a plurality of devices under test (DUTs) using a test suite having a plurality of tests to be executed by the plurality of DUTs, the plurality of DUTs comprising a first DUT and a second DUT, wherein the first DUT and the second DUT share a common design, wherein the plurality of DUTs further comprise a third DUT, and wherein the plurality of tests comprise a first test and a second test;
determining to execute the first test before the second test on at least the first DUT using the host computing device;
receiving, at the host computing device, first test results for a failing first test executed by the first DUT;
determining, based on the first test results and based on the first DUT sharing the common design with the second DUT, to execute the second test before the first test on the second DUT;
the host computing device subsequently instructing the second DUT to execute the second test before executing the first test;
obtaining second test results for the execution of the second test on the second DUT at the test infrastructure system;
determining whether the second DUT failed the second test based on the second test results at the test infrastructure system; and
after determining that the second DUT failed the second test, generating an output of the test infrastructure system that is based on execution of the second test, the output comprising an indication that the second test is waived for at least the third DUT.

23. An article of manufacture comprising one or more non-transitory computer readable media having computer-readable instructions stored thereon that, when executed by one or more processors of a host computing device, cause the host computing device to carry out functions comprising:
providing a host computing device executing test infrastructure system software for testing a plurality of devices under test (DUTs) using a test suite having a plurality of tests to be executed by the plurality of DUTs, the plurality of DUTs comprising a first DUT and a second DUT, wherein the first DUT and the second DUT share a common design, wherein a system image of software to be executed is associated with a first software version, and wherein the plurality of tests comprise a first test and a second test;
determining to execute the first test before the second test on at least the first DUT using the host computing device;
receiving, at the host computing device, first test results for a failing first test executed by the first DUT;
determining, based on the first test results and based on the first DUT sharing the common design with the second DUT, to execute the second test before the first test on the second DUT;
the host computing device subsequently instructing the second DUT to execute the second test before executing the first test;
obtaining related version test results from other executions of the first test on one or more DUTs that executed a software version that equals or exceeds the first software version;
analyzing the related version test results to determine whether the first test was successful on the one or more DUTs; and
after determining that the first test was successful on the one or more DUTs, determining not to execute the first test on the second DUT.

* * * * *